United States Patent
Bier et al.

(10) Patent No.: US 9,585,435 B2
(45) Date of Patent: Mar. 7, 2017

(54) WATERPROOF, BREATHABLE SHOE AND METHOD FOR MANUFACTURING A SHOE

(75) Inventors: Christian Bier, Miesbac (DE); Stane Nabernik, Kranj (SI); Thorger Hübner, Flintsbach (DE); Tore Strömfors, Lindome (SE); Frank Jensen, Bredebro (DK); Jakob Møller Hansen, Aabenraa (DK)

(73) Assignees: W. L. Gore & Associates GmbH, Putzbrunn (DE); W. L. Gore & Associates Scandinavia AB, Mölndal (SE); ECCO Sko A/S, Bredebro (DK)

( * ) Notice: Subject to any disclaimer, the term of this patent is extended or adjusted under 35 U.S.C. 154(b) by 965 days.

(21) Appl. No.: 13/820,040

(22) PCT Filed: Sep. 3, 2010

(86) PCT No.: PCT/EP2010/062978
§ 371 (c)(1),
(2), (4) Date: May 29, 2013

(87) PCT Pub. No.: WO2012/028208
PCT Pub. Date: Mar. 8, 2012

(65) Prior Publication Data
US 2013/0232826 A1    Sep. 12, 2013

(51) Int. Cl.
*A43B 7/08*     (2006.01)
*A43B 7/12*     (2006.01)
*A43B 13/12*    (2006.01)
*B29D 35/12*    (2010.01)

(52) U.S. Cl.
CPC ................ *A43B 7/08* (2013.01); *A43B 7/087* (2013.01); *A43B 7/088* (2013.01); *A43B 7/12* (2013.01);
(Continued)

(58) Field of Classification Search
CPC .......... A43B 7/08; A43B 7/087; A43B 7/088; A43B 7/12; A43B 7/125; A43B 13/12
(Continued)

(56) References Cited

U.S. PATENT DOCUMENTS 2,751,692 A    6/1956  Cortina
3,953,566 A    4/1976  Gore
(Continued)

FOREIGN PATENT DOCUMENTS

CN    2190427    3/1995
CN    1164179    11/1997
(Continued)

*Primary Examiner* — Ted Kavanaugh
(74) *Attorney, Agent, or Firm* — Kilpatrick Townsend & Stockton, LLP

(57) ABSTRACT

A Waterproof, breathable shoe according to the present invention comprises an upper assembly (8) with an upper portion (10) including a breathable outer material (11) and with a bottom portion (20), said upper assembly (8) comprising a waterproof, breathable functional layer arrangement (18; 13, 21) extending over said upper portion (10) and said bottom portion (20). The shoe further comprises a ventilating sole element having a structure or material allowing for air flow through it, said ventilating sole element being attached to said upper assembly (8), wherein at least one lateral passage (50) extends from said structure or material through a side wall (702) of said ventilating sole element, said lateral passage (50) allowing for communication of air between said structure or material of said ventilating sole element and an outside of said ventilating sole element.

36 Claims, 20 Drawing Sheets

(52) U.S. Cl.
CPC .............. *A43B 7/125* (2013.01); *A43B 13/12* (2013.01); *B29D 35/122* (2013.01)

(58) Field of Classification Search
USPC .............................................. 36/3 B, 12, 14
See application file for complete search history.

(56) References Cited

U.S. PATENT DOCUMENTS

| | | | |
|---|---|---|---|
| 4,187,390 A | 2/1980 | Gore | |
| 4,194,041 A | 3/1980 | Gore | |
| 4,493,870 A | 1/1985 | Vrouenraets et al. | |
| 4,725,418 A | 2/1988 | Friemel et al. | |
| 8,356,425 B2 | 1/2013 | Moretti | |
| 8,720,083 B2 | 5/2014 | Moretti | |
| 2001/0016991 A1* | 8/2001 | Sartor | A43B 13/383 36/3 B |
| 2005/0138838 A1* | 6/2005 | Lin | A43B 7/081 36/3 B |
| 2005/0223594 A1* | 10/2005 | Issler | A43B 7/08 36/3 B |
| 2006/0117599 A1* | 6/2006 | Deem | A43B 7/08 36/3 B |
| 2008/0282582 A1* | 11/2008 | Shapiro | A43B 5/08 36/3 B |
| 2009/0000153 A1 | 1/2009 | Grimmeisen | |
| 2009/0049716 A1 | 2/2009 | Romero | |
| 2009/0172971 A1* | 7/2009 | Peikert | A43B 7/125 36/88 |
| 2009/0188134 A1* | 7/2009 | Polegato Moretti | A43B 7/125 36/3 B |
| 2010/0132227 A1 | 6/2010 | Pavelescu et al. | |
| 2011/0061269 A1* | 3/2011 | Nakano | A43B 7/08 36/3 A |
| 2011/0265352 A1* | 11/2011 | Lin | A43B 7/088 36/3 B |
| 2013/0232826 A1* | 9/2013 | Bier | A43B 7/087 36/3 B |

FOREIGN PATENT DOCUMENTS

| | | |
|---|---|---|
| CN | 1234725 | 11/1999 |
| CN | 2358719 | 1/2000 |
| CN | 2518356 | 10/2002 |
| CN | 1864576 | 11/2006 |
| CN | 1925765 | 3/2007 |
| CN | 2901951 | 5/2007 |
| CN | 2907310 | 6/2007 |
| CN | 2919937 | 7/2007 |
| CN | 101066169 | 11/2007 |
| CN | 201005145 | 1/2008 |
| CN | 101484032 | 7/2009 |
| EP | 1 033 924 | 6/1999 |
| EP | 0 983 006 | 3/2000 |
| EP | 1 185 183 | 3/2002 |
| EP | 1 312 275 | 5/2003 |
| EP | 1 358 811 | 11/2003 |
| EP | 1 927 296 | 6/2008 |
| EP | 2 294 936 | 3/2011 |
| EP | 1 089 642 | 4/2011 |
| JP | 63-169905 | 11/1988 |
| JP | 03001804 | 1/1991 |
| JP | 3109001 | 5/1991 |
| JP | 8224110 | 9/1996 |
| JP | 2002-10801 | 1/2002 |
| JP | 2002-172003 | 6/2002 |
| UA | UA49662 | 5/2010 |
| WO | WO 03/024263 | 3/2003 |
| WO | WO 2004/028284 | 4/2004 |
| WO | WO 2005/063069 | 7/2005 |
| WO | WO 2006/010578 | 2/2006 |
| WO | WO 2007/012415 | 2/2007 |
| WO | WO 2007/101625 | 9/2007 |
| WO | WO 2008/003375 | 1/2008 |
| WO | WO 2008/019703 | 2/2008 |
| WO | WO 2008/125524 | 10/2008 |
| WO | WO 2011/092172 | 8/2011 |

\* cited by examiner

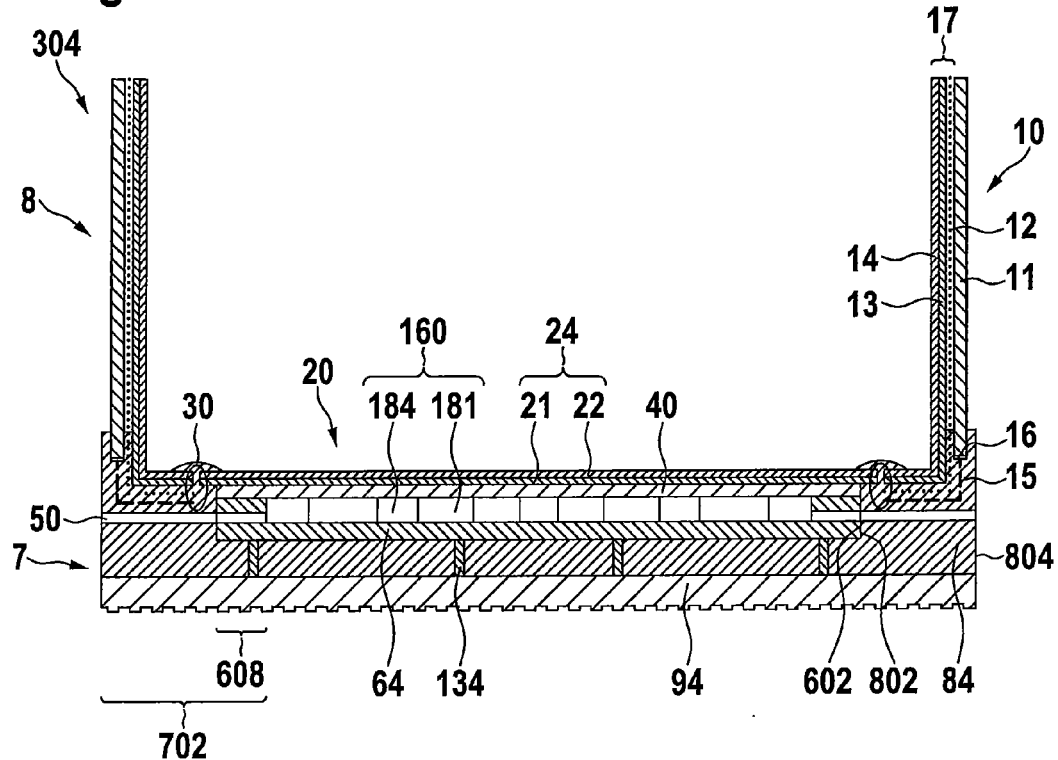
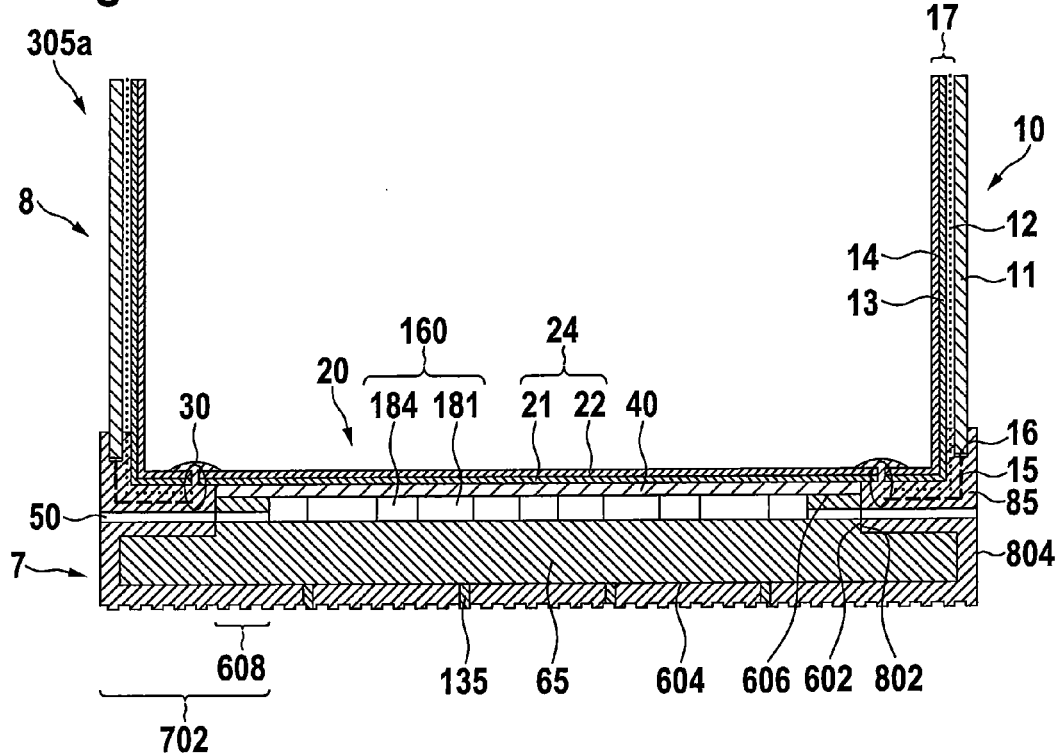

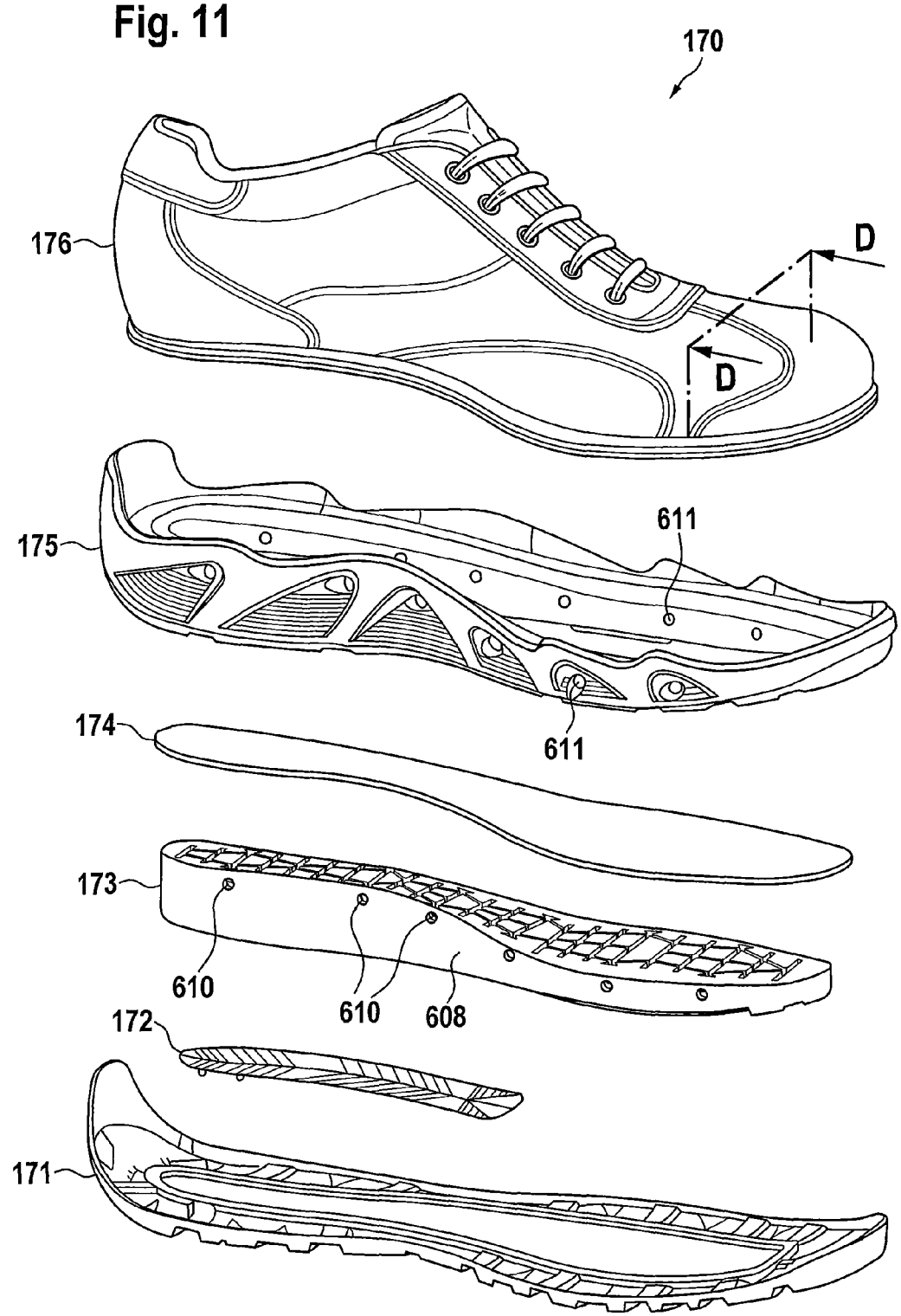

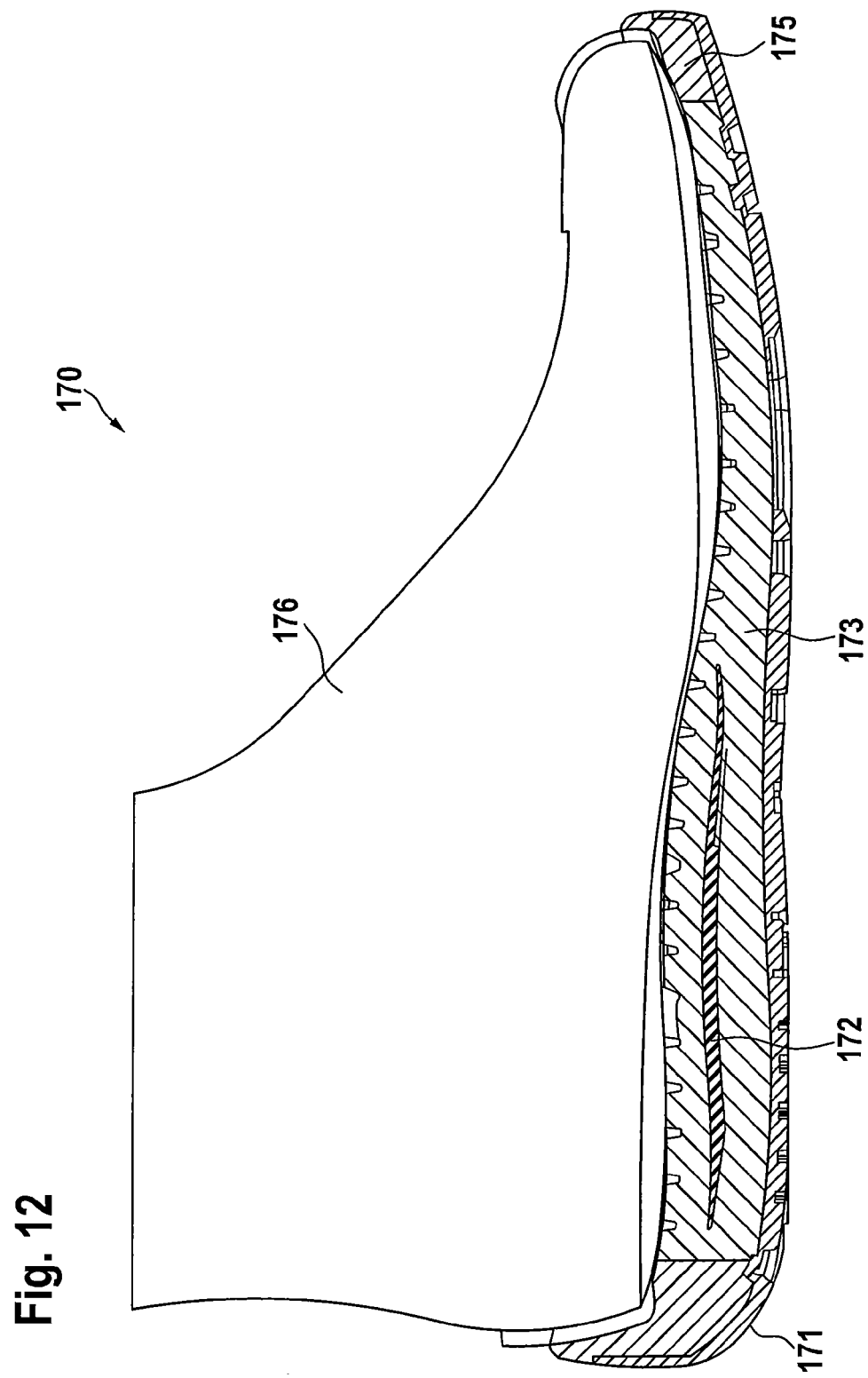

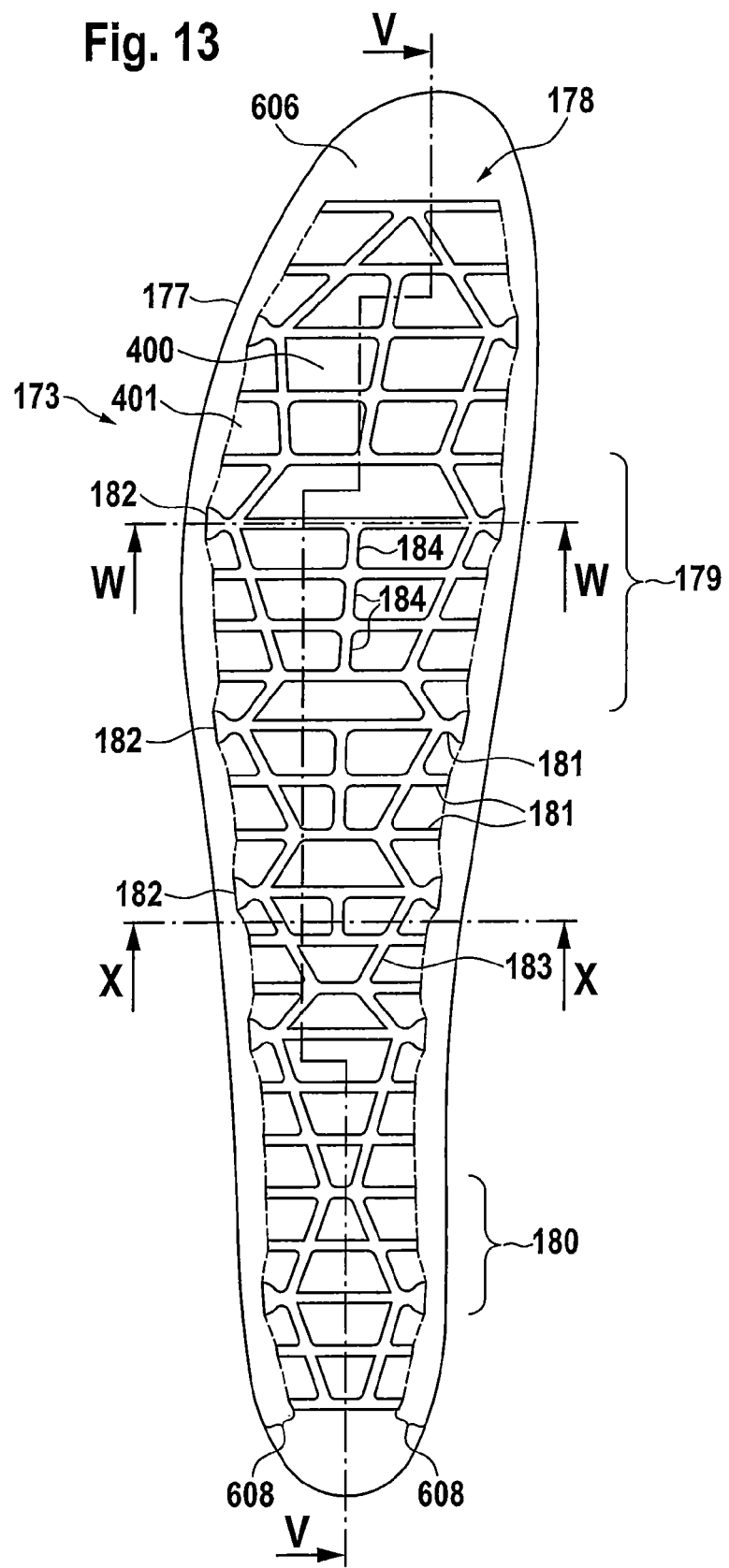

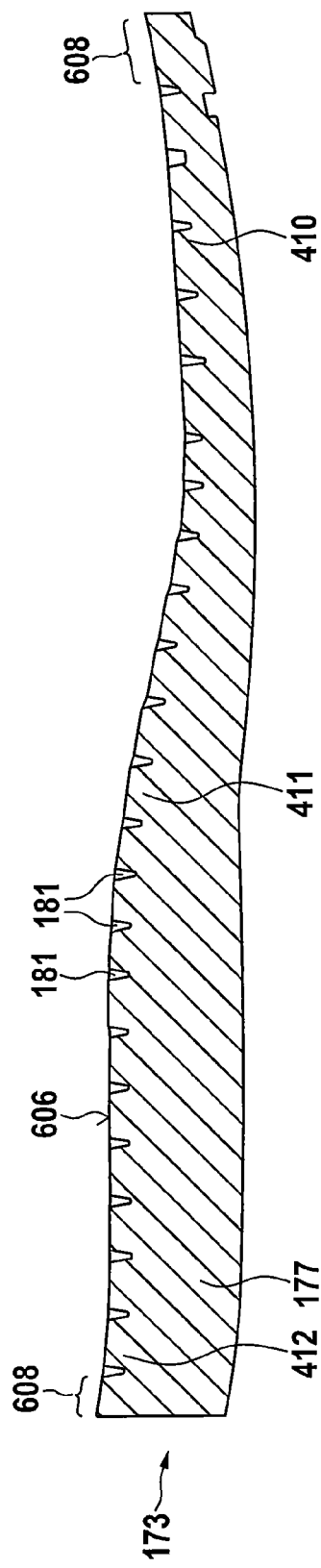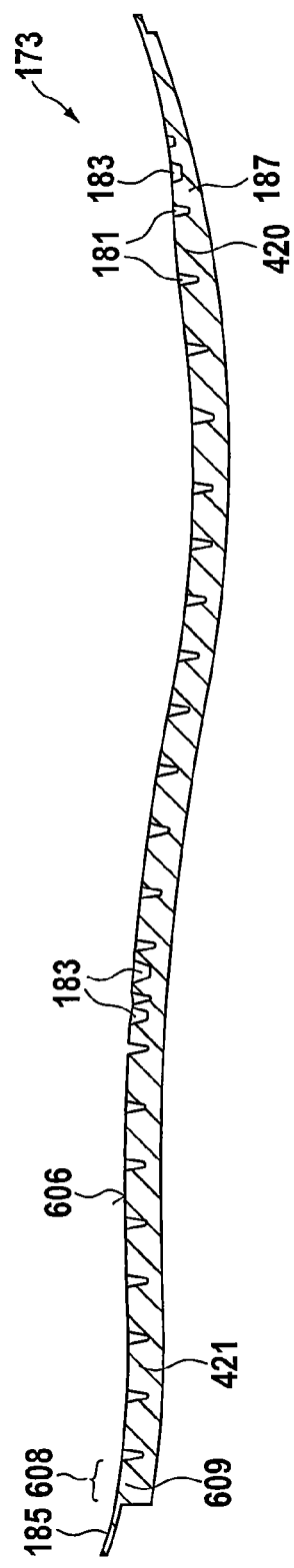
Fig. 14
Fig. 15
(V - V)

(W-W)

(X-X)

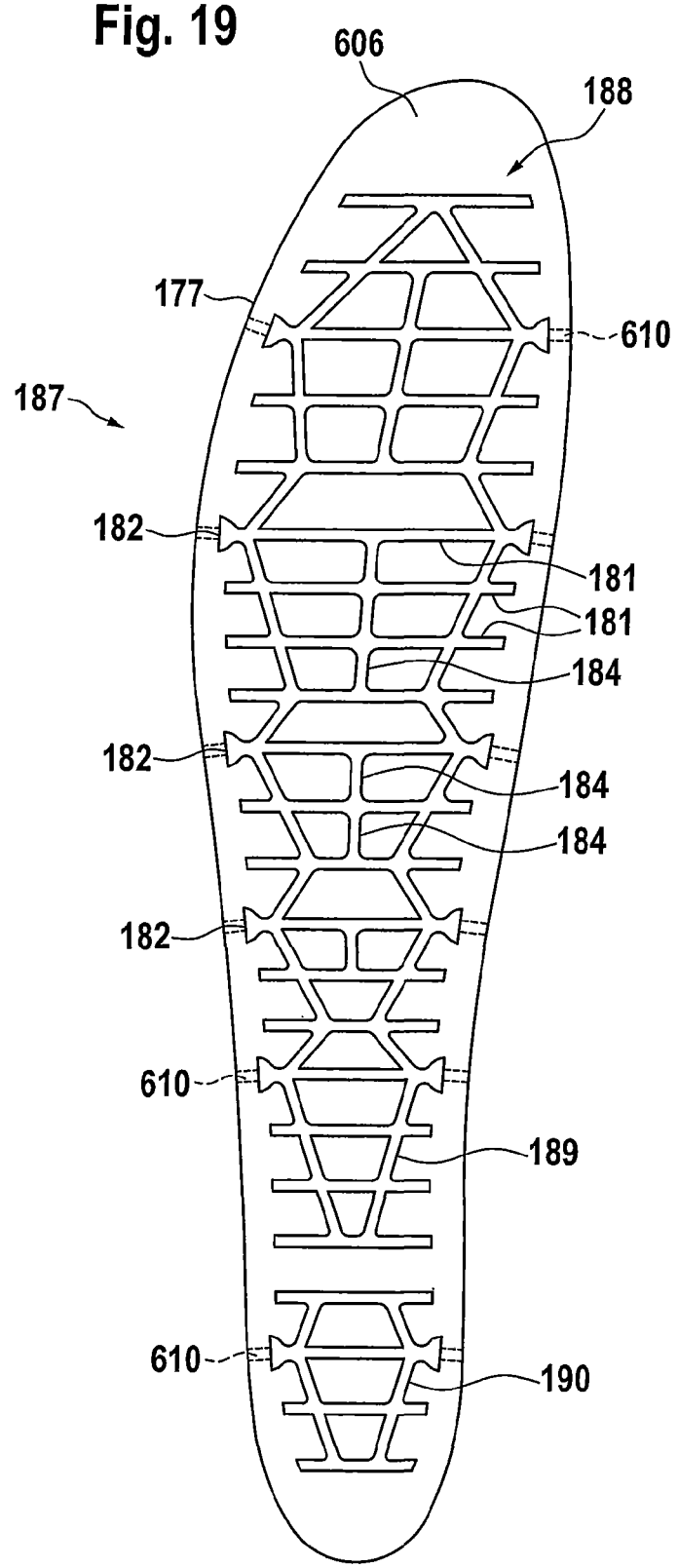

WATERPROOF, BREATHABLE SHOE AND METHOD FOR MANUFACTURING A SHOE

The invention is directed to a waterproof, breathable shoe, and to a method for manufacturing a shoe.

It is known in the art to equip shoes with breathable soles. An example of such a breathable sole is known from EP 1 033 924 B1. Therein, a safety shoe is described, whose outsole comprises horizontal air vents at the sides of the sole for ventilation. The shoe is also provided with a honeycomb structure lying within the outsole and a perforated insole, such that water vapour is discharged from the inside of the shoe through these vapour permeable layers and the horizontal air vents to the outside atmosphere. If the shoe is not worn in totally dry conditions, such as a paper mill, then a waterproof breathable membrane may be provided below the insole.

It is an object of the invention to provide a shoe that provides waterproof protection all around the foot (with the exception of the foot insertion region), at the same time exhibiting high breathability and comfort all around the foot and in particular in the sole area, and being suitable for a wide variety of usage scenarios, including summer and winter use. It is also an object of the invention to provide a method for manufacturing a shoe which is waterproof, highly breathable and comfortable and suitable for a wide variety of usage scenarios.

According to an aspect of the invention, there is provided a waterproof, breathable shoe according to the features of claim 1.

In particular, in an aspect of the invention, there is provided a waterproof, breathable shoe, which comprises an upper assembly with an upper portion including a breathable outer material and with a bottom portion, said upper assembly comprising a waterproof, breathable functional layer arrangement extending over said upper portion and said bottom portion. The shoe further comprises a ventilating sole element having a structure or material allowing for air flow through it, said ventilating sole element being attached to said upper assembly, wherein at least one lateral passage extends from said structure or material through a side wall of said ventilating sole element, said lateral passage allowing for communication of air between said structure or material of said ventilating sole element and an outside of said ventilating sole element.

The functional layer arrangement may be comprised of one, two or more functional layer pieces, also referred to as membrane pieces, as the terms functional layer and membrane are used interchangeably herein. In case two or more membrane pieces are present, the membrane pieces are arranged side by side (potentially having some overlap), joined and sealed together to yield a waterproof, breathable functional layer arrangement. The functional layer arrangement is shaped substantially like the inner shape of the upper assembly surrounding the wearer's foot. The membrane pieces may each be laminated with one or more textile layers, such that the functional layer arrangement may be an arrangement of one, two or more functional layer laminates.

In a particular embodiment, said upper portion comprises a waterproof, breathable upper functional layer laminate having a lower end area, and said bottom portion comprises a waterproof, breathable bottom functional layer laminate having a side end area. The side end area of said bottom functional layer laminate and the lower end area of said upper functional layer laminate are bonded together with a waterproof seal being provided at the bond. The upper functional layer laminate and the bottom functional layer laminate form the waterproof, breathable functional layer arrangement.

The shoe according to the invention allows for an excellent protection against water entering the inner part of the shoe containing the foot, while ensuring high breathability through the upper as well as the sole of the shoe. The waterproof upper assembly, comprising the functional layer arrangement, e.g. in the form of a bootie or a three dimensional sock or in the form of the upper functional layer laminate and the bottom functional layer laminate, whose connection is sealed in a waterproof manner, ensures that no water enters the shoe from the outside, such that the wearer will not get wet feet in any wet conditions, e.g. rainy, muddy or snowy environments. The functional layer arrangement extends over substantial parts of the upper portion and the bottom portion of the upper assembly, particularly it extends over substantially the entire inner extension of the upper assembly. In this way, the upper assembly forms a waterproof bag around the wearer's foot, which allows for a 360° water protection for the wearer's foot, i.e. it completely surrounds the wearer's foot (with the exception of the shoe opening for receiving the wearer's foot, of course). The functional layer arrangement may be arranged towards the inner space of the upper assembly, in particular it may form at least substantial parts of the inner surface of the upper assembly.

The functional layer arrangement, particularly, the waterproof, breathable upper functional layer laminate ensures that no water enters the shoe from the outside through the outer material. At the same time, it is ensured that the upper portion is breathable and therefore helps in transporting water vapour from the inside of the shoe to the outside. Water vapour can be effectively transferred out of the shoe both via the upper portion of the upper assembly as well as the bottom portion of the upper assembly, the structure or material of the ventilating sole element and the lateral passage. Accordingly, a high level of water vapour discharge is achieved, particularly because air flow can take place in the lateral passage and the ventilating sole element in a static environment, e.g. when sitting or standing. This flow may be enhanced by the movement of the shoe when the wearer is walking or running. Two favourable effects take place during a walking or running motion, each of which is predominantly associated with one of the two phases of the gait cycle, namely the actual stance phase and the shoe swinging phase in between the actual steps. During the shoe swinging phase, an air flow in and out of the ventilating sole element through the at least one lateral passage is generated, with the lateral passages being very suitable to develop such air flow therein. This is particularly the case, because the outside end of the lateral passage is in air connection with the environment during all phases of the walking motion, allowing for water vapour discharge along with the air discharge at all times. The bending of the shoe sole during the walking or running motion and additionally the application of the wearer's weight on the ventilating sole element during the stance phase also forces air flow within the ventilating sole element and the at least one lateral passage. The air pushed out of the ventilating sole element takes water vapour from the inside of the shoe with it. The ambient air coming back into the ventilating sole element can then be recharged with water vapour.

Any water, dirt, soil etc., that may enter through the passages will be discharged through those passages over time by gravity and movement of the shoe. Therefore, there will be no build-up of these undesirable materials over time.

The functional layer lying above the ventilating sole element will therefore also not be affected e.g. by such dirt particles.

The term breathable material refers to materials that are water vapour permeable. They may also be air permeable. In a particular embodiment, the functional layer arrangement, in particular the upper functional layer laminate and the bottom functional layer laminate are waterproof and breathable, but not air permeable. The term breathable shoe refers to a shoe through which water vapour in the form of sweat may pass from the inside of the shoe to the outside.

The term ventilating sole element is not intended to imply that the ventilating sole element comprises an active, self-propelled mechanism for ventilating the sole. Instead, the structure of the ventilating sole element allows for an airing or ventilating of the ventilating sole element in a static environment and also particularly due to the wearer's motion during use of the shoe. Accordingly, the ventilating sole element may also be referred to as ventilated sole element or ventilation sole element. It is explicitly pointed out, however, that the invention does not rule out that an active mechanism, such as a self-propelled pump or the like, is present in addition to the particular inventive structure.

A shoe according to the invention always features a sole or sole assembly which comprises at least the ventilating sole element. The ventilating sole element may be the only sole element in the sole assembly. In that case its lower surface comes into contact with the ground during walking or standing, i.e. it also functions as an outsole or outer sole. The sole or sole assembly may comprise further layers or elements other than the ventilating sole element, e.g. a separate outsole, which may form at least a part of the bottom of the sole or sole assembly that comes into contact with the ground. The bottom or lower surface of the sole or sole assembly may contain a tread, i.e. a profile or contour or pattern in a vertical and/or horizontal direction but does not have to. The sole or sole assembly may be attached to the upper assembly of the shoe in a number of ways, including but not limited to moulding or injection moulding the sole or parts of the sole assembly on to the upper assembly and gluing parts or all of the sole on to the upper assembly.

Said ventilating sole element may be made up of one part or may comprise several parts which jointly form the ventilating sole element. According to a particular embodiment, said ventilating sole element comprises at least an inner ventilating sole element having a structure or material allowing for air flow through it and a surrounding sole element, said surrounding sole element surrounding said inner ventilating sole element at least laterally and being attached to said upper assembly and to a lateral surface of said inner ventilating sole element, preferably by injection moulding. In this way, a functional separation of the ventilating sole element may be achieved, with the surrounding sole element at least contributing to the attachment of the inner ventilating sole element to the upper assembly.

The side wall of the ventilating sole element extends from the structure or material of the ventilating sole element to the outside of the sole or the ambient air. In the case of the ventilating sole element being made up of an inner ventilating sole element and a surrounding sole element, the side wall of the ventilating sole element extends from the structure or material of the inner ventilating sole element to the outside of the sole or the ambient air, i.e. the outer lateral surface of the surrounding sole element. The inner lateral surface of the surrounding sole element at least partially faces and contacts the lateral surface of the inner ventilating element.

According to a further embodiment, the ventilating sole element comprises a plurality of lateral passages.

According to a further embodiment, said at least one lateral passage extends from the structure or material of the inner ventilating sole element, allowing for air flow through it, through a side wall of the inner ventilating sole element and through said surrounding sole element, said lateral passage allowing for communication of air between said structure or material of said inner ventilating sole element and an outside of said surrounding sole element. Describing the path the other way around, the passage passes from the outer lateral surface of the surrounding sole element through the surrounding sole element and the side wall of the inner ventilating sole element to the structure or material of the inner ventilating sole element allowing for air flow through it. The passage in the surrounding sole element forms the last piece in the water vapour discharge chain. The water vapour, generated by the wearer's foot perspiration, reaches the lateral outside of the sole of the shoe, that is the ambient air, via the bottom functional layer laminate, the inner ventilating sole element and the at least one lateral passage. A path for water vapour to be discharged effectively via airflow and gradient driven diffusive forces is established.

The lateral passages may be placed anywhere in the side wall of the ventilating sole element. Particularly, they may be situated in the back (heel region) of the ventilating sole element and/or in the front (toe area). This allows the air with the water vapour to be more easily pushed through the ventilating sole element and out of the lateral passages due to the rolling motion of the sole assembly during walking. When the ventilating sole element comprises an inner ventilating sole element and a surrounding sole element, as described above, the lateral passages may also be placed anywhere in the side wall of the inner ventilating sole element and the surrounding sole element.

According to a further embodiment, the ventilating sole element may comprise at least one lateral passage extending straight through the ventilating sole element from the outside on one side to the outside of the other side. Such lateral passage(s) may e.g. be created by using a laser or a drill to pass right through the ventilating sole element.

According to a further embodiment, the ventilating sole element does not comprise vertical passages extending through the ventilating sole element from the bottom side thereof to an upper side thereof. Not having vertical passages allows for a high flexibility of the sole design, particularly for the provision of stable, waterproof and non water vapour permeable sole layers across the complete extension of the underside of the foot. This may provide high comfort to the wearer, because the load bearing of the sole may be distributed over the whole area of the sole, such that less stiff materials may be used. The sole may feel more uniform and therefore more comfortable for the user than soles with vertical holes. An additional advantage is that a dirt/soil/mud/sand build-up on the underside of the sole does not compromise the water vapour discharge capability of the shoe. The lateral passages ensure breathability of the shoe in a wide variety of usage scenarios, in particular also in highly adverse usage environments.

In a further embodiment however, the ventilating sole element comprises at least one vertical passage in addition to the at least one lateral passage allowing for additional air flow. This also allows for additional drainage of liquids and/or dirt from the ventilating sole element.

According to a further embodiment, said ventilating sole element, in particular said inner ventilating sole element, has a channel structure. This channel structure forms said structure allowing for air flow through it, which is provided in the ventilating sole element, particularly in the inner ventilating sole element. Such a ventilating sole element comprising a channel structure provides for an effective collection and transport of air and moisture resulting from the water vapour being discharged via diffusion through the breathable bottom portion of the upper assembly which is positioned above the ventilating sole element, when the completed shoe comprising the ventilation sole element is worn.

According to a further embodiment, said ventilating sole element comprises a side wall, a channel structure is formed in the ventilating sole element, and said channel structure comprises a plurality of channels. These channels may be either transverse or longitudinal channels. At least some of the channels comprise air and moisture discharging ports. At least one of the channels is a peripheral channel, i.e. a channel that lies on the periphery or circumference of the ventilating sole element, but inside the side wall. This peripheral channel intersects with a plurality of the other channels. The channels and the side wall form functional pillars. The ratio of the top surface area of the functional pillars ($A_p$) to the top surface area of the channels ($A_c$) of the channel structure is between 0.5 and 5.0.

The peripheral channel does not have to be closed or run along the entire circumference of the ventilating sole element. The first kind of functional pillars is surrounded completely by channels, e.g. by two transverse channels and the left and right portions of a peripheral channel or by two transverse channels, one longitudinal channel and one peripheral channel or by two transverse channels and two longitudinal channels. The second kind of functional pillars is formed by respective upper portions of the ventilating sole element surrounded by the inner end of the side wall and by the channel portions that are located closest to said inner end of the side wall. Such second kind of functional pillars can for example extend in longitudinal direction of the shoe between two adjacent transverse channels and in a transverse direction between the inner end of the side wall and the adjacent portion of the peripheral channel. The side wall extends between the outer surface of the side wall and an imaginary line drawn between those channel walls or channel ends or channel ports which are located closest to the outer surface of the side wall. The side wall does not have to be thick or load-bearing. It provides a boundary of the ventilating sole element to the outside of the sole.

The channel structure may be formed in the top or upper part of the ventilating sole element, i.e. starting at the upper surface facing towards the upper assembly and extending some way down into the ventilating sole element. The channel structure may also be formed throughout the ventilating sole element or in any other part thereof.

While many aspects and embodiments regarding the channel system have been and will be described with respect to the ventilating sole element in general, the embodiments and advantages that are described herein relate equally to a channel system that is provided in an inner ventilating sole element being surrounded by a surrounding sole element. In this case, the side wall of the ventilating sole element comprises the side wall of the inner ventilating sole element and the surrounding sole element. In this scenario, it is possible that the peripheral channel may be removed somewhat further from the lateral outside of the ventilating sole element. However, being the channel closest to the lateral outside of the ventilating sole element, it is still referred to as peripheral channel.

All or a subset of the air and moisture discharging ports are connected to the outside of the ventilating sole element by lateral passages passing through the side wall of the ventilating sole element, such that air can pass from the channel structure of the ventilating sole element to the outside of the ventilating sole element and vice versa. In case the ventilating sole element comprises an inner ventilating sole element and a surrounding sole element, the lateral passages connect the air and moisture discharging ports to the outside of the ventilating sole element through the side wall of the inner ventilating sole element and through the surrounding sole element. In order to distinguish these two portions of the lateral passages, the portions of the lateral passages that extend through the inner ventilating sole element are also referred to as lateral openings and the portions of the lateral passages that extend through the surrounding sole element are referred to as lateral passage portions.

The functional pillars that are formed by the channel structure and the side wall of the ventilating sole element serve the first purpose of a good distribution of the pressure as imposed on the ventilating sole element structure by the underside of the foot, and the second purpose of providing an efficient air and moisture collecting and transferring channel structure formed around the functional pillars to allow for good ventilation.

Moreover, the ventilating sole element having a channel structure, as described above, has good flexing properties and is wear resistant. It can easily be manufactured, particularly in one moulding step, wherein the outer shape of the ventilating sole element including the channel structure in the ventilating sole element is formed by the moulds. The ventilating sole element can be cast, injected or vulcanized.

By the relationship of the top surface area of the pillars to the top surface area of the channels being between 0.8 and 5.0 a good compromise between comfort, durability, supporting and pressure distribution properties on the one hand and the ventilation effect on the other is attained.

According to a further embodiment, the ratio of the top surface area of the pillars to the top surface area of the channels lies between 1.0 and 3.0, and more particularly between 1.4 and 2.2.

The inventors have discovered that a particularly good compromise between supporting and pressure distribution properties, leading to a high degree of comfort for a wearer, and ventilation is attained when the top surface area formed by the pillars is equal to or greater than the top surface area defined by the channels. A particularly good compromise is attained when this ratio is between 1.0 and 3.0 and more particularly between 1.4 and 2.2.

This relationship can better be understood by having a look at the extremes: From a comfort point of view no channels in the ventilating sole element at all are desired. From a ventilation point of view the open space in the ventilating sole element that is created by the channel structure, should be as large as possible.

On the other hand the width of the channels is not arbitrary. Channels which are too narrow are not suitable, since they do not allow for enough collection and transport of air and moisture. Channels that are too wide do not feel comfortable because the wearer will feel the edges of the pillars. The wider the channels are, the more their edges will imprint on the above layers, in particularly the functional layer at the bottom.

Taking all these points into account, the inventors of the present application have discovered that the relationship as described above is particularly advantageous.

According to a further embodiment of the invention, the functional pillars have a minimum upper edge length of 4 millimeters. All edges should be at least 4 mm long, both in the longitudinal and in the transverse direction.

According to a further embodiment of the invention, at least some of the lateral ends of said channels are formed as air and moisture discharging ports.

The channels may follow the shape of the ventilating sole element. At least the bottom surface of the transverse channels may be substantially horizontal, when seen in the main direction of the transverse channels. In this case the channel depth varies throughout the ventilating sole element. In another embodiment the bottom surface of the transverse channels is inclined downwards towards the centre of the ventilating sole element. The channels may also be inclined downwards towards the outside of the ventilating sole element.

According to a further embodiment of the invention, the width of the channels at the upper side of the ventilating sole element lies between 2 and 5 millimeters, particularly between 2 and 3.5 millimeters.

According to a further embodiment of the invention, the channel structure has a first portion with a first channel width, and a second portion with a second channel width. By providing such portions with different channel widths different flexing and bending conditions occurring in such portions can be matched.

In a further embodiment of the invention such portions having a different channel width can be positioned under a heel portion of the foot and/or a forefoot portion of the foot, particularly a ball portion of the forefoot.

According to an embodiment of the invention, the channel width in such special portions can be smaller than the channel width in the other portions of the channel structure.

According to a further embodiment of the invention, the distances between adjacent transverse channels in the forefoot portion can be smaller than in the heel portion, in order to increase the effect of actively moving air and moisture to the outside. In the forefoot portion of the ventilating sole element the flexing that occurs is greater than in the heel portion. Furthermore, the foot produces more sweat in this region than e.g. in the heel region. By such flexing the cross section of the channel is reduced and widened again which forces the air out of such channels. By providing a higher transverse channel density in the forefoot portion, such active effects can be increased which leads to a further improved ventilation effect.

The shape of the channels can be of different kinds. According to a further embodiment of the invention, the channels comprise channel walls and a channel bottom, wherein the distance between the walls of a channel, when seen in the sectional view, increases in an upwards direction. Such channel form provides for a good air and moisture collecting and transport function.

According to a further embodiment of the invention the channel bottom is formed as a substantially horizontal plane. By the provision of this feature, the channels, when seen in a sectional view, have an essentially isosceles trapezoid shape and, more particularly the form of an isosceles trapezoid.

According to a further embodiment of the invention, oblique bottom transition faces are provided between the substantially horizontal channel bottom and the channel walls.

In an alternative embodiment of the present invention, the channel bottom has a rounded, concave form, giving the channels a U-like shape, when seen in a sectional view.

The channels may be formed in a way that they do not have sharp corners and/or edges, such as corners or edges having acute angles. Due to the lack of 90° angles in the embodiments of the channel bottom, air and moisture cannot be trapped in any corners where no air/moisture movement can take place, as may be the case in rectangular shaped channels.

None of the above described channel forms are prone to mechanical failure, e.g. in the form of breakage as is the case for example with a plane V-shaped channel. Furthermore, due to the width of the channel bottoms in comparison to a simple V-shape the channels can take up far more air and moisture.

Any sharp edges reduce airflow due to friction and turbulence created and induce cracks and failure of the sole. This is particularly the case at the intersections of the channels. In a preferred embodiment at least the vertical edges of the channels are rounded, preferably having a radius of between 0.25 and 5 mm.

The horizontal edges of the channel/pillar tops may be rounded in a further embodiment, preferably having a radius between 0.5 and 5 mm. This leads to less imprinting on the layers in the shoe above the ventilating sole element and a more comfortable feeling for the wearer.

According to a further embodiment of the invention, one continuous peripheral channel is provided extending from a front portion to a rear portion of the ventilating sole element.

By such single continuous peripheral channel, a good collection and transport of air and moisture can be attained.

According to an alternative embodiment, at least two peripheral channels are provided extending over different portions of the ventilating sole element. Such peripheral channels can intersect with each other or they can be formed separately from each other. By the provision of at least two peripheral channels, a good air and moisture collecting and transporting function can be attained as well.

According to a further embodiment of the invention, the peripheral channel runs in a zigzag line, seen from a front section to a rear section of the ventilating sole element. By using such a zigzag shaped peripheral channel, a particularly efficient transport of air and moisture to the air and moisture discharging ports can be achieved.

The zigzag form of the peripheral channel can be such that the outer points of such zigzag peripheral channel intersect with those transverse channels the ends of which are formed as air and moisture discharging ports, at a position just inside of those air and moisture discharging ports.

The channel structure as a whole, that is the arrangement of the various channels to each other is such that in a preferred embodiment, the maximum length that a water molecule has to travel from the inside of the ventilating sole element to the nearest air and moisture discharging port is 60 mm.

According to a further embodiment of the invention, the air and moisture discharging ports have a greater depth, and in addition or instead they can be broadened as compared to the other channel portions. Thus, enough air and moisture can be received and transported further outwards by the air and moisture discharging ports.

As described above, the lateral passages of the ventilating sole element may be connected to the air and moisture discharging ports of the ventilating sole element. These lateral passages do not have to be present in the prefabricated ventilating sole element, i.e. the ventilating sole element as it is placed in the shoe or semi-manufactured product, although this is of course also possible. Such lateral passages can be drilled or lasered or punctured and/or melted, e.g. with a hot needle into the ventilating sole element in a subsequent manufacturing step. During this step an increased depth or broadness of the ports allows for a much more reliable, safer and easier connection process of the passages to the channel system of the ventilating sole element.

According to a further embodiment of the invention the upper surface of the ventilating sole element has a curved form with a lower front region and a higher rear portion, so as to accommodate the underside of the foot to be supported. The shape of the ventilating sole element follows the shape of the anatomical last, which is ergonomically customized to the feet to be supported by the ventilating sole element.

In order to make the sole assembly light weight it is preferred to use low density polyurethane (PU) e.g. having a density of 0.35 g/cm3 for the ventilating sole element.

Such a polyurethane ventilating sole element has high stability to support/transfer at least a portion of the weight of the user during use, such as during walking, while having some flexibility in order to enhance the wearer's comfort during walking. Depending on the preferred use of the shoe, a suitable material can be chosen. Examples of such material are Elastollan from the company Elastogran Gmbh, Germany. This material is preferred due to its low density. Alternatively for injection moulding the ventilating sole element, TPU (Thermoplastic Polyurethane), EVA (Etylene Vinyl Acetate), PVC (Polyvinyl Chloride) or TR (Thermoplastic Rubber), etc. may be used.

It is further preferred to use PU on a polyethylene (PE) basis for the ventilating sole element.

It is further preferred to use a material that is not too hard for the ventilating sole element for shock absorption reasons. Thus, a polyurethane material with a shore A hardness between 38 and 45 is preferred for the ventilating sole element. Shore hardness is measured by the durometer test. A force is applied onto a spot of the polyurethane, whereby the force creates an indentation. The time taken for the indentation to disappear is then measured.

According to another embodiment of the invention the material of the ventilating sole element is porous, such that it has a high rate of water vapour diffusion through it. This enhances the ventilating effect of the ventilating sole element.

In a further embodiment of the invention the depth of the channels is less than 20 mm, preferably between 2 and 10 mm. This avoids the wearer of the shoe experiencing a rolling movement when walking which would badly influence the comfort sensed by the wearer and which would effect a tilting torque on the functional pillars which over time may cause breakage of the functional pillars.

The functional pillars formed by the channel structure can have different sizes, especially length, depth and surface area, that can vary across the surface of the ventilating sole element.

The functional pillars can also have different shapes, when seen in a plan view, for example a rectangular shape, a triangular shape or a rounded shape.

The inventors have found out that there is a relationship between the depth of the channels and the surface area of the functional pillars facing the upper assembly above. The less deep the channels are the smaller the surface area can be. A typical value of a functional pillar surface is 0.6 to 1 $cm^2$.

According to a further embodiment, said ventilating sole element comprises a container element having a bottom part and a side wall so as to form an inner space of said container element, wherein said inner space is filled with a filler material allowing for air flow through it. Instead of a filler material allowing for air flow through it, there may also be provided a filler structure allowing for air flow through it, such as a channel structure. The container element forms a tub for receiving the filler material or filler structure allowing for air flow through it.

According to a further embodiment, the filler structure or material is a three-dimensional spacer. The three-dimensional spacer may be configured so that the structure or material maintains a spacing between layers situated beneath it and above it, in particular between the lower portion of the upper assembly and the bottom part of the container element. In this way, the air flow through the structure or material is retained. Particularly, such a spacer structure or material may allow for a very low air flow resistance, while ensuring high stability of the combination of the container element and the spacer structure or material. In another embodiment, the spacer structure or material is made to be at least partially elastic. Because of this, the walking comfort of the shoe is increased, as the spacer structure or material allows for cushioning and an easier rolling process during the stance phase of the gait cycle. In another embodiment, the spacer structure or material is designed so that during maximal stress with the maximum weight of the shoe user to be expected corresponding to the shoe size in the corresponding shoe, it yields elastically at most to the extent that, even during such maximum stress, a significant part of the air flow of the spacer structure or material is still retained. The spacer may be made of materials such as e.g. polyester, polyolefins or polyamides.

In another embodiment, the air permeable spacer has a flat structure forming a first support surface and a number of spacer elements extending away from the flat structure at right angles and/or at an angle between 0 and 90°. The ends of the spacer elements lying away from the flat structure then together define a surface by means of which a second support surface, facing away from the flat structure, can be formed. In another embodiment, the spacer elements of the spacer are designed as knobs, the free knob ends together forming the second support surface mentioned. In another embodiment, the spacer has two flat structures arranged parallel to each other, the two flat structures being joined to each other via the spacer elements in a manner allowing for air flow through and between them and holding them spaced apart from each other. Each of the flat structures then forms one of the two support surfaces of the spacer. All the spacer elements need not have the same length in order to make the two support surfaces equidistant over the entire surface extent of the spacer structure. For special applications, it can be advantageous to make the spacer have different thickness in different zones or at different locations along its surface extent, in order to form a surface anatomically compatible with the foot. The spacer elements can be formed separately, i.e., not joined to each other between the two support surfaces. However, there is also the possibility of allowing the spacer elements to touch between the two support surfaces and the possibility of joining them at at least some of the contact sites, for example, with an adhesive or by the fact that the spacer elements consist of materials that can be welded to each other, such as a material that becomes adhesive from heating. The spacer elements can be rod- or thread-shaped individual elements or sections of a more complex structure, for example, a truss or lattice. The spacer elements can also be connected to each other in a zigzag or in the form of a cross-grating. In another embodiment, the spacer structure or material is formed by two air-permeable flat structures arranged substantially parallel to each other, which are joined to each other and spaced apart by means of mono- or multifilaments in a manner allowing for air flow through and between them.

In another embodiment the filler material or structure is porous.

The filler structure or material may also be discontinuous in an additional embodiment. According to a further embodiment, the filler comprises a number of filler elements, which are spherical in shape, e.g. filler balls. These filler elements are received by the container element. The filler elements themselves may be made of a material which does not allow for an air flow or water vapour to pass through it. However, with the filler elements having voids therebetween, an overall structure may be formed which does allow for air flow and thus water vapour transport through it. The filler elements may be selected based on their stability and comfort characteristics. The air flow through the filler structure may be adjusted by adjusting the size of the filler elements.

According to a further embodiment, the filler structure is at least partly comprised of channels. The channel structure allows for a distributed air connection between the underside of the lower portion of the upper assembly and at least portions of the side wall and/or bottom part of the container element. Water vapour can pass from the inside of the shoe to the channel structure provided inside the container element through the bottom functional layer laminate.

Air communication between the filler structure or material and the outside of the container element is established through the at least one lateral passage, which extends through the side wall of the container element, such that water vapour can pass to the outside of the container element together with the air flow out of the container element. The at least one lateral passage may also extend through the filler structure or material insofar that air flow from the filler structure or material to the outside of the container element is established. The container element may also be provided with openings in its bottom part.

It is pointed out that the side wall and/or bottom part of the container element does not have to be load bearing and/or be a structurally crucial part, but can also merely serve as a border structure between the inside and the outside of the container element in order to help a functional separation of the individual components and the manufacturing of the shoe.

The inner ventilating sole element may be the container element filled with the air flow permitting material or structure. In this case, the side wall of the ventilating sole element may be formed by the side wall of the container element and the surrounding sole element surrounding the inner ventilating sole element.

In a separate embodiment the structure or material allowing for air flow through it may be inherently stable, such that no container element may be necessary to support this structure or material. It may be directly attached to the bottom of the upper assembly. It may also be wrapped at least on its lateral surface with a tape, which may be attached to the upper assembly, e.g. by sewing or gluing. The tape may serve the purpose of preventing surrounding sole material or outer sole material from entering the open structure during injection or else may prevent other fluid material from entering which is used to connect the structure or material to the upper assembly.

According to a further embodiment, said side end area of said bottom functional layer laminate is attached by a sewn seam to said lower end area of said upper functional layer laminate. Said seam may be sealed by sealing adhesive, the application of a waterproof seam tape or by fluid material of the surrounding sole element having penetrated into and around said sewn seam during injection moulding of the surrounding sole. The penetrated surrounding sole material, i.e. the penetrated material of the surrounding sole element, allows for a tight sealing between the two laminates and for the provision of a waterproof upper assembly.

In a further embodiment, said inner ventilating sole element is positioned below said bottom portion of the upper assembly, such that an upper perimeter of said inner ventilating sole element is located within said bond, in particular within said sewn seam. In other words the inner ventilating sole element is placed some distance away from the bond towards the middle of the shoe. In particular, said upper perimeter may have a minimum distance from said sewn seam, particularly 1 mm to 4 mm, more particularly 2 mm to 3 mm. In this way, the surrounding sole material may penetrate freely into and around the sewn seam. The injected or moulded on surrounding sole material reaches the bond between the functional layer laminates and seals it. The inner ventilating sole element may be attached to the bottom portion of the upper assembly before said surrounding sole material is applied.

According to a further embodiment, a lower portion of said breathable outer material allows for penetration of surrounding sole material therethrough, said waterproof seal being formed at least partially by surrounding sole material having penetrated through said lower portion of said breathable outer material to said upper functional layer laminate, said bottom functional layer laminate and said sewn seam. The surrounding sole element seals the upper assembly. It accounts for a waterproof seal between the upper portion and the bottom portion of the upper assembly.

According to a further embodiment, said lower portion of said breathable outer material comprises a netband, with the side end area of said bottom functional layer laminate being attached by said sewn seam to said netband, particularly to a lower end area of said netband, and to said lower end area of said upper functional layer laminate, with said surrounding sole material having penetrated through said seam. The netband provides a highly efficient way of ensuring a high level of sole material penetration to the sewn seam. The netband may be positioned substantially only horizontally at the underside of the upper assembly or substantially only vertically at the side portions of the upper assembly. It may also be positioned partly horizontally and partly vertically, wrapping around the corner region of the upper assembly between the underside and the side portions. The netband and the remaining end of the breathable outer material may be positioned end-to-end or may have an overlap or may both be folded over at the connection point. Accordingly, the netband may also in part be positioned laterally to the remainder of the breathable outer material.

According to a further embodiment, said surrounding sole element is formed by a material moulded or injected on at least parts of a lower portion of said upper assembly and onto said lateral surface of said inner ventilating sole element. In this way, the upper assembly and the inner ventilating sole element are permanently fixed with respect to each other. In exemplary embodiments, the provision of the surrounding sole element may be achieved in one of the following two manners. In the first alternative, a first injection-moulding step provides for a localized application of surrounding sole material onto the upper assembly and the inner ventilating sole element resulting in an attachment of the two components. This first injection-moulding step may also provide for the sealing between the upper functional layer laminate and the bottom functional layer laminate, as described above. The surrounding sole element may be completed in a second injection-moulding step, which also provides for the sealing if the sealing has not been achieved in the first injection-moulding step. In the second alternative, only one injection-moulding step is performed, through which the attachment between the upper assembly and the inner ventilating sole element, the sealing between the upper functional layer laminate and the bottom functional layer laminate and the forming of the entire surrounding sole element is achieved. The surrounding sole element may therefore perform three functions, namely attaching the inner ventilating sole element to the upper assembly, ensuring airflow through the provision of the at least one lateral passage, and sealing the connection region between the upper portion and the bottom portion of the upper assembly.

According to a further embodiment, the shoe comprises a surrounding connection element, the surrounding connection element surrounding a lower lateral portion of said upper assembly and being attached to said upper assembly and to an upper lateral end portion of the ventilating sole element, thus effecting an attachment between the upper assembly and the ventilating sole element. The upper lateral end portion of the ventilating sole element may comprise a lateral end portion of the upper surface of the ventilating sole element and/or an upper end portion of the lateral surface of the ventilating sole element, i.e. that portion or those parts of the ventilating sole element that lie above the lateral passages. The surrounding connection element may be comprised of injection-moulded material. Particularly, said surrounding connection element may be formed by a material moulded or injected on at least parts of a lower portion of said upper assembly and onto said upper lateral end portion of the ventilating sole element. The surrounding connection element may also form said waterproof seal. Above described options for closing the upper assembly (e.g. via the sewn seam) and sealing the same with the surrounding sole material equally apply to the surrounding connection element, with the material of the surrounding connection element being present instead of the surrounding sole material. Particularly, the material of the surrounding connection element may be injection-moulded through a netband, which forms a lower portion of said breathable material on the lateral sides of the upper assembly, and onto the bottom functional layer laminate, the upper functional layer laminate and the seam between them. The surrounding connection element allows for the attachment between the ventilating sole element and the upper assembly affecting only an upper lateral end portion of the ventilating sole element. In this way, a one-piece ventilating sole element may extend across the entire lateral dimension of the sole. In other words, no surrounding sole element is needed, such that the whole lateral dimension of the sole may be used for the design of a one-piece ventilating sole element.

According to a further embodiment, said ventilating sole element is glued to said upper assembly in a breathable way.

According to a further embodiment, said bottom functional layer laminate is a two layer laminate comprising an upper supporting textile layer and a lower breathable and waterproof functional layer, also referred to as bottom membrane or lower membrane. This embodiment is preferable for use in shoes with injected soles. The injected material may penetrate directly onto the lower membrane.

According to a further embodiment, said bottom functional layer laminate is a two layer laminate comprising an upper breathable and waterproof functional layer, and a lower supporting textile layer. This embodiment is preferable for use in shoes with cemented/glued soles.

According to a further embodiment, said ventilating sole element comprises a circular lip protruding from said ventilating sole element. According to a further embodiment, said inner ventilating sole element comprises a circular lip arranged in the vicinity of an upper circumferential edge of said inner ventilating sole element, said circular lip protruding in a direction between and including upwards, that is vertical, and laterally outwards, that is horizontal, from said inner ventilating sole element. The circular lip provides a means for attaching the (inner) ventilating sole element to the upper assembly. Such attachment gives advantages during manufacturing of the shoe because the upper assembly and the (inner) ventilating sole element can be handled as a unit which is easily transported from one manufacturing station to the next inside the factory. Additionally/alternatively, the circular lip provides a barrier against surrounding sole material, such that said surrounding sole material may be kept to the desired locations, for example during injection-moulding of the surrounding sole element.

In a further embodiment, said ventilating sole element, particularly said inner ventilating sole element, comprises lip sections. These lip sections may be provided for a portion-wise attachment and/or sealing. The lip sections may be positioned on the (inner) ventilating sole element as discussed above with regard to the circular lip. In a particular embodiment, said inner ventilating sole element comprises a first lip section in the vicinity of an upper circumferential edge in a heel area and a second lip section in the vicinity of an upper circumferential edge in a forefoot area. Said first and second lip sections may extend vertically upwards from an upper surface of said inner ventilating sole element.

In a particular embodiment, the circular lip/the lip sections may be provided on the upper surface of the inner ventilating sole element, in particular in a position spaced from the lateral edge of the inner ventilating sole element. This spacing between lateral edge and the circular lip/lip portions allows for a penetration of surrounding sole material around the upper lateral edge of the inner ventilating sole element. In embodiments where the upper lateral edge is aligned with the bond between the upper functional layer laminate and the bottom functional layer laminate, the surrounding sole material may still penetrate around said bond and provide for an effective seal covering respective portions of both laminates. The spacing may be in the range of 1 to 5 mm, more particularly in the range of 2 to 3 mm. The height of the circular lip/lip sections may be between 0.5 and 3 mm, particularly around 1 mm.

In a further embodiment, the circular lip may be stitched to a lower portion of said upper assembly, particularly in a strobeled or zig-zag fashion. The circular lip may also be glued or attached via an injection-moulded material to a lower portion of said upper assembly.

In an exemplary embodiment where the inner ventilating sole element comprises a circular lip, the circular lip may be attached to the upper assembly in a first injection-moulding step, with the first injection-moulding step also sealing the connection between the upper functional layer laminate and the bottom functional layer laminate. The surrounding sole element having at least one lateral passage may then be formed in a second injection-moulding step.

According to a further embodiment, said bottom functional layer laminate is provided with supporting members, particularly dots or knobs, at its underside. The dots ensure that the functional layer of the bottom functional layer laminate does not come to lie directly on top of the sole or a sole element, in particular the inner ventilating sole element, which is arranged below the bottom functional layer laminate. The dots lie on top of the sole element and ensure maintaining a distance between the sole element and the bottom functional layer laminate. The dots enhance the grip between the bottom functional layer laminate and the sole element underneath. The dots may be arranged in a particular pattern or grid that is matched to the sole element and prevents the bottom functional layer laminate from being displaced during use. The dots may also be shaped and distributed over the underside of the bottom functional layer laminate in an arbitrary fashion. Moreover, the dots may compensate for a potentially uneven surface of the sole element. They may prevent edges/recesses in the sole element from pushing through the bottom functional layer laminate, such that the wearer's comfort is enhanced. In embodiments where the sole element, i.e. the (inner) ventilating sole element, comprises a channel structure, a suitable arrangement of the dots prevents a forcing of the bottom functional layer laminate into the channels of the channel structure during use. Moreover, the dots and the channel structure may form a functional unit in such a way that the dots assist in the air exchange in the channel structure below the dots. In a particular embodiment, the pattern of the dots may at least partially correspond to the channel system of the (inner) ventilating sole element, such that water vapour discharge from the inside of the shoe to the channel system is maximized.

Particularly, there may be provided a plurality of discrete abrasion-resisting polymeric dots forming a discontinuous lining-forming pattern on the surface of said bottom functional layer laminate. In a particular embodiment, the polymeric dots have a smooth, rounded, non-angular external surface. The may be substantially circular in plan view and part-spherical in cross-section. This contributes to providing a smooth and comfortable feel of the shoe to the wearer. The dots may be arranged in a repeat regular pattern, such as in a plurality of parallel rows, or in a random pattern. In a particular embodiment, the polymeric dots cover 20-80% of the area of the bottom functional layer laminate, more particularly 30-70% and even more particularly 40-60%.

In a particular embodiment, each dot is preferably of a maximum cross-dimension or width in the plane of the substrate which is less than 5000 microns, for example in the range of 100 to 1000 microns, preferably 200-800, particularly 400-600 microns. The dots may be spaced apart centre-to-centre by 200-2000 microns, particularly 300-1500, especially 400-900 microns. Each dot may have a height in the range of 10-200 microns, preferably 70-140, particularly 80-100 microns.

According to a further embodiment, a water vapour permeable comfort layer is provided on top of at least parts of said ventilating sole element. Particularly, the comfort layer may be provided on top of the inner ventilating sole element. The comfort layer may have a larger lateral extension than the inner ventilating sole element, particularly projecting between 0.5 mm and 2 mm over the inner ventilating sole element, more particularly projecting approximately 1 mm over the inner ventilating sole element. It is also possible that the comfort layer is provided only on top of the filler structure or material described above. The comfort layer may be provided to compensate for an uneven upper surface of the ventilating sole element. As a structure or material allowing for air flow through it, the ventilating sole element may have a heterogeneous or jagged structure. In particular, a channel system or channel grid may cause alternating portions of voids and sole material of the ventilating sole element. The comfort layer allows for the discomfort potentially caused to the wearer of the shoe by these inhomogeneous portions to be greatly reduced or prevented.

The water vapour permeable comfort layer may be of any suitable material that provides a highly comfortable feel to the wearer and that is able to withstand the loads and forces applied thereto during use. Exemplary materials are open cell polyurethanes. For example, the material may be POLISPORT (trademark) from company Jin Cheng Plastic, China. According to an embodiment, before assembling the comfort layer on the ventilating sole element, mechanical pressure is applied to the material of the comfort layer, which is pressed, e.g., from 2 mm to 1 mm in thickness. This may be done to make the material more compact and hence to lower the amount of water absorbed. This advantageously prevents the material to act as sponge which nurtures growth of fungus and the like.

The water vapour permeable comfort layer may be attached to the top of said ventilating sole element, in particular by spotwise or circumferential gluing or by gluing across the entire surface with a breathable glue. Enhanced air flow characteristics in the (inner) ventilating sole element may be achieved by spotwise gluing or gluing across the entire surface, as channels enclosed at their upper side may be formed.

According to a further embodiment, said comfort layer has an upper side and a lower side, where the upper side is facing the bottom portion of the upper assembly, and the lower side is facing the ventilating sole element, the lower side being flexurally rigid or stiff and the upper side being soft. The lower stiff side can be made of a woven or non woven fabric and the upper side of any smooth and soft material, for example a non-woven or a foamed polyurethane. The comfort layer may consist of two discrete layers. With the lower layer being comparably stiff or hard, the comfort layer may be prevented from being pressed into the channel structure of the ventilating sole element more than 1 mm. Stiffness or flexural rigidity is defined e.g. in German DIN Norm 53864 with respect to textiles. In this way, the comfort layer characteristics are preserved as desired, with the comfort layer being very durable during use of the shoe. The soft upper layer may provide for a very comfortable feel of the sole for the wearer's foot. In an embodiment of the invention the soft upper layer has a smooth surface with the difference between peaks and valleys of no more than 0.1 mm.

In a particular embodiment, both the upper layer and the lower layer of the comfort layer are made of polyester. The upper and lower layers may be joined via a hot melt adhesive.

In a particular embodiment, the material properties of the upper layer and the lower layer as follows. The stiff lower layer has the following properties: a tensile strength in the lengthwise direction between 400 N/5 cm and 700 N/5 cm (UNI EN 29073/3), particularly between 500 N/5 cm and 600 N/5 cm; and a tensile strength in the crosswise direction between 500 N/5 cm and 800 N/5 cm (UNI EN 29073/3), particularly between 600 N/5 cm and 700 N/5 cm. The soft upper layer has the following properties: a tensile strength in the lengthwise and the crosswise direction between 50 N/5 cm and 200 N/5 cm (UNI EN 29073/3), particularly between 100 N/5 cm and 150 N/5 cm.

In a further embodiment the comfort layer has a thickness of less than or equal to 2.0 mm, a water absorption of <45% by weight and an MVTR (Moisture Vapour Transmission Rate) of >5000 g/m2/24 h, preferably about 8000 g/qm/24 h. In an embodiment a functional layer or membrane may be attached to the ventilating sole element above the comfort layer. The combination of comfort layer and membrane has an MVTR>2000 g/m2/24 h, preferably about 4500 g/m2/24 h. MVTR was measured according to the potassium acetate test described in DIN EN ISO 15496.

A comfort layer as described in the paragraphs above may be used in any kind of sole or shoe construction, not limited to the constructions described herein. In particular, the invention also generally proposes the provision of such a comfort layer in a shoe or shoe sole construction. This aspect is to be seen and may be applied independently from the other aspects as described herein. Accordingly, this aspect and its embodiments may form a separate part of the invention claimed independently from other aspects described herein.

According to a further embodiment, the underside of said ventilating sole element forms at least a part of an outer sole. Particularly, the undersides of said surrounding sole element and said inner ventilating sole element may form at least a part of an outer sole. This outer sole may or may not have a tread. The underside of said inner ventilating sole element may be arranged at a higher position as compared to the underside of said surrounding sole element. So in this case, although both the inner ventilating sole element and the surrounding sole element form a part of the outer sole, only the surrounding sole element part of this outer sole touches the ground.

According to a further embodiment, the surrounding sole element consists of a first polyurethane and the inner ventilating sole element consists of a second polyurethane, the second polyurethane being softer than the first polyurethane. Particularly, said second polyurethane may have a Shore A value of 35-45. In this way, the inner ventilating sole element may not be too hard and provides good shock absorption properties. It is also possible that the surrounding sole element and the inner ventilating sole element consist of the same polyurethane, but that they are produced in separate manufacturing steps. Shore hardness is measured by the durometer test. A force is applied onto a spot of the polyurethane, whereby the force creates an indentation. The time taken for the indentation to disappear is then measured.

According to a further embodiment, an additional sole element is provided forming at least a part of an outer sole, said additional sole element being arranged below said ventilating sole element. Portions of said additional sole element may also be arranged laterally outside of the container element. The additional sole element is not necessarily arranged directly adjacent to the ventilating sole element.

According to a further embodiment, supporting members are formed in portions of said additional sole element below said ventilating sole element, said supporting members extending substantially vertically through said additional sole element.

According to a further embodiment, a sole comfort layer is provided. In particular, the sole comfort layer may be provided in the form of an additional sole layer arranged above the outer sole. More particularly, the sole comfort layer may be arranged between the ventilating sole element and the additional sole element forming at least a part of an outer sole. The sole comfort layer does not necessarily extend over the whole lateral extension of the sole.

According to a further embodiment, said surrounding sole element extends below said inner ventilating sole element. Particularly, said surrounding sole element may form at least a part of an outer sole. It is possible that an additional sole element is arranged under said surrounding sole element, thus forming an outer sole element. The additional sole element is not necessarily arranged directly adjacent to the surrounding sole element. For example, a further layer, such as an additional sole comfort layer, may be positioned in between.

According to a further embodiment, supporting members are formed in portions of said surrounding sole element below said inner ventilating sole element, said supporting members extending substantially vertically through said surrounding sole element. Supporting members may also be formed in any other element or layer arranged below said ventilating sole element.

According to a further embodiment, at least one hollow insert is provided in the at least one lateral passage. The at least one hollow insert may be removable. It may have a covering with an opening in it, such as an insert head with a hole in its centre. It is also possible that at least one removable solid insert is provided in the at least one lateral passage. Alternatively, a partially hollow insert may have a solid covering/head.

According to a further embodiment, a breathable inner sole or footbed is removably provided above the bottom functional layer laminate, i.e. between the wearer's foot and the top of the bottom functional layer laminate during use of the shoe or between the wearer's foot and an insole. The inner sole may account for a better adaptation of the shoe to the wearer's foot and may therefore increase the wearer's comfort. Such an inner sole may be made of leather, fibre, polyurethane, etc. Perforations in these materials may ensure the necessary breathability. However, the inner sole may also be made of a material which is breathable per se.

According to a second aspect of the invention, there is provided a shoe sole or sole assembly comprising a ventilating sole element having a structure or material allowing for air flow through it, wherein at least one lateral passage extends from said structure or material through a side wall of said ventilating sole element, said lateral passage allowing for communication of air between said structure or material of said ventilating sole element and an outside of said ventilating sole element.

The modifications discussed above with respect to the ventilating sole element are equally applicable to the shoe sole. The shoe sole allows for manufacturing a shoe having the advantageous properties described above. It is pointed out that the comfort layer is a part of the shoe sole.

According to further aspects of the invention, there are provided methods for manufacturing a waterproof, breathable shoe according to the features of claims 37, 39 and 40.

In particular, in an aspect of the invention, there is provided a method for manufacturing a waterproof, breathable shoe, comprising providing an upper assembly with an upper portion including a breathable outer material and with a bottom portion, said upper assembly comprising a waterproof, breathable functional layer arrangement extending over said upper portion and said bottom portion; and attaching a ventilating sole element having a structure or material allowing for air flow through it to said upper assembly, wherein at least one lateral passage extends from said structure or material through a side wall of said ventilating sole element, said lateral passage allowing for communication of air between said structure or material of said ventilating sole element and an outside of said ventilating sole element.

As described above with respect to the waterproof, breathable shoe and its embodiments, the functional layer arrangement may be comprised of on or more functional layer pieces or of one or more functional layer laminate pieces. These pieces may be sealed with respect to each other in any suitable way, e.g. via the application of sealing tapes, via injection-moulding of sealing material, via welding them together, via heating the pieces in an overlap region and pressing them with sufficient force against each other that a waterproof seal is formed, etc.

According to a further embodiment, the ventilating sole element may be glued to the upper assembly. It is also possible that the ventilating sole element is attached to the upper assembly through injection-moulding, in particular through the application of an injection-moulded surrounding connection element. According to a further embodiment, the ventilating sole element comprises an inner ventilating sole element and a surrounding sole element, with this composite ventilating sole element being attached to the upper assembly via gluing or via the injection-moulding of the surrounding sole element onto the inner ventilating sole element and the upper assembly.

According to a further embodiment, the step of providing the upper assembly comprises providing said upper portion of said upper assembly with a waterproof, breathable upper functional layer laminate having a lower end area, providing said bottom portion of said upper assembly with a waterproof, breathable bottom functional layer laminate having a side end area, joining said side end area of said bottom functional layer laminate to said lower end area of said upper functional layer laminate, and providing a waterproof seal between said bottom functional layer laminate and said upper functional layer laminate.

In particular, in another aspect of the invention, there is provided a method for manufacturing a waterproof, breathable shoe, comprising providing an upper portion of an upper assembly, the upper portion including a breathable outer material and a waterproof, breathable upper functional layer laminate having a lower end area; providing a bottom portion of said upper assembly, the bottom portion including a waterproof, breathable bottom functional layer laminate having a side end area; joining said side end area of said bottom functional layer laminate to said lower end area of said upper functional layer laminate; providing a ventilating sole element having a structure or material allowing for air flow through it, wherein said ventilating sole element comprises at least one lateral passage extending from said structure or material through a side wall of said ventilating sole element, said lateral passage allowing for communication of air between said structure or material of said ventilating sole element and an outside of said ventilating sole element; and attaching said ventilating sole element to said upper assembly via injection-moulding of a surrounding connection element, with said surrounding connection element providing a waterproof seal between said bottom functional layer laminate and said upper functional layer laminate.

In particular, in another aspect of the invention, there is provided a method for manufacturing a waterproof, breathable shoe, comprising providing an upper portion of an upper assembly, the upper portion including a breathable outer material and a waterproof, breathable upper functional layer laminate having a lower end area; providing a bottom portion of said upper assembly, the bottom portion including a waterproof, breathable bottom functional layer laminate having a side end area; joining said side end area of said bottom functional layer laminate to said lower end area of said upper functional layer laminate; providing an inner ventilating sole element having a structure or material allowing for air flow through it and attaching said inner ventilating sole element to said upper assembly via a surrounding sole element, particularly through injection-moulding of said surrounding sole element, with at least one lateral passage extending from said structure or material through a side wall of the inner ventilating sole element and through said surrounding sole element, said lateral passage allowing for communication of air between said structure or material of said inner ventilating sole element and an outside of said surrounding sole element, wherein said surrounding sole element provides a waterproof seal between said bottom functional layer laminate and said upper functional layer laminate.

The methods for manufacturing a waterproof, breathable shoe described above are alternatives for producing a waterproof, breathable shoe according to the aspect of the invention defined above. The first alternative relates to the provision of a waterproof, breathable upper assembly and to the attachment of a ventilating sole element which comprises a structure or material allowing for air flow through it and at least one lateral passage. The second alternative relates to the provision of a breathable upper assembly and of a ventilating sole element which comprises a structure or material allowing for air flow through it and at least one lateral passage. The attachment between the upper assembly and the ventilating sole element as well as the waterproof sealing of the upper assembly are achieved via injection-moulding of the surrounding connection element. The third alternative relates to the provision of a breathable upper assembly and of an inner ventilating sole element which comprises a structure or material allowing for air flow through it. The injection-moulding of a surrounding sole element provides for an attachment between the inner ventilating sole element and the upper assembly as well as for the waterproof sealing of the upper assembly as well as for the provision of the at least one lateral passage through the surrounding sole element.

According to a further embodiment, said at least one lateral passage is at least partly created by lasering or drilling or puncturing or otherwise thermally removing (melting away) some material so as to form a passage. In other words, the at least one lateral passage may be formed during injection-moulding by providing the mould with respective pins for forming the at least one lateral passage. However, the mould may be provided without pins or with pins having only a portion of the extension of the lateral passages, with the lateral passages being completed by one or more of lasering, drilling, puncturing or thermal removal. Lasering provides for extremely accurate results, while drilling and puncturing can be performed more cheaply.

The methods for manufacturing a waterproof, breathable shoe may be modified corresponding to the modifications discussed above with respect to the waterproof, breathable shoe. In other words, manufacturing steps corresponding to additional shoe elements/features may be included in the methods for manufacturing a waterproof, breathable shoe. It is explicitly pointed out that the steps of attaching, given for the methods of manufacturing a waterproof, breathable shoe in accordance with above aspects of the invention, may be the only steps of attachment. It is, however, also possible that additional attachments between the given elements are present.

FIG. 5 is a schematic cross-sectional view of a shoe in accordance with a thirteenth embodiment of the invention.

FIG. 6a is a schematic cross-sectional view of a shoe in accordance with a fourteenth embodiment of the invention.

FIG. 11 shows an exploded view of a shoe according to a further embodiment of the invention and comprising a ventilating sole element according to FIG. 1;

FIG. 12 shows a sectional view of the shoe of FIG. 11, taken along a cutting plane extending through the shoe in a longitudinal direction;

FIG. 13 shows a plan view of a ventilating sole element of the shoe of FIGS. 11 and 12 according to the invention;

FIG. 14 shows a sectional view of the ventilating sole element of the shoe of FIGS. 11 and 12, taken along the longitudinal axis;

FIG. 15 is a sectional view of the ventilating sole element of the shoe of FIGS. 11 and 12, taken along the cutting plane V-V in FIG. 13;

FIG. 19 shows a plan view of another ventilating sole element according to a further embodiment of the invention.

In the following, exemplary embodiments of a shoe in accordance with principles of the invention will be described. The skilled person will be aware that various changes or adaptations may be made as far as appropriate and depending on the particular needs of the respective shoe construction.

Figure 1:
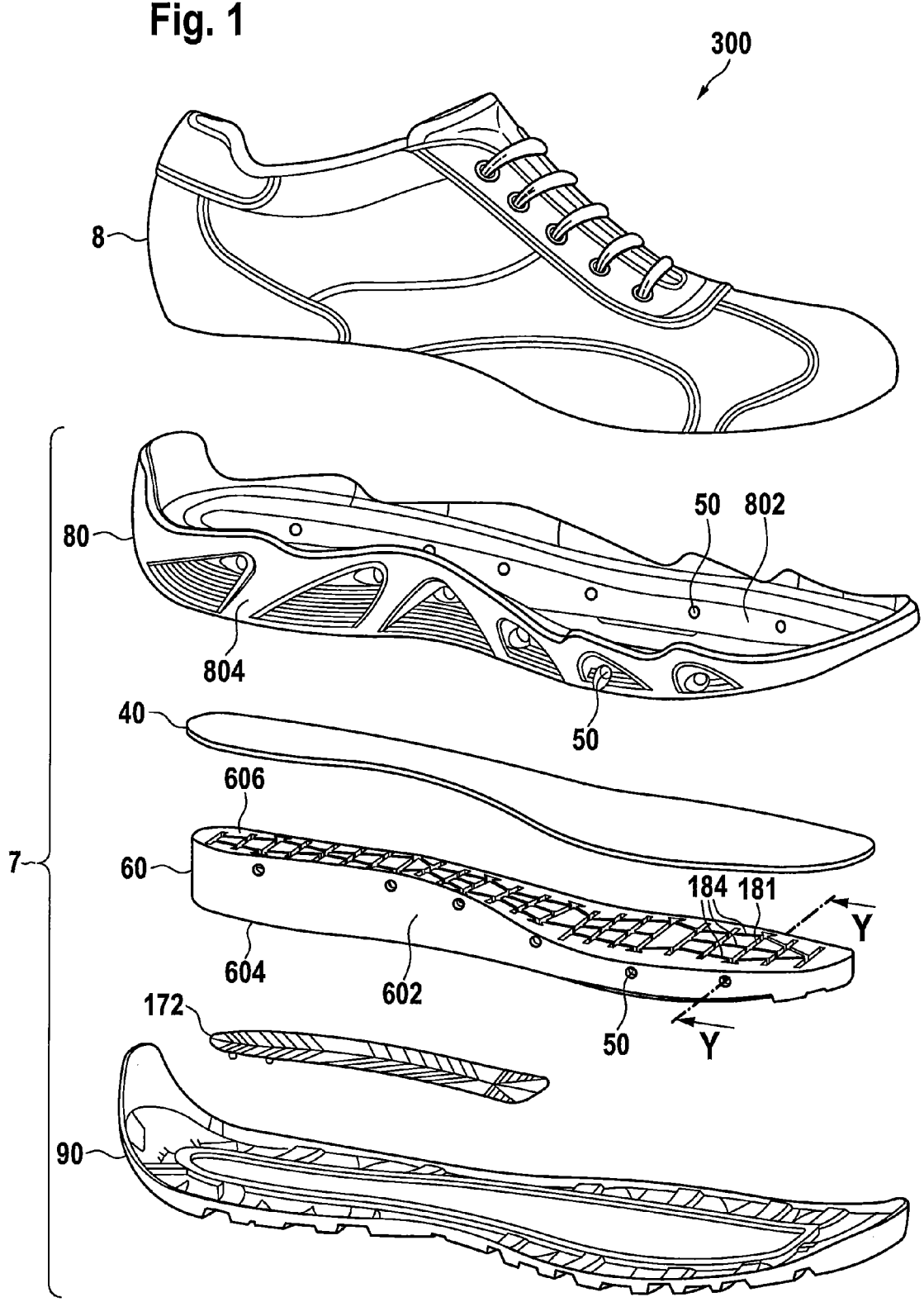
FIG. 1 is an exploded three-dimensional view of the main components of a shoe in accordance with a first embodiment of the invention.

FIG. 1 shows an exploded three-dimensional view of the main components of a shoe 300 according to an embodiment of the invention. The shoe 300 comprises a sole assembly 7 and an upper assembly 8. The sole assembly 7 in turn comprises, from bottom to top in the exploded view, an outsole 90, a shank 172, an inner ventilating sole element 60, a comfort layer 40, and a surrounding sole element 80.

The primary purpose of FIG. 1 is to provide context for the following Figures. The position of a vertical plane including horizontal line Y-Y corresponds to the positions of the cross-sectional planes depicted in the following Figures. It is pointed out that the embodiments of the following Figures are different from the shoe 300, but that the position and viewing direction of the respectively depicted vertical cross-sectional planes can be inferred from the line Y-Y and the associated arrows, which represent the viewing direction.

The outsole 90 comprises a tread or corrugated structure on its lower surface for improving the grip characteristics of the shoe during walking. The shank 172 is provided in the shoe 300 to give it additional stability. The shank 172 may be made of metal or any other suitable material. Due to the illustrative nature of FIG. 1, the shank 172 is shown as a separate element. However, in most embodiments, the shank 172 is positioned within the inner ventilating sole element 60. It is pointed out that the shank 172 is an optional component, which is not shown in most embodiments.

The inner ventilating sole element 60 comprises a channel structure, in particular a channel grid, at its upper side. The channel structure comprises transverse channels, generally designated with reference numeral 181. Channels 184 cross the transverse channels 181. With respect to FIGS. 11 to 19, a distinction is made between at least one peripheral channel being formed in a peripheral region of the channel structure and longitudinal channels. For the sake of simplicity in describing different shoe constructions by presenting cross-sectional views in FIGS. 2 to 10, the channels 184 are generally referred to as longitudinal channels, although one or more of the channel cross-sections shown may belong to one or more peripheral channels.

The inner ventilating sole element 60 has an upper surface 606, a lower surface 604 and a lateral surface 602. In an assembled state of the shoe 300, the lower surface 604 of the inner ventilating sole element 60 is partly adjacent the shank 172 and partly adjacent the outsole 90, the upper surface 606 of the inner ventilating sole element 60 is adjacent the comfort layer 40, and the lateral surface 602 of the inner ventilating sole element 60 is adjacent a lateral inner surface 802 of the surrounding sole element 80. Regarding the engagement/connection of the individual components, more details are given below.

The channel structure, in particular the transverse channels 181, is in air communication with a plurality of lateral passages 50. The lateral passages 50 extend through a side wall of the inner ventilating sole element 60 and through the surrounding sole element 80, i.e. they extend from the channel structure of the inner ventilating sole element 60 to an outer lateral surface 804 of the surrounding sole element. With the combination of the inner ventilating sole element 60 and the surrounding sole element 80 being referred to as ventilating sole element, the lateral passages 50 extend through the side wall of the ventilating sole element. In order to distinguish the two sections of the lateral passages, the portions of the lateral passages 50 that extend through the side wall of the inner ventilating sole element 60 are also referred to as lateral openings herein and the portions of the lateral passages 50 that extend through the surrounding sole element 80 are also referred to as lateral passage portions herein.

The surrounding sole element 80 has a varying height across its circumference, with the lateral passages being arranged at different heights. In this way, the positions of the lateral passages account for the uneven surface structure of the inner ventilating sole element 60, which takes into account the wearer's foot and its positioning during walking. Exemplary embodiments of the components are described in greater detail below.

Figure 2A:
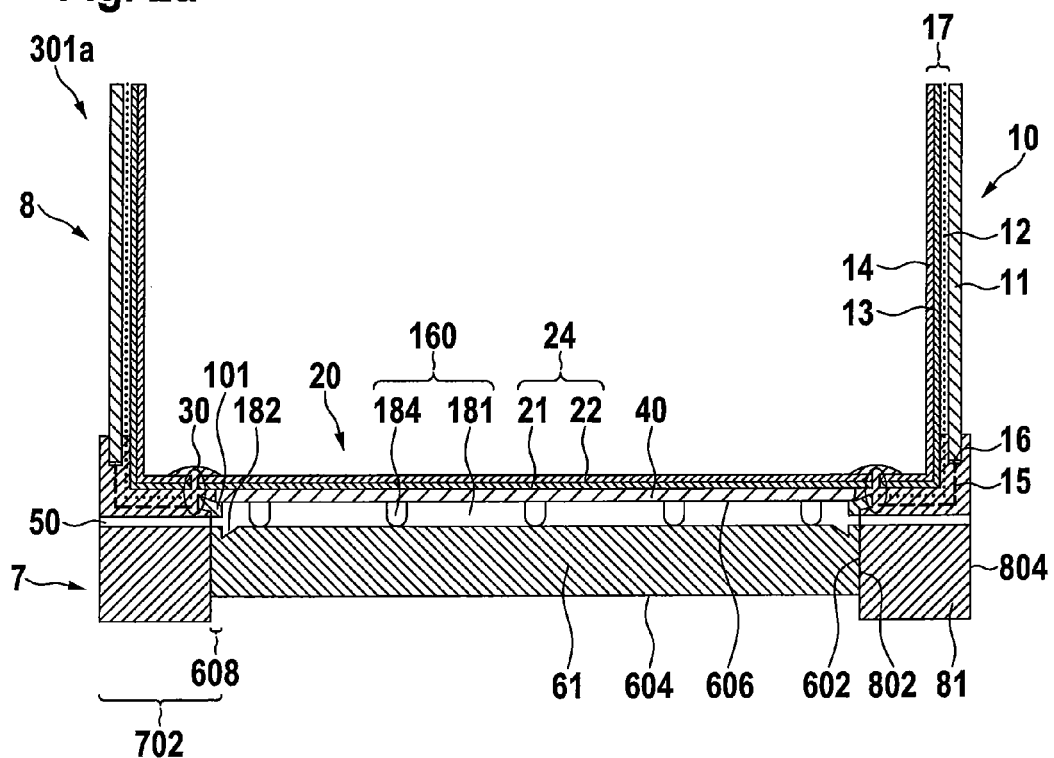
FIG. 2a is a schematic cross-sectional view of a shoe in accordance with a second embodiment of the invention.

FIG. 2a is a schematic cross-sectional view of a shoe 301a in accordance with an embodiment of the invention. FIGS. 2 to 10 are in particular schematic in that they show a u-shaped shoe portion. It is apparent to a person skilled in the art that the shoe is closed on top, in particular in a forefoot region.

The shoe 301a comprises an upper assembly 8 and a sole assembly 7. The upper assembly 8 has an upper portion 10 and a bottom portion 20. The upper portion 10 comprises, from outside to inside, a breathable outer material 11, also referred to as upper material, a mesh 12, an upper membrane 13, and a textile lining 14. The mesh 12, the upper membrane 13 and the textile lining 14 are provided as a laminate, also referred to as upper functional layer laminate 17. The upper membrane 13 is breathable and waterproof. With all of the upper material 11, the mesh 12 and the textile lining 14 being breathable, i.e. water vapour permeable, the upper portion 10 as a whole is breathable and waterproof.

The upper material 11 may be any breathable material suitable for forming the outside of a shoe, such as leather, suede, textile or man made fabrics, etc.

The upper functional layer laminate (i.e. mesh 12, upper membrane 13 and textile lining 14) may be any suitable waterproof and breathable laminate, such as commercially available GORE-TEX® laminate from W.L. Gore & Associates.

A lower portion of the outer material 11 is comprised of a netband 15. The netband 15 may be attached to the remainder of the outer material 11 through any suitable way of connection, for example stitching or gluing. In the exemplary embodiment of FIG. 2a, the netband 15 is attached to the remainder of the outer material 11 via stitching 16, as illustrated by a connecting line. As the term netband suggests, this portion of the outer material is not a continuous material, but comprises voids in the material that allow for the penetration of fluid sole material therethrough, as will be explained later. Instead of providing a netband, the lower portion may also be comprised of the same material as the remainder of the outer material, with the voids being generated by puncturing or perforating the outer material in the lower portion.

The bottom portion 20 comprises, from bottom to top, a lower membrane 21 and a supporting textile 22. The textile may be a woven, non-woven or knitted textile, for example Cambrelle®. The lower membrane 21 and the supporting textile 22 are provided as a laminate, also referred to as bottom functional layer laminate 24. The lower membrane 21 is waterproof and breathable. With the supporting textile 22 being breathable, an overall breathable and waterproof bottom functional layer laminate 24 is provided. The bottom functional layer laminate 24 may be any suitable laminate, for example commercially available GORE-TEX® laminate from W.L. Gore & Associates.

The upper portion 10 and the bottom portion 20 are connected to each other at their respective end areas. Particularly, a lower end area of the upper functional layer laminate 17 is connected to a side end area of the bottom functional layer laminate 24. In the embodiment of FIG. 2a, this connection also connects an end area of the netband 15 to the upper functional layer laminate 17 and the bottom functional layer laminate 24. The bottom functional layer laminate 24, the upper functional layer laminate 17 and the netband are stitched together, for example by a strobel stitch or a zigzag stitch. Accordingly, a connection 30, also referred to as bond 30, in the form of a sewn seam is formed connecting the bottom functional layer laminate 24, the outer material 11 (via the netband 15) and the upper functional layer laminate 17. This seam 30 is sealed in a waterproof manner by sole material, as will be explained later, such that a waterproof structure is formed by the upper portion 10 and the bottom portion 20.

The upper functional layer laminate 17 and the bottom functional layer laminate 24 may be positioned end-to-end before being connected and sealed together, as shown in FIG. 2a. Both laminates may also be bent downwards, such that respective portions of the upper sides of the laminates are positioned adjacent each other. In these different positions, the laminates may be connected, for example through stitching as shown, and the connection region may be sealed. The netband 15 of the outer material 11 may be positioned corresponding to the upper functional layer laminate 17, i.e. in an end-to-end or overlap or bent relation with respect to the bottom functional layer laminate 24, such that the connection 30 also connects the netband 15 to the bottom functional layer laminate 24 and the upper functional layer laminate 17. The netband 15 may also extend through the connection 30, which is uncritical due to its porous structure. These different options for forming the connection 30 may be applied to all embodiments described herein.

In the embodiment of FIG. 2a, the connection 30 between the upper functional layer laminate 17 and the bottom functional layer laminate 24 is located at the substantially horizontal portion of the inside of the shoe 301a, which is intended to support the underside of the wearer's foot. In the cross-sectional plane of FIG. 2a, the connection 30 is close to the lateral end of said substantially horizontal portion, i.e. close to the point where the portion for supporting the weight of the foot transitions into the side wall of the shoe. Due to the nature of the shoe 301a, the bottom functional layer laminate 24 is a substantially foot-shaped structure, with the upper functional layer laminate 17 being connected thereto perimetrically. It is pointed out that the terms horizontal and vertical refer to the horizontal and vertical directions present when the shoe is placed with the sole on an even ground. For an easier understanding, the shoes are depicted in that orientation throughout the Figures.

The sole or sole assembly 7 of the shoe 301a, i.e. the portion of the shoe 301a below the upper assembly 8, which consists of the upper portion 10 and the bottom portion 20, is comprised of a ventilating sole element and a comfort layer 40. The ventilating sole element in turn comprises an inner ventilating sole element 61 and a surrounding sole element 81.

The inner ventilating sole element 61 comprises a channel structure 160 that allows for air communication between the upper side of the inner ventilating sole element 61 and lateral passages 50. The lateral passages 50 extend through a side wall 702 of the ventilating sole element. In particular, they extend through a side wall 608 of the inner ventilating sole element 61 and through the surrounding sole element 81. For an easier reading of the FIGS. 2 to 10, the reference numerals 608 and 702 are provided with brackets illustrating the lateral extensions of the side wall of the inner ventilating sole element and the side wall of the ventilating sole element, respectively. It is, however, understood that the reference numerals 608 and 702 are meant to denote the side wall of the inner ventilating sole element and the side wall of the ventilating sole element themselves. The channel system 160 of the embodiment of FIG. 2a comprises a plurality of longitudinal channels 184, arranged in the longitudinal direction of the shoe 301a, and a plurality of transverse channels 181, arranged in the transverse direction of the shoe 301a, i.e. in the direction orthogonal to the longitudinal direction of the shoe.

The cross-sectional view of FIG. 2a cuts through a transverse channel 181 of the channel structure 160 along the horizontal line Y-Y of FIG. 1. Therefore, the transverse channel 181 of the inner ventilating sole element 61 is not shown in a shaded manner, as the cross-sectional cut reaches through the open channel. In contrast thereto, the portions of the inner ventilating sole element 61 surrounding the channel structure 160 and the surrounding sole element 81 are shown in a shaded manner illustrating that the cross-section of FIG. 2a slices through these shoe elements in the depicted cross-sectional plane. Correspondingly, the upper assembly 8 and the comfort layer 40 are shown in a shaded manner.

In the cross-sectional view of FIG. 2a, the longitudinal channels 184 are seen in their cross-sectional shape, which is a u-shape reaching from the upper surface 606 of the inner ventilating sole element 61 some distance towards the lower surface 604 of the inner ventilating sole element 61. The transverse channel 181 cut in the cross-section of FIG. 2a is confined by a surface made of the portions between the longitudinal channels lying behind the cross-sectional plane. Accordingly, the transverse channel 181 depicted extends longitudinally behind the cross-sectional plane of FIG. 2a, with the non-shaded portions of the inner ventilating sole element 61, which surround the u-shaped longitudinal channels 184, forming a transverse boundary surface. Only the u-shaped longitudinal channels 184 form a longitudinal air flow permitting connection to further transverse channels behind and in front of the cross-sectional plane of FIG. 2a.

The u-shape of the longitudinal and transverse channels allows for a good compromise between providing sufficient channel volume for fluid communication and providing a strong inner ventilating sole element structure for supporting the wearer's foot and transferring the wearer's weight to the ground and/or the surrounding sole element 81. Also, the u-shaped channels can be manufactured easily and quickly, particularly in the case of an injection-moulded inner ventilating sole element 61, because the rounded channel side walls allow for an easy parting of the inner ventilating sole element 61 and the mould after the moulding operation.

It is pointed out that the channels of the inner ventilating sole element 61 may have any suitable cross-section that allows for an efficient transfer of water vapour from the upper side of the inner ventilating sole element 61 to the lateral passages 50 in the surrounding sole element 81. At the same time, the inner ventilating sole element 61 should provide a stable structure for the sole of the shoe. It is also pointed out that the channels may have varying cross-sections along their length in order to form a channel system having desired properties.

The exemplary embodiment of FIG. 2a comprises five longitudinal channels 184, which are distributed across the width of the inner ventilating sole element 61 in a uniform manner. It is also possible that the longitudinal channels have varying widths and/or are distributed non-uniformly across the width of the inner ventilating sole element 61. Further, it is possible that these channels are at an angle with respect to the longitudinal direction of the shoe 301a, such that any suitable channel structure 160 may be formed.

The transverse channel 181 connects the longitudinal channels 184 to each other and to the lateral passages 50 in the surrounding sole element 81. At its lateral ends, the transverse channel is equipped with air and moisture discharging ports 182. The air and moisture discharging ports 182 are arranged laterally outside from the laterally outmost longitudinal channel. In particular, the air and moisture discharging ports 182 are arranged directly adjacent the side wall 608 of the inner ventilating sole element 61. The air and moisture discharging ports 182 are formed by recesses in the floor of the transverse channels 181. In other words, the floor of the transverse channels 181 extends deeper down into the inner ventilating sole element 61 in the region of the air and moisture discharging ports 182 than throughout the remainder of the transverse channels 181. The air and moisture discharging ports 182 allow for an efficient collection of moisture/water vapour from the inside of the shoe, from where the water vapour can be carried away effectively through the lateral passages 50. All or only a subset of the transverse channels may 181 have air and moisture discharging ports.

All or only a subset of the transverse channels 181 may provide for the connection with lateral passages 50. There may also be transverse channels 181 that are not in air communication with lateral passages 50, but end in dead ends. The transverse channels of the inner ventilating sole element 61, one of which is being shown in FIG. 2a, allow for air communication between the channel system 160 of the inner ventilating sole element 61 and the lateral passages 50 extending through the side wall 702 of the ventilating sole element. With the bottom functional layer laminate 24 being breathable, water vapour transport from the inside of the shoe to the lateral outside of the sole 7 is ensured through the ventilating sole element structure, which allows the water vapour containing air to pass through it.

It is pointed out that the transverse channels 181 may have the same, a smaller or greater height than the longitudinal channels 184. They may be channels that reach from the top of the inner ventilating sole elements towards the inside of the inner ventilating sole element, such that they can also be seen as grooves or trenches. It is also possible that the transverse channels lie below a portion of the inner ventilating sole element 61 and are therefore not readily visible from the top of the inner ventilating sole element 61. Also, the longitudinal channels may be grooves, as shown, or channels concealed from the upper surface of the inner ventilating sole element 61.

In the present embodiment, the channel system 160 of the inner ventilating sole element 61 is a channel grid. The channels of the channel grid extend from the top of the inner ventilating sole element 61 to the inside thereof. The channels may be longitudinal channels 184 and transverse channels 181, which intersect for allowing air communication therebetween. The channels may also be diagonal channels, when seen from the top of the inner ventilating sole element. In general, such a channel grid may have any combination of longitudinal, transverse and diagonal channels. A more detailed description of possible channel systems is given below with regard to FIGS. 11 to 19. It is pointed out that any channel structure may be embodied in all other constructions of the remainder of the shoe, in particular in combination with all other upper assembly constructions and all other constructions relating to the remainder of the sole 7.

The lateral passages 50 extend through the side wall 702 of the ventilating sole element, i.e. through the side wall 608 of the inner ventilating sole element 61 and the surrounding sole element 81 of the shoe 301a, allowing for air communication between the channel structure of the inner ventilating sole element 61 and the lateral outside of the shoe 301a. In the exemplary embodiment of FIG. 2a, the lateral passages 50 are depicted as transverse passages being horizontal. However, the term lateral passage may not be understood in such a restricting manner. A lateral passage may be any passage that allows for an air communication between the inside of the ventilating sole element and a lateral outside of the ventilating sole element, i.e. the outside of the ventilating sole element that is not the underside of the shoe 301. In particular, the lateral passages 50 may be inclined with respect to the horizontal direction, in particular with the outer end lower than the inner end of the ventilation passage. This inclination has the advantage that water can drain out more easily from the ventilating sole element. However, horizontal lateral passages have the advantage of providing a favourable path for air or water vapour flow, particularly if a continuous passage from the right side of the ventilating sole element to the left side of the ventilating sole element or vice versa is present. The lateral passages 50 may also be inclined with the outer end being higher than the inner end of the ventilation passage. This allows for creating the lateral passages, for example through drilling or by laser operation, without any danger of damaging the delicate membrane 21 of the bottom functional layer laminate 24. Moreover, water vapour, which is warm due to the wearer's body temperature, may effectively exit the ventilating sole element through such inclined lateral passages in a chimney-like manner. When viewed from the top of the ventilating sole element, the lateral passages 50 may be in a longitudinal direction of the shoe, in a transverse direction of the shoe, or in any direction therebetween. For example, in the front or the back of the shoe, the ventilation channels may be substantially in a longitudinal direction of the shoe. The orientation options described for the lateral passages 50 may be applied to all embodiments described.

The inner ventilating sole element 61 of the shoe 301a also comprises a circular lip 101. The circular lip 101 is arranged at the upper lateral edge of the inner ventilating sole element 61. As the inner ventilating sole element 61 is a three-dimensional structure, the circular lip 101 surrounds the perimetric upper edge of the remainder of the inner ventilating sole element 61. In other words, the circular lip 101 is arranged at the periphery of the upper lateral portion of the inner ventilating sole element 61. Accordingly, the term circular is not intended to be understood as referring to the shape of a circle. Instead, it is understood as referring to a structure surrounding an inner space or as referring to a loop structure. However, the term is also not intended to require a closed lip or collar structure. The lip may be continuous around the perimeter of the inner ventilating sole element 61, but is may also be made of a plurality of spaced apart lip sections distributed around the perimeter of the inner ventilating sole element 61. The lip also does not need to be arranged right at the upper lateral edge of the inner ventilating sole element 61. It may also be attached to the lateral surface 602 or the upper surface 606 thereof. However, a positioning in the vicinity of an upper circumferential edge of the inner ventilating sole element may be beneficial, as will be discussed below.

The circular lip 101 may perform one or more of the functions described as follows. As shown in FIG. 2a, the circular lip 101 extends to the position of the connection 30. The connection 30 includes the circular lip 101, such that it connects the upper portion 10, the bottom portion 20 as well as the inner ventilating sole element 61. In particular, the strobel stitch 30 connects the upper functional layer laminate 17, the netband 15 of the upper material 11, the bottom functional layer laminate 24 and the circular lip 101 of the inner ventilating sole element 61. Hence, the circular lip 101 allows for an attachment of the ventilating sole element to the upper assembly 8, in particular of the inner ventilating sole element 61 to the upper assembly 8. This attachment is independent from the attachment of the inner ventilating sole element 61 to the upper assembly 8 via the surrounding sole element 81. During the manufacture of the shoe 301a, the inner ventilating sole element 61 may be attached to the upper assembly 8 in a fixed position through the connection 30 along the circular lip 101, which may also leave the comfort layer 40 in a fixed position. This allows for a more accurate production of the shoe 301a, as the fixed position of the inner ventilating sole element 61 ensures that the surrounding sole element 81 surrounds the inner ventilating sole element 61 in the desired manner and location.

The inner ventilating sole element 61 and the circular lip 101 may be made of one piece or more pieces. In other words, the circular lip 101 may be an integral part of the inner ventilating sole element 61 or it may be a part attached in a separate manufacturing step to the remainder of the inner ventilating sole element 61. Particularly, the inner ventilating sole element 61—including the circular lip 101—may be produced in one manufacturing step, for example through injection moulding. In this way, a strong connection between the circular lip 101 and the remainder of the inner ventilating sole element 61 is ensured, which results in a strong attachment of the whole inner ventilating sole element 61 to the upper assembly 8. A lip 101 for such use is also shown in FIG. 15. This lip extends 2 millimeters horizontally from the inner ventilating sole element; extensions will typically be between 1 and 5 millimeters.

It is also possible that the inner ventilating sole element 61, comprising the circular lip 101, is attached to the upper assembly by gluing the circular lip 101 onto the upper assembly 8 or by effecting an attachment between the circular lip 101 and the upper assembly 8 through a local injection-moulding operation in the region of the circular lip 101, particularly only in the region of the circular lip 101.

The circular lip 101 may additionally/alternatively have the function of providing a barrier for the sole material of the surrounding sole element 81 during its injection-moulding onto the inner ventilating sole element 61 and the upper assembly 8. The circular lip may be positioned such that the sole material of the surrounding sole element 81 does not penetrate through to the comfort layer 40 and/or the upper side of the inner ventilating sole element 61. The circular lip 101 may also be designed and positioned in such a way that some sole material of the surrounding sole element 81 may penetrate onto the bottom functional layer laminate 24, particularly onto the bottom membrane 21. The sealing between the bottom functional layer laminate 24 and the upper functional layer laminate 17 may be effected via the surrounding sole element material. However, the circular lip may prevent excess sole material from penetrating into the area between the inner ventilating sole element and the bottom functional layer laminate. In this way, the water vapour permeability of a large area of the bottom functional layer laminate 24 is ensured.

The inner ventilating sole element 61 may be placed in a mould with a suitable pressure/fixation, such that the circular lip 101 can fulfil this function during injection-moulding of the surrounding sole element 81. In particular, a piston may exert pressure on the inner ventilating sole element 61, through which it is pressed against the upper assembly 8. The circular lip may be pressed against the upper assembly 8, in the process of which a deformation of the protruding lip may occur, such that a tight barrier for the subsequent injection-moulding step is formed. The circular lip 101 may in this way help to keep a large portion of the lower surface of the bottom functional layer laminate 24 from getting into contact with the sole material of the surrounding sole element 81, such that a large area with breathable characteristics is maintained. The circular lip 101 may also be positioned at any position on the upper surface 606 of the inner ventilating sole element 61, such that a barrier for the injection-moulding is established at a desired location. Also, the circular lip 101 may be attached to the lateral surface 602 of the inner ventilating sole elements 61, with the barrier effect being achieved through an attachment of the far end of the circular lip 101 to the upper assembly 8, for example through the strobel stitch 30.

The circular lip 101 may extend from the ventilating sole element in any direction between a lateral direction towards the outside of the ventilating sole element or inner ventilating sole element and a vertical direction upwards from the ventilating sole element.

It is explicitly pointed out that, albeit the circular lip 101 is only shown for the embodiments of FIG. 2a and FIG. 15, the ventilating sole elements of the other embodiments of the invention may also comprise a lip or collar structure, in particular a circular lip or a plurality of lip sections as described above.

The upper portion of the surrounding sole element 81 is located above the circular lip 101 of the inner ventilating sole element 61, i.e. below a part of the bottom functional layer laminate 24, as well as underneath the circular lip 101 and underneath a part of the upper portion 10 of the upper assembly 8 as well as adjacent a part of the upper portion 10 of the upper assembly 8 that is arranged in a substantially vertical direction. In other words, the surrounding sole element 81 wraps around the corner of the upper assembly 8 where the inside of the shoe is patterned to match a wearer's foot. In yet other words, the surrounding sole element 81 covers a part of the underside of the upper assembly 8 as well as parts of the lower lateral sides of the upper assembly 8. Sole material of the surrounding sole element 81 is penetrated through the netband 15, through the strobel stitch 30, through the mesh 12, onto the upper material 11, onto the upper membrane 13, around at least a portion of the circular lip 101 and onto the bottom membrane 21. This penetrated sole material seals the strobel stitch 30 in a waterproof manner on the one hand and attaches the ventilating sole element to the upper assembly 8 on the other hand. The sealing provides a completely waterproof upper assembly 8 made up of the upper functional layer laminate 17 and the lower functional layer laminate 24 surrounding the interior of the shoe and being sealed in a waterproof manner to each other. The sealed upper functional layer laminate 17 and bottom functional layer laminate 24 form a waterproof, breathable functional layer arrangement. Thus the upper assembly 8 is waterproof, which allows the sole assembly to be non-waterproof. The surrounding sole material also penetrates through the connection 30 to the upper sides of the bottom functional layer laminate 24 and the upper functional layer laminate 17, which is illustrated by the circle sector covering the upper side of the strobel stitch 30 and extending onto the bottom functional layer laminate 24 and the upper functional layer laminate 17 in FIG. 2a. In particular, the surrounding sole material penetrates through the space between the two laminates upwards. The surrounding sole material also penetrates somewhat in between the circular lip 101 and the bottom functional layer laminate 24. In this way, the whole region of the strobel stitch 30 is penetrated with surrounding sole material, such that all holes generated in the upper membrane 13 and the bottom membrane 21 through the strobel stitching operation are reliably sealed by surrounding sole material. However, the penetrating surrounding sole material is kept to such a low volume that the comfort for the wearer as well as the breathability of the upper assembly 8 is essentially unimpeded.

Above the inner ventilating sole element 61, the comfort layer 40 is provided in the shoe 301a. The comfort layer 40 is positioned on top of the inner ventilating sole element 61. The comfort layer 40 may be loosely positioned there or may be attached before further manufacturing of the shoe. Such attachment may be achieved by a spot-gluing or circumferential gluing or by gluing making use of breathable glue, such that the flow of water-vapour from the inside of the shoe to the inner ventilating sole element 61 is not prevented. Also, the full surface of the inner ventilating sole element 61 can be glued, and in order to prevent glue to enter the channels a highly thixotropic glue should be used. The comfort layer 40 is inserted for increasing the soft walking feel for the wearer, particularly for ensuring that the wearer does not feel bothered by the channel system 160 of the inner ventilating sole element 61. In the exemplary embodiment of the shoe 301a, the comfort layer 40 has a greater lateral extension than the channel system 160 of the inner ventilating sole element 61 and extends somewhat above the region of the circular lip 101. However, the comfort layer does not extend to the lateral edges of the circular lip 101 where it is attached to the upper assembly 8. In general, the comfort layer may have the same or smaller or larger lateral dimensions as/than the inner ventilating sole element.

The comfort layer 40 is provided directly on top of the inner ventilating sole element 61. However, it could also be spaced apart somewhat from the inner ventilating sole element 61. Such a spacing may be the result of using a gluing layer for attaching the comfort layer 40 to the inner ventilating sole element 61 that has a sizeable vertical extension. The comfort layer may still provide the beneficial properties discussed, when not provided directly on top of the ventilating sole element.

The ventilating sole element is produced and attached to the upper assembly 8 in a several stage process. As a first step, the inner ventilating sole element 61 is produced, for example through injection-moulding of a polyurethane (PU) into an accordingly shaped mould. Polyurethane is one of a plurality of suitable materials that can be used in order to form an inner ventilating sole element 61 that has high stability to support at least a portion of the weight of the wearer during use, such as during walking, while having some flexibility in order to enhance the wearer's comfort during walking. Depending on the preferred use of the shoe, a suitable material can be chosen. Examples of such materials besides polyurethane is EVA (Ethylene Vinyl Acetate), etc.

As a next step, the comfort layer 40 is placed on top of the inner ventilating sole element 61 and attached to it using an adhesive. The inner ventilating sole element 61 and the comfort layer 40 are then placed in the desired position with respect to the upper assembly 8 in a mould, wherein the surrounding sole element material is injection-moulded onto the upper assembly 8 and the inner ventilating sole element 61. In this way, the surrounding sole element 81 adheres to the upper assembly 8 as well as to the inner sole ventilating element 61, such that a lasting, integral joint of these elements is achieved through the sole material of the surrounding sole element 81. Suitable materials for the surrounding sole element are polyurethane, EVA, PVC or rubber, etc.

In the embodiment of FIG. 2*a*, the netband 15 wraps around the corner of the upper portion 10, i.e. the part of the upper portion 10 where the upper functional layer laminate 17 and the netband 15 of the upper material 11 are bent from a substantially horizontal orientation to a substantially vertical orientation. The part having a substantially vertical orientation forms the side walls for the wearer's foot. Accordingly, the sole material of the surrounding sole element 81 may penetrate through the netband 15 and onto the upper membrane from the underside and from the lateral sides of the upper assembly 8. In this way, a strong, multi-directional attachment between the surrounding sole element 81 and the upper functional layer laminate 17 is achieved, as well as a good seal provided between the laminates 17, 24.

In the exemplary embodiment of FIG. 2*a*, the surrounding sole element 81 reaches further down than the inner ventilating sole element 61, which leads to a supporting of the wearer's weight by only the surrounding sole element 81 on a plane surface. This may be desired, as only a portion of the sole needs to be designed for continuous load bearing of the wearer, whereas the material used for the inner ventilating sole element 61 may be chosen based on the manufacturing characteristics for producing the channel system 160 and/or based on a minimisation of weight of the ventilating sole element 61 and therefore of the centre portion of the sole 7 of the shoe 301*a* in which the ventilating sole element 61 is situated.

Even though, according to the exemplary embodiment of FIG. 2*a*, the sole 7 of the shoe 301*a* is not shown to have an outer sole, it is pointed out that such an additional sole element could be provided therewith as well as with all other embodiments described. Also, the undersides of the inner ventilating sole element 61 and the surrounding sole element 81 are not provided with a tread structure for improving the grip of the sole assembly 7 on the ground during use of the shoe. It is, however, pointed out that tread elements may be provided at the underside of the sole in all embodiments described. Exemplary tread structures/elements will be described below.

Figure 2B:
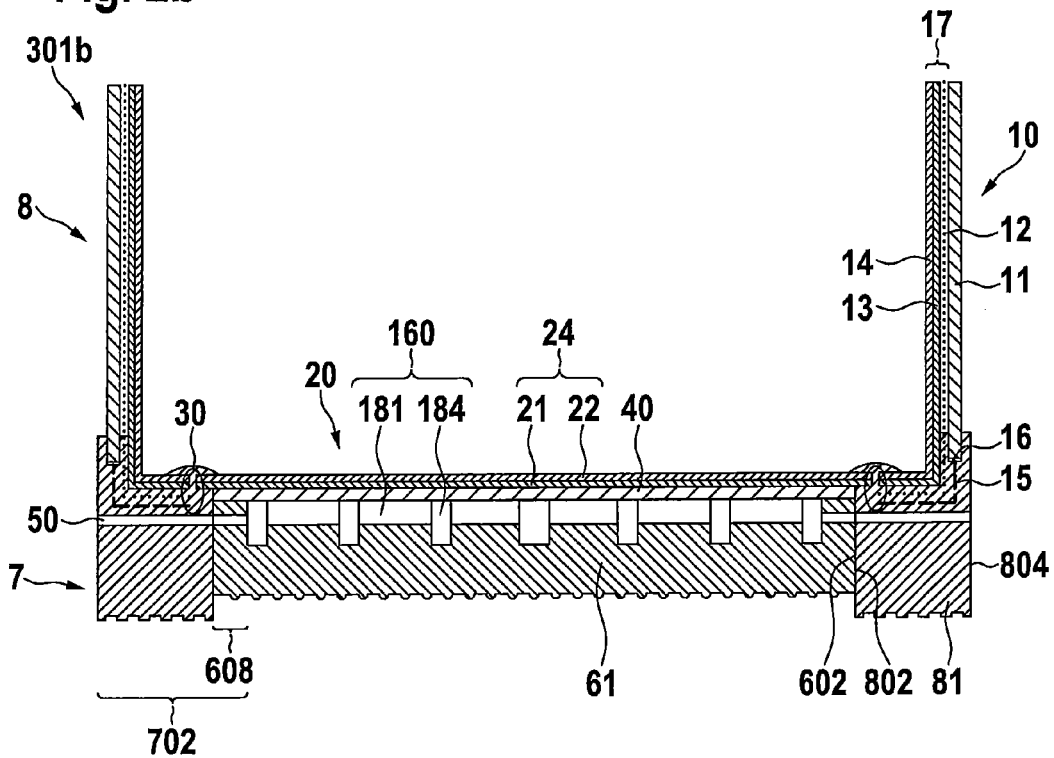
FIG. 2b is a schematic cross-sectional view of a shoe in accordance with a third embodiment of the invention.

FIG. 2*b* shows a cross-section through a shoe 301*b* according to another embodiment. Many elements of the shoe 301*b* are identical to the corresponding elements of the shoe 301*a* shown in FIG. 2*a*. Like or similar elements are denoted with like reference numerals, and a description thereof is omitted for brevity.

The channel structure 160 of the inner ventilating sole element 61 of the shoe 301*b* is shown to have a plurality of longitudinal channels 184, which are rectangular in cross-section. The longitudinal channels 184 are connected to each other and to the lateral passages 50 by a plurality of transverse channels 181, one of which being positioned and shown in the cross-sectional plane of FIG. 2*b*. Each of the lateral ends of the transverse channel 181 coincides with a longitudinal channel 184, and no air and moisture discharging ports are provided in the transverse channels 181. The positioning of these lateral ends is adapted to the positioning of the lateral passages 50, which extend through the side wall 608 of the inner ventilating sole element 61 and the surrounding sole element 81, such that the lateral passages 50 and the transverse channel 181 allow for air flow therethrough. The small cross-sectional area of the lateral passage 50 through the side wall 608 of the inner ventilating sole element 61 as compared to the cross-sectional area of the transverse channel 181 at its lateral ends has the advantage that a large connection area between the lateral surface 602 of the inner ventilating sole element 61 and the inner lateral surface 802 of the surrounding sole element 81 is provided, such that a strong attachment can be achieved.

The longitudinal channels 184 of the channel structure 160 of the shoe 301*b* extend deeper into the inner ventilating sole element 61 than the transverse channels 181. The provision of channels with different heights is one measure of achieving a desired compromise between channel volume and inner ventilating sole material volume, i.e. a desired compromise between air flow volume and sole stability. Accordingly, different height channels may also be used in the other embodiments described.

In addition to the differences in the channel structure 160, a number of further differences between the embodiment of FIG. 2*a* and the embodiment of FIG. 2*b* exist.

The inner ventilating sole element 61 of the shoe 301*b* does not comprise a circular lip. The surrounding sole element 81 is arranged below a portion of the upper functional layer laminate 17 as well as below a portion of the bottom functional layer laminate 24. In this way, the surrounding sole element 81 allows for a strong attachment and sealing of these laminates to each other. Moreover, the comfort layer 40 is extended over the full width of the inner ventilating sole element 61, such that the wearer benefits from the comfortable feel thereof over a large portion of the underside of the foot.

In the exemplary embodiment of FIG. 2*b*, the inner ventilating sole element 61 and the surrounding sole element 81 are provided with tread elements, in particular with a pattern of protruding and receding portions, for improving the walking characteristics of the shoe 301*b*.

It is pointed out that it is possible that the upper material 11, the mesh 12, the upper membrane 13 and the textile lining 14 are formed as a four-layer laminate in the embodiment of FIG. 2*b* as well as in the other embodiments described.

Figure 2C:
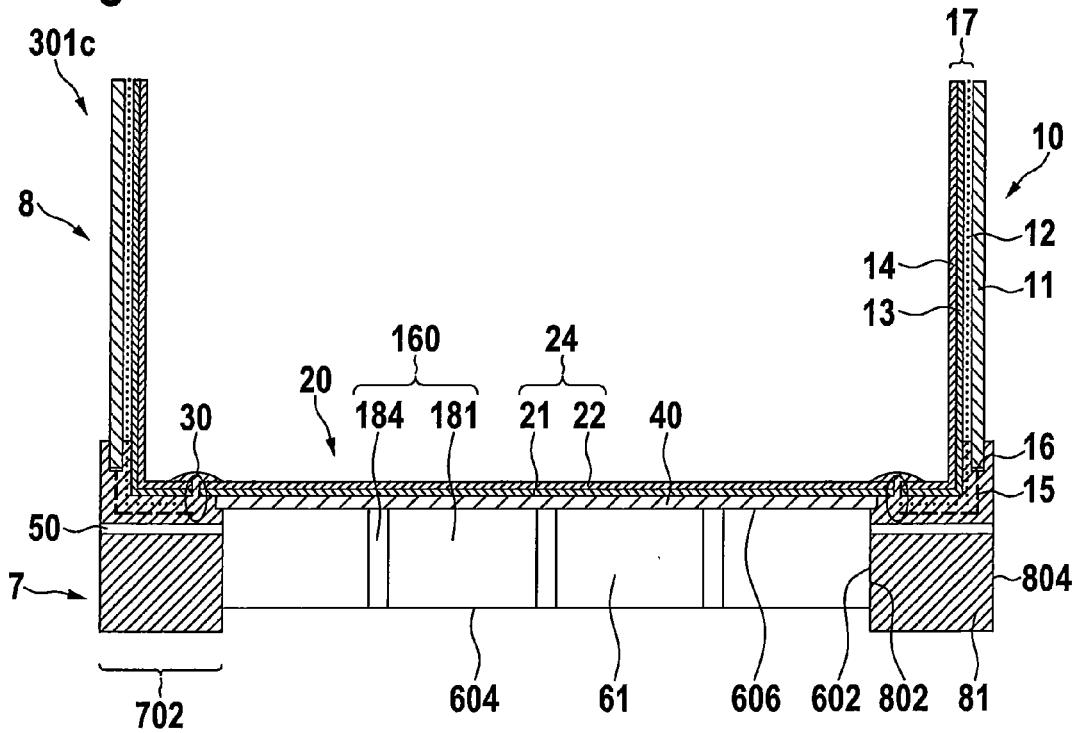
FIG. 2c is a schematic cross-sectional view of a shoe in accordance with a fourth embodiment of the invention.

FIG. 2*c* shows a cross-section through a shoe 301*c* according to another embodiment. Many elements of the shoe 301*c* are identical to the corresponding elements of the shoe 301*b* shown in FIG. 2*b* and shoe 301*a* shown in FIG. 2*a*, with a description thereof omitted for brevity. However, the inner ventilating sole element 61 of the shoe 301*c* is different from the inner ventilating sole element 61 of the shoe 301*b*. The inner ventilating sole element 61 of the shoe 301*c* comprises longitudinal channels 184 and transverse channels 181 that extend from the upper surface 606 of the inner ventilating sole element 61 to the lower surface 604 of the inner ventilating sole element 61. In other words, the channels in the inner ventilating sole element 61 extend along the whole height of the inner ventilating sole element 61. In this way, water vapour is communicated from the underside of the bottom functional layer laminate 24 to the underside of the shoe 301*c* through the channels in addition to being communicated to the lateral sides of the shoe 301*c* through the lateral passages 50. Accordingly, water vapour can be discharged from the inside of the shoe into all directions.

The cross-sectional view of FIG. 2c cuts through a transverse channel 181 of the channel system 160 of the inner ventilating sole element 61 of the shoe 301c. The water vapour entering the inner ventilating sole element 61 from the inside of the shoe 301c partially exits the shoe at its underside via the longitudinal channels 184 and the transverse channels 181 of the channel structure 160 and partially through the lateral passages 50, wherein the transverse channels 181 allow for the air communication between the channel system 160 of the inner ventilating sole element 61 and the lateral passages 50. The transverse channels 181 extend across the full width of the inner ventilating sole element 61, such that the side wall 702 of the ventilating sole element is formed by the surrounding sole element 81 only. When seen from the bottom, the inner ventilating sole element 61 of the shoe 301c is comprised of a plurality of individual inner ventilating sole element blocks separated by the longitudinal and transverse channels.

Again, the transverse channels 181 and/or the longitudinal channels 184 may extend over any portion of the height of the inner ventilating sole element 61, particularly over the whole height, as shown, or over a portion of the height extending from the top of the inner ventilating sole element 61 to the inside thereof. Also, the channels in the inner ventilating sole element 61 may have any direction between the longitudinal direction of the shoe 301c and the transverse direction of the shoe 310c, when seen from its top or bottom. In other words, the channels may be oriented in any direction in the inner ventilating sole element 61, when looking at a horizontal cross-section through the sole of the shoe.

It is pointed out that the individual components of the inner ventilating sole element may be injection-moulded onto the upper assembly 8 in separate injection-moulding steps.

The comfort layer 40 of the shoe 301c extends across the entire lateral extension of the inner ventilating sole element 61 and an adjacent portion of the surrounding sole element 81. In this way, any discontinuities between the inner ventilating sole element 61 and the surrounding sole element 81, which may be present due to a particular design, such as a lip or collar at the lateral edges of the inner ventilating sole element 61, or due to manufacturing process imperfections, may be covered with the comfort layer 40, such that these discontinuities are not detrimental to the wearer's comfort or to the bottom membrane 21. It is pointed out that the comfort layer 40 may also extend beyond the inner ventilating sole element 61 in other embodiments shown.

Figure 2D:
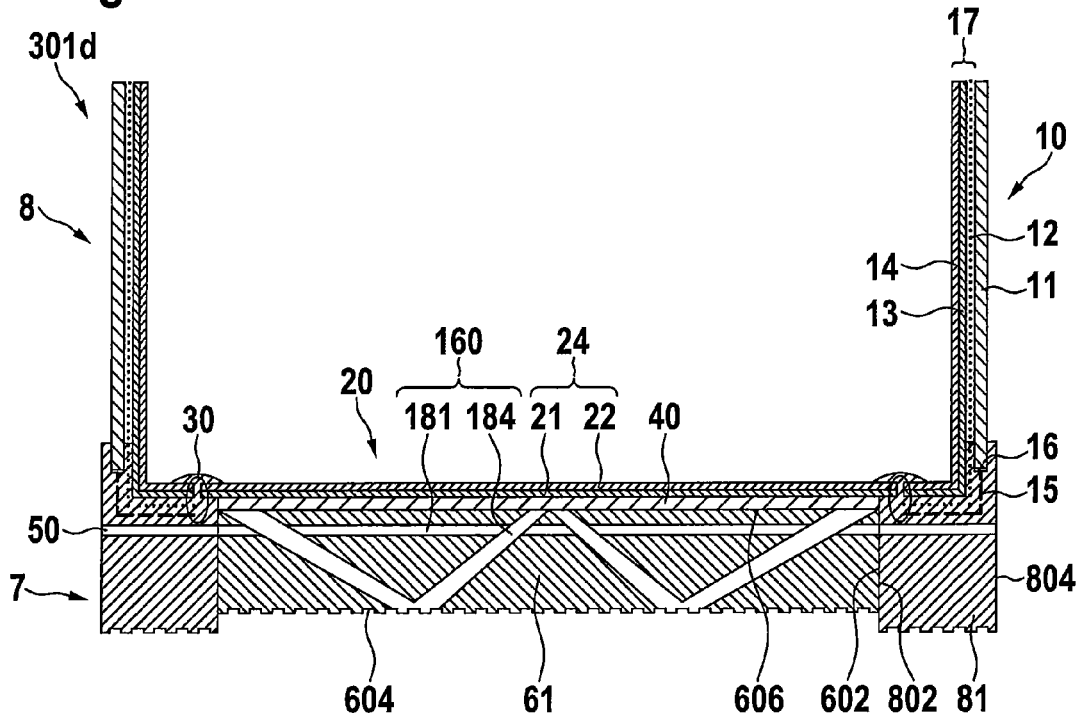
FIG. 2d is a schematic cross-sectional view of a shoe in accordance with a fifth embodiment of the invention.

FIG. 2d shows a cross-section through another embodiment of a shoe 301d in accordance with the invention. Again, all elements of the shoe 301d are identical to the corresponding elements of the shoe 301a shown in FIG. 2a, with the exception of the inner ventilating sole element 61. The inner ventilating sole element 61 of the shoe 301d comprises channels 184 that extend through the whole height of the inner ventilating sole element 61. The channels are diagonal, meaning that their open ends at the upper surface 606 of the inner ventilating sole element 61 are offset from their open ends at the lower surface 604 of the inner ventilating sole element 61. This has the advantage that sharp objects that might enter into these diagonal channels, e.g. tacks or nails lying on the ground will normally not pass up the channel, but get stuck in the material of the inner ventilating sole element 61 and therefore will not damage the functional layer lying above the channels. In the embodiment of FIG. 2d, the diagonal channels 184 are longitudinal channels, with their open ends at the upper surface 606 of the inner ventilating sole element 61 being offset in a transverse direction from their open ends at the lower surface 604 of the inner ventilating sole element 61. The diagonal longitudinal channels are connected by horizontal channels 181 in the transverse direction of the shoe 301d, i.e. by transverse channels 181. The transverse channels 181 allow for fluid communication between the diagonal channels 184 and the lateral passages 50. Again, the transverse channels 181 may have any vertical extension. They may extend the whole height of the inner ventilating sole element 61 as well as only portions of it. They may be covered by sole material of the inner ventilating sole element 61 when viewed from the top of the inner ventilating sole element 61, as shown, but they may also extend from the top of the inner ventilating sole element 61 to the inside thereof. It is also possible that the transverse channels are diagonal channels and that the longitudinal channels have a vertical orientation, as for example shown in FIG. 2b. Also, both the longitudinal and the transverse channels may be diagonal, intersecting and forming a particular fluid communication channel structure. In the embodiment of FIG. 2d again, water vapour is communicated from the inside of the shoe to the underside of the upper assembly 8 and from there together with the air through the channels and passages out of the sole, allowing for a water vapour discharge from the foot in all directions.

Again, the comfort layer 40 is shown to be provided directly on top of the inner ventilating sole element 61.

Figure 3A:
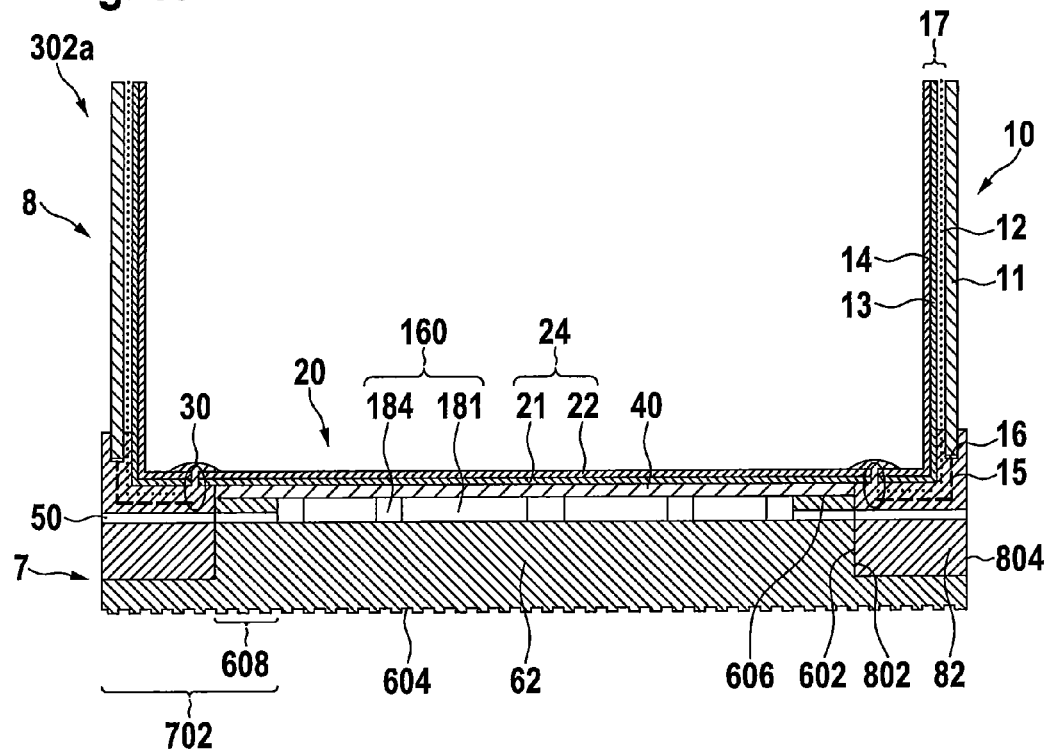
FIG. 3a is a schematic cross-sectional view of a shoe in accordance with a sixth embodiment of the invention.

FIG. 3a shows a cross-section through a shoe 302a according to another embodiment. Many components of the shoe 302a are similar or identical to the corresponding elements of the shoe 301b depicted in FIG. 2b. A description thereof is therefore omitted for brevity.

However, the ventilating sole element of the shoe 302a comprises an inner ventilating sole element 62 and a surrounding sole element 82 that are different from the corresponding elements of the shoe 301b. The inner ventilating sole element 62 has a varying lateral extension from the upper surface 606 to the lower surface 604. On the upper surface 606 and for approximately the upper two thirds of the inner ventilating sole element 62, the lateral extension is constant and corresponds to the extension of the inner ventilating sole element 61 of the shoe 301b. Throughout a lower portion of the inner ventilating sole element 62, the inner ventilating sole element 62 extends over the complete lateral extension of the sole assembly 7. The inner ventilating sole element 62 comprises the entire contact area between the sole assembly 7 and the ground. The inner ventilating sole element 62 extends underneath the surrounding sole element 82, such that the surrounding sole element 82 does not touch the ground when the shoe is positioned on its sole. The surrounding sole element 82 fills the lateral pocket between the inner ventilating sole element 62 and the upper assembly 8. It also covers a lower part of the side walls of the upper assembly 8, i.e. it is also adjacent a part of the upper portion 10 of the upper assembly 8 that is arranged in a substantially vertical direction. The inner ventilating sole element 62 comprises five longitudinal channels 184 in the depicted cross-sectional plane, the longitudinal channels 184 extending approximately one third into the inner ventilating sole element 62 from the upper surface 606 thereof. The longitudinal channels 184 of the shoe 302a are connected by transverse channels 181 to each other and to the lateral passages 50, with the cross-section of FIG. 3a cutting through one of the transverse channels 181. The transverse channels 181 have the same height extension as the longitudinal channels 184 and also extend from the upper surface 606 of the inner ventilating sole element 62 thereinto. The longitudinal channels 184 and the transverse channels 181 may be seen as grooves extending into the inner ventilating sole element 62 from its upper surface 606. Again, many other channel structures are also possible to effect fluid communication between the top of the inner ventilating sole element 62 and the lateral passages 50, as described with respect to the other Figures.

The design of the shoe 302*a* allows for a small amount of sole material being needed for the surrounding sole element 82. The inner ventilating sole element 62, which takes up most of the volume of the sole assembly 7, may be produced separately, and the surrounding sole element 82 may be produced in a quick, well-controlled injection-moulding step. This step may be the last step in finishing the shoe manufacturing.

Figure 3B:
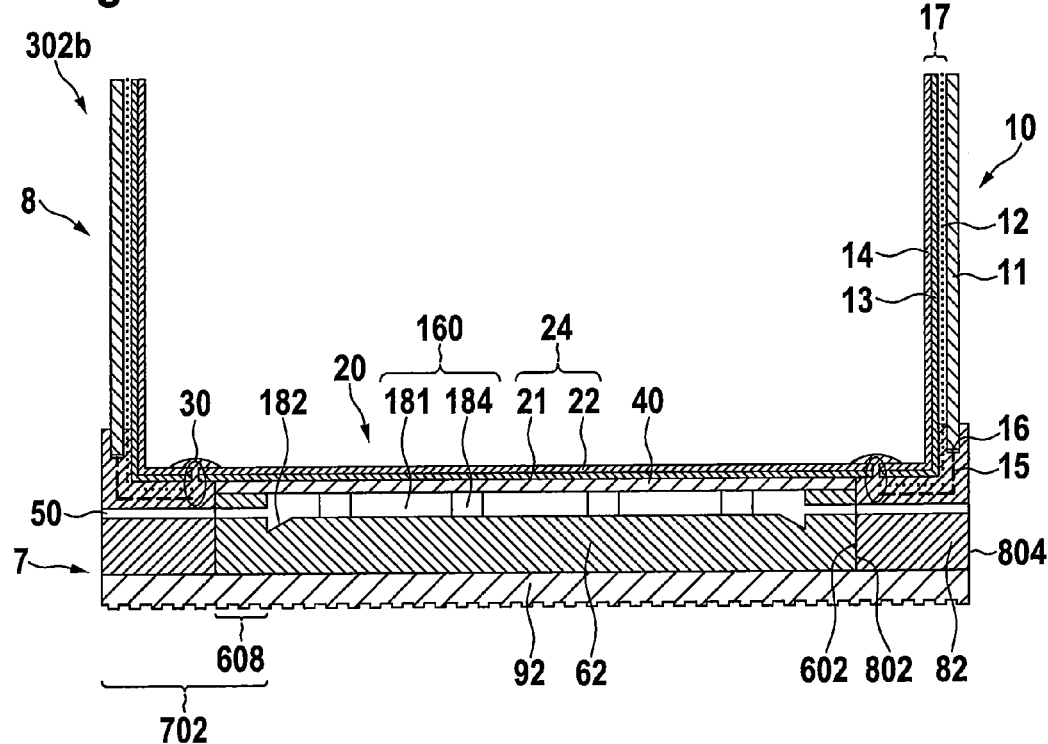
FIG. 3b is a schematic cross-sectional view of a shoe in accordance with a seventh embodiment of the invention.

FIG. 3*b* shows a cross-section through a shoe 302*b* according to another embodiment. The shoe 302*b* is identical to the shoe 302*a* of FIG. 3*a*, with the exception of the sole assembly 7. The ventilating sole element of the shoe 302*b* comprises an inner ventilating sole element 62 and a surrounding sole element 82. An outsole 92 is provided below the inner ventilating sole element 62 and the surrounding sole element 82. The surrounding sole element 82 of the shoe 302*b* is identical to the surrounding sole element 82 of the shoe 302*a*, shown in FIG. 3*a*. The inner ventilating sole element 62 of the shoe 302*b* extends between the inner lateral surface 802 of the surrounding sole element 82. The outsole 92 extends across the entire width of the sole assembly 7 of the shoe 302*b*. It covers both the undersides of the inner ventilating sole element 62 and the surrounding sole element 82. The outsole 92 is the only element of the shoe 302*b* coming into contact with the ground during normal use of the shoe 302*b* on an even surface. This design has the advantage that a particularly suitable material for the outsole 92 can be chosen independently from any requirements for the inner ventilating sole element 62 and the surrounding sole element 82. For example, a thermoplastic polyurethane (TPU) or rubber or leather can be used. Also, the materials of the inner ventilating sole element 62 and the surrounding sole elements 82 may be chosen purely based on factors such as comfort for the wearer, stability of the sole, bonding properties during the manufacture of the shoe 302*b*, without having to worry about the wear and tear of the sole through the continuous contact of the sole to the ground during use.

The channel structure 160 of the inner ventilating sole element 62 has four longitudinal channels 184 in the cross-sectional plane of FIG. 3*b*. The channel structure also comprises transverse channels 181, one of which being shown in the cross-sectional plane of FIG. 3*b*. The laterally outermost longitudinal channels 184 are not positioned at the lateral ends of the transverse channel 181. At the lateral ends of the transverse channels 181, air and moisture discharging ports 182 are provided. The air and moisture discharging ports comprise recesses in the floor of the transverse channel 181, with the floor having an inclined shape in the exemplary embodiment of FIG. 3*b*. The lateral ends of the transverse channel 181 are in air communication with the lateral passages 50, which extend through the side wall 608 of the inner ventilating sole element 62 and the surrounding sole element 82. It is apparent that the channel structure 160 may be modified in various different ways as described above.

Figure 3C:
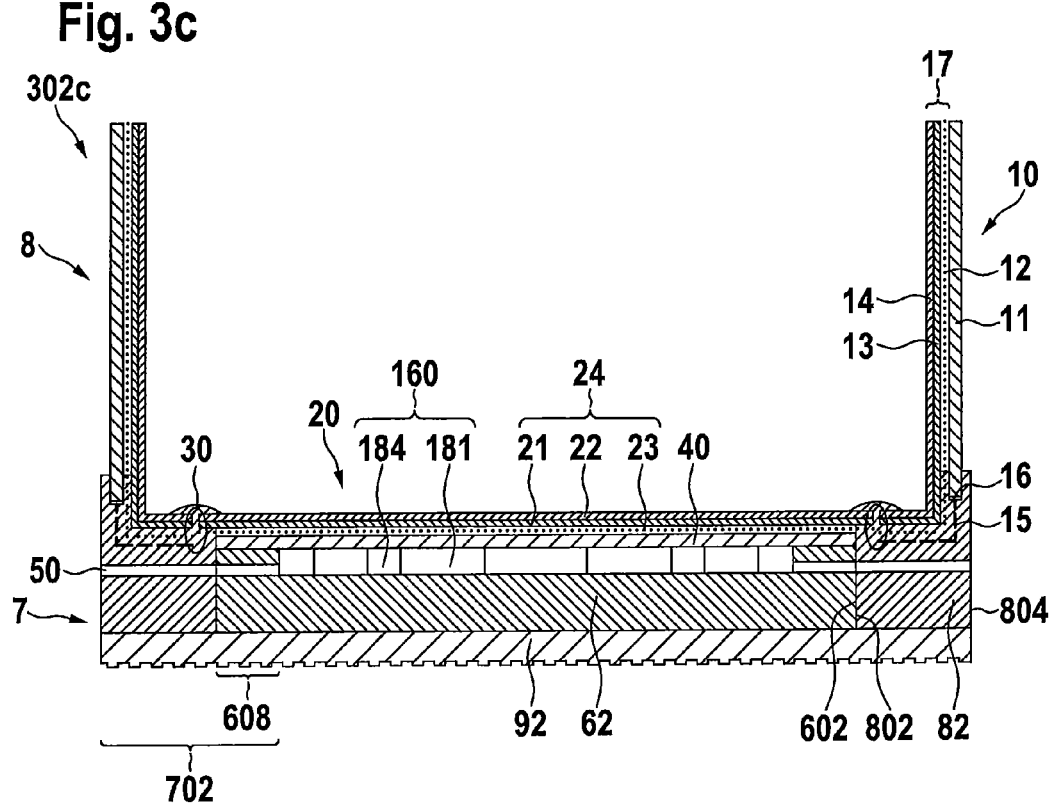
FIG. 3c is a schematic cross-sectional view of a shoe in accordance with an eighth embodiment of the invention.

FIG. 3*c* shows a cross-section through a shoe 302*c* according to another embodiment. Many elements of the shoe 302*c* are identical to the corresponding elements of the shoes 302*a* and 302*b* shown in FIGS. 3*a* and 3*b*, with a description thereof omitted for brevity.

The bottom functional layer laminate 24 of the bottom portion 20 of the upper assembly 8 of the shoe 302*c* is a three-layer laminate, which comprises—from bottom to top—a mesh 23, a bottom waterproof and breathable membrane 21 and a supporting textile 22. The mesh 23 may give the bottom functional layer laminate 24 enhanced stability. It is pointed out that the bottom functional layer laminate 24 of the other embodiments may also be the three-layer laminate, as comprised in the shoe 302*c*.

Figure 3D:
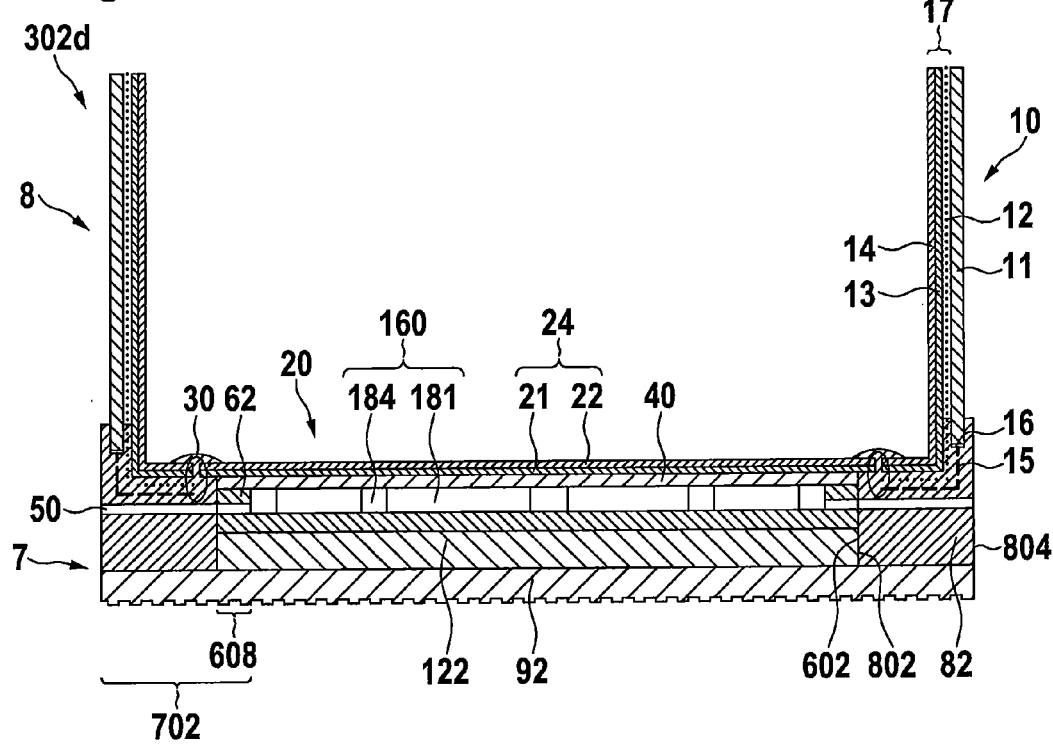
FIG. 3d is a schematic cross-sectional view of a shoe in accordance with a ninth embodiment of the invention.

FIG. 3*d* shows a cross-section through a shoe 302*d* according to another embodiment. Many elements of the shoe 302*d* are identical to the corresponding elements of the shoe 302*b* shown in FIG. 3*b*, with a description thereof being omitted for brevity. The inner ventilating sole element 62 of the shoe 302*d* extends in between the surrounding sole element 82 in an upper portion of the vertical extension of the surrounding sole element 82. The height extension of the inner ventilating sole element 62 is approximately half the height extension of the surrounding sole element 82 underneath the upper assembly 8. The channel system 160 of the inner ventilating sole element 62 is similar to the channel system 160 of the inner ventilating sole element 62 of the shoe 302*a*, shown in FIG. 3*a*. Below the inner ventilating sole element 62, there is provided a sole comfort layer 122, also referred to as midsole 122. The sole comfort layer 122 is co-extensive with the inner ventilating sole element 62 in the lateral dimension. The sole comfort layer 122 does not comprise air communication channels in the embodiment shown in FIG. 3*d*, but may also comprise air communication channels in other embodiments. The three-layered design over a large portion of the lateral extension of the sole assembly 7, i.e. the arrangement of inner ventilating sole element 62, the sole comfort layer 122 and the outsole 92 on top of each other, allows for selecting a plurality of materials highly suitable for certain tasks. In particular, the material for the outsole 92 may be selected based on its grip and abrasion properties, the material for the sole comfort layer 122 may be selected based on its comfort and cushioning capabilities, and the material for the inner ventilating sole element 62 may be selected based on its ability to provide stability while having a channel structure therein. These elements may be attached to each other through gluing, injection-moulding or other suitable techniques.

Figure 3E:
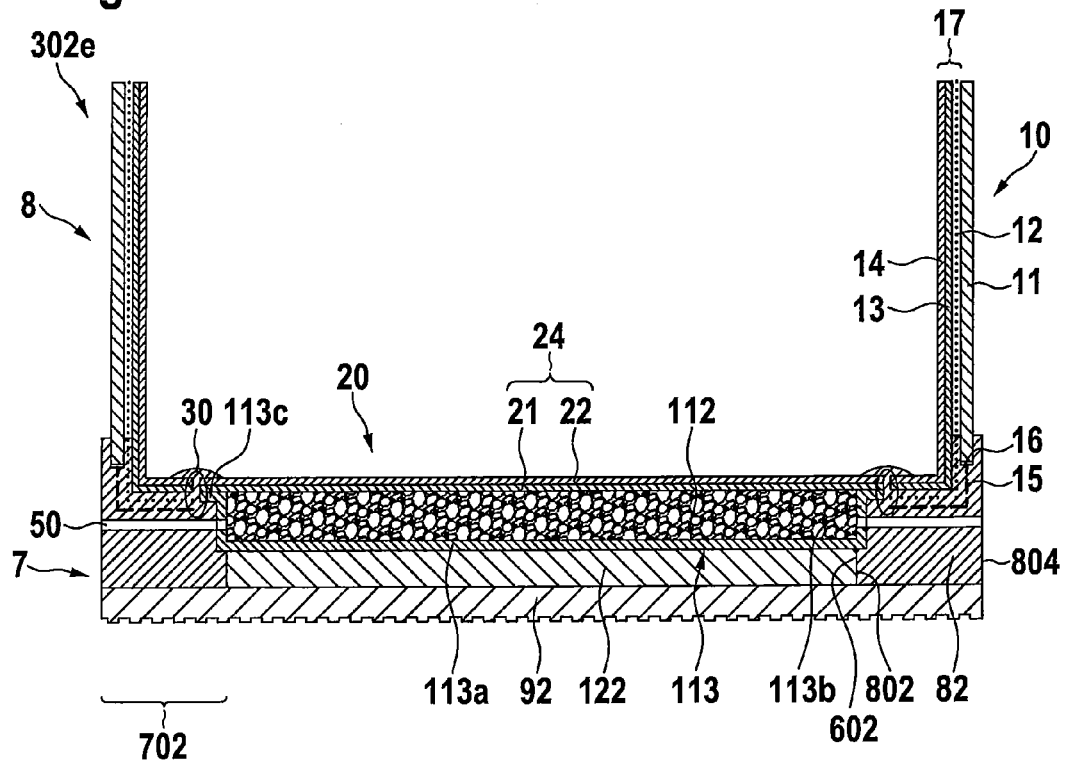
FIG. 3e is a schematic cross-sectional view of a shoe in accordance with a tenth embodiment of the invention.

FIG. 3*e* shows a cross-section through a shoe 302*e* according to another embodiment. Many elements of the shoe 302*e* are identical to the corresponding elements of the shoe 302*d* shown in FIG. 3*d*, with a description thereof being omitted for brevity.

In contrast to the shoe 302*d*, the shoe 302*e* does not comprise a comfort layer and a channeled inner ventilating sole element. It is, however, pointed out that a comfort layer, as discussed above, may also be present in the embodiment of the shoe 302*e*. It is also pointed out that the comfort layer may be dispensed with in the other embodiments described.

The ventilating sole element of the shoe 302*e* comprises a container element 113. The container element 113 is filled with a structure or material 112 allowing for air flow through it. The structure or material 112 extends through the whole volume of the container element 113, which is confined by a bottom part 113*a* and a side wall 113*b*. The structure or material 112 allows for air communication between the underside of the bottom functional layer laminate 24 and the lateral passages 50. The lateral passages 50 extend through the side wall 113*b* of the container element 113 and the surrounding sole element 82. Accordingly, the side wall 113b of the container element 113 and the surrounding sole element 82 form the side wall 702 of the ventilating sole element. It is also possible that the material of the side wall 113b of the container element 113 is made of a material which allows for air flow through it, e.g. a porous material.

The container element 113 comprises a circular lip 113c at its upper lateral edge. The circular lip 113c is attached to the upper assembly 8 via the strobel stitch 30, such that at least the container element 113, including the structure or material 112, is fixed with respect to the upper assembly 8, before the surrounding sole element 82 is injection-moulded. It is also possible that the container element 113, the sole comfort layer 122, also referred to as midsole 122, and the outsole 92 are attached to each other, before this composite sole structure is attached to the upper assembly 8 via strobel stitch 30.

The container element 113 forms the inner ventilating sole element of the shoe 302e. Its placement underneath the bottom functional layer laminate 24 of the upper assembly 8 establishes an air communication between the inside of the shoe, the container element 113 and the lateral passages 50 provided in the side wall of the container element 113 and the surrounding sole element 82.

The structure or material 112 may be any such structure or material suitable for allowing air communication and for supporting a desired portion of the wearer's weight during use of the shoe. The structure or material 112 may be comprised of a number of filler elements placed in the container element 113, such that air flow can occur through the voids in between the filler elements. Examples for such a structure or material are man made fabrics with open cell structure or other suitable materials, as described above.

The structure or material 112 allowing for air flow through it may be continuous, three-dimensionally formed such as a spacer or else a porous structure or material, having inherent air flow permitting properties.

It is pointed out that the inner ventilating sole element of other embodiments may also be substituted by the structure or material 112 allowing for air flow through and, if necessary, the container element 113. It is also possible that the whole ventilating sole element is made from an air flow permitting material, such as a porous material, which allows the water vapour discharge from the underside of the upper assembly 8 through lateral passages in the material.

Figure 3F:
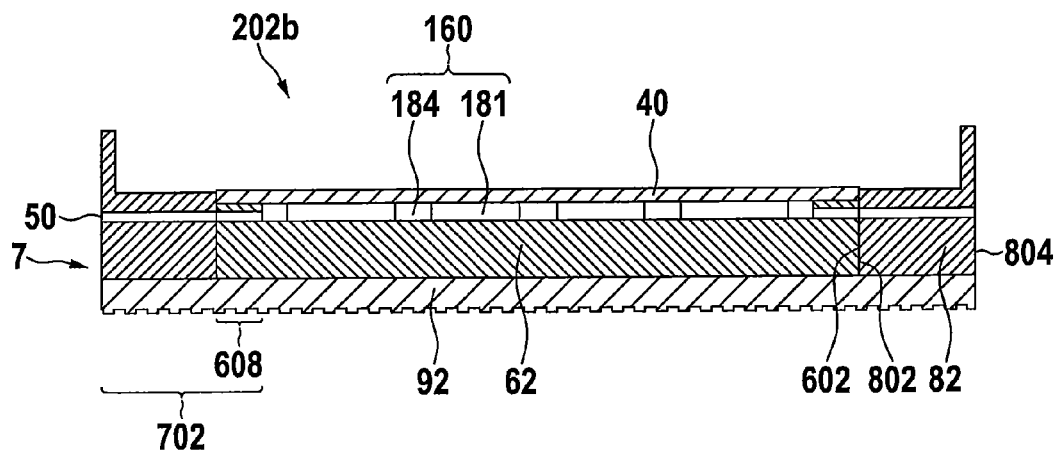
FIG. 3f is a schematic cross-sectional view of a sole in accordance with the eighth embodiment of the invention.

FIG. 3f shows a cross-section through a sole 202b in accordance with another embodiment. The sole 202b corresponds substantially to the sole of the shoe 302c, shown in FIG. 3c, with the exception of a slightly different channel structure 160. Accordingly, a detailed description is omitted for brevity. The sole 202b may be manufactured as a separate element and may be attached to the upper assembly 8 of the shoe 302c or any other upper assembly described herein. The attachment may be achieved by gluing, injection-moulding or any other suitable attachment technique.

Figure 4A:
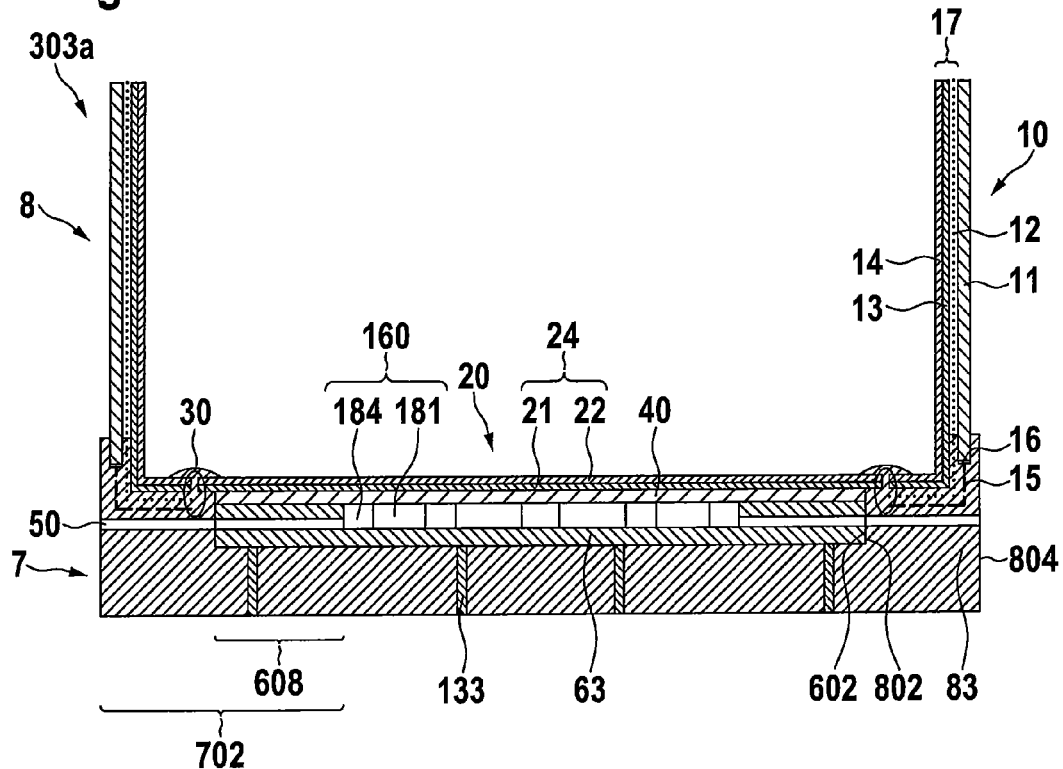
FIG. 4a is a schematic cross-sectional view of a shoe in accordance with an eleventh embodiment of the invention.

FIG. 4a shows a cross-section through a shoe 303a according to another embodiment. The upper assembly 8, comprising the upper portion 10, the lower portion 20 and the connection 30 thereof, and the comfort layer 40 of the sole assembly 7 are identical to the upper assembly 8 and the comfort layer 40 of the shoe 302d, shown in FIG. 3d. Also, regarding its outer dimensions, the inner ventilating sole element 63 of the shoe 303a is identical to the inner ventilating sole element 62 of the shoe 302d. Regarding the channel structure 160, the inner ventilating sole element 63 of the shoe 303a is fairly similar to the inner ventilating sole element 62 of the shoe 302a. However, the channel structure of the inner ventilating sole element 63 is less wide, and the side wall 608 of the inner ventilating sole element 63 has a greater lateral extension. A detailed description of these elements is omitted for brevity. The ventilating sole element of the shoe 303a comprises the inner ventilating sole element 63 and the surrounding sole element 83. Again, lateral passages 50 are provided, which extend through the side wall 702 of the ventilating sole element for effecting air communication between the channel structure of the inner ventilating sole element 63 and the lateral outside of the sole assembly 7 of the shoe 303a.

The surrounding sole element 83 not only surrounds the ventilating sole element 63 laterally, but also passes underneath or is arranged below it in the exemplary embodiment of shoe 303a. The surrounding sole element 83 comprises supporting members 133. The supporting members 133 extend vertically through the surrounding sole element 83. They are positioned below the inner ventilating sole element 63. In the present embodiment, the surrounding sole element 83 comprises four supporting members 133 equally spaced below the inner ventilating sole element 63. Depending on their extension in the longitudinal direction of the shoe 303a, the supporting members 133 may be ribs or stilts. In other words, the supporting members 133 may have longitudinal extensions substantially equal to their transverse extensions, shown in FIG. 4a, or may have longitudinal extensions substantially larger than their transverse extensions. In another embodiment, the supporting members may be formed as transverse ribs.

The supporting members 133 may be manufactured as follows. The supporting members 133 may be made from the same material as the inner ventilating sole element 63. In this case the inner ventilating sole element 63 and the supporting members 133 may be injection-moulded integrally in one injection-moulding step. Accordingly, the surrounding sole element 83 may then be injection-moulded around the inner ventilating sole element 63, parts of the upper assembly 8 and the supporting members 133 in a subsequent injection-moulding step. It is also possible that the supporting members 133 are manufactured separately. In this case, they may either be attached to the inner ventilating sole element 63 or may be kept in a fixed position with respect to the inner ventilating sole element 63 in a mould, before the surrounding sole element 83 is injection-moulded.

The supporting members 133 contribute to the stability of the sole, in particular of the ventilating sole element of the shoe 303a. Their positioning underneath the inner ventilating sole element 63 may offset stability disadvantages that may arise from the channeled structure of the inner ventilating sole element 63. Moreover, the supporting members 133 allow for a less restricted selection of the material for the surrounding sole element 83, because sole stability is less of a concern. The supporting members 133 also keep the inner ventilating sole element 63 elevated to allow the surrounding sole element material 83 to flow underneath the inner ventilating sole element 63 during injection moulding.

Figure 4B:
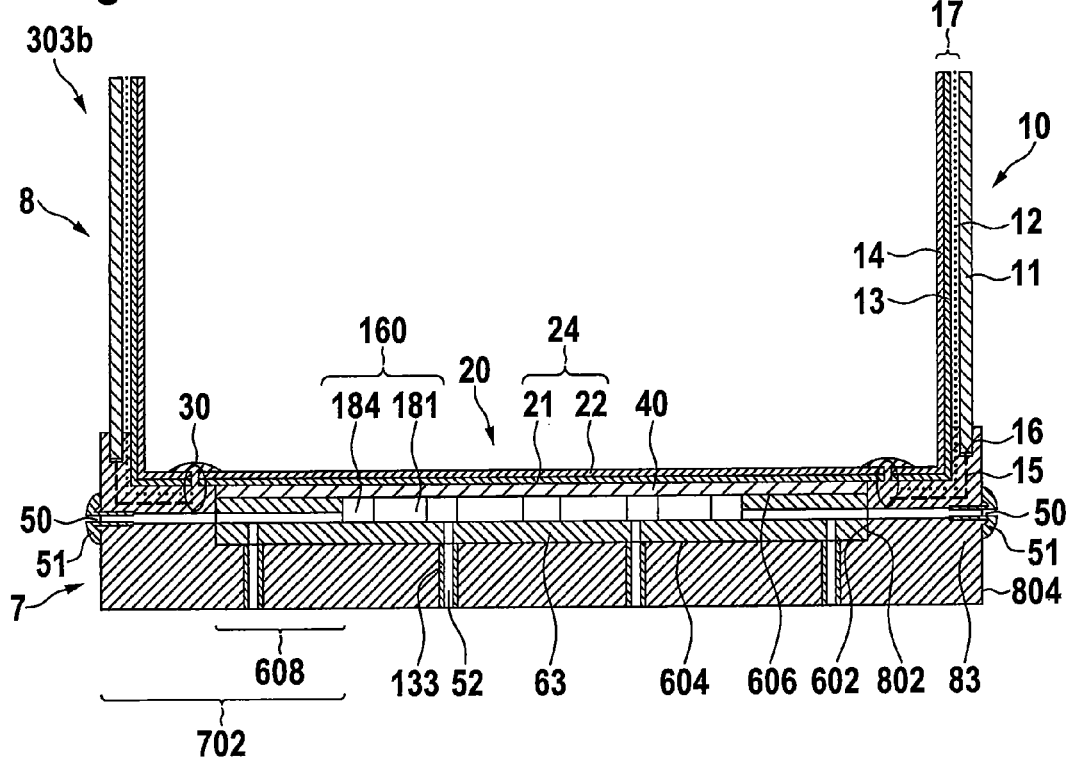
FIG. 4b is a schematic cross-sectional view of a shoe in accordance with a twelfth embodiment of the invention.

FIG. 4b shows a cross-section through a shoe 303b according to another embodiment. Many elements of the shoe 303b are identical to the corresponding elements of the shoe 303a, shown in FIG. 4a, such that a description thereof is omitted for brevity. The inner ventilating sole element 63 of the shoe 303b comprises the channels given in the inner ventilating sole element 63 of the shoe 303a. Also, the lateral passages 50, extending through the side wall 608 of the inner ventilating sole element 63 and through the surrounding sole element 83, are identical to the lateral passages 50 of the shoe 303b. Additionally, vertical passages 52 are provided, which extend vertically from the channel structure of the inner ventilating sole element 63 through the inner ventilating sole element 63 to its lower surface 604 and further through the surrounding sole element 83. The vertical channels 52 allow for air flow between the channel structure of the inner ventilating sole element 63 and the underside of the sole assembly 7. In this way, vertical water vapour and air discharge channels are provided in the shoe 303b, such that a higher breathability is achieved. The supporting members 133 of the surrounding sole element 83 are arranged around the vertical channels 52 in the surrounding sole element 83. In other words, the supporting members 133 of the surrounding sole element 83 of the shoe 303a are hollow structures, through which the vertical channels 52 extend. It is pointed out that the surrounding sole element 83 may also be provided without hollow supporting members 133, but may still have vertical channels. In general words, vertical channels may extend through the surrounding sole element 83 in its portion below the inner ventilating sole element 63. Such vertical channels can be made by having vertical pins fixated in a bottom piston of the mould.

The shoe 303b additionally comprises inserts 51 arranged in at least a portion of the lateral passages 50 of the surrounding sole element 83. The inserts 51 are pin-shaped. They comprise pin-heads with the pin-head extension being greater than the diameter of the lateral passages 50. The inserts 51 have a hollow structure, such that air and water vapour discharge from the inner ventilating sole element 63 through the lateral passages 50 is effected through the inside of the inserts 51. The diameter of the lateral passages 50 may be enlarged so as to accommodate the inserts and ensure an adequate air flow through them.

Without the inserts 51, the walls of the lateral passages 50 may be rough or uneven from the manufacturing process, giving rise to turbulences in the air flow therethrough and diminished air and water vapour discharge capabilities. The hollow inserts 51 ensure that the air flow through the lateral passages 50 flows along smooth surfaces and is highly efficient in transporting air and water vapour from the inner ventilating sole element 63 to the outside of the sole of the shoe 303b. An unimpeded air and water vapour flow through the lateral passages may be achieved by the inserts 51 in a cheaper way than by optimizing manufacturing processes, such as injection-moulding processes for the surrounding sole element 83.

The inserts 51 may be removable inserts, allowing the wearer to insert them as desired to account for different usage scenarios. Being removable, the inserts 51 are also a way of making the appearance of the shoe adjustable by the wearer.

The inserts 51 may also be solid, i.e. not hollow, and removable. In this case, the wearer may insert the inserts 51 in extremely adverse usage environments, such as during heavy rainfalls or hiking through puddles or muddy terrain. In this way, an entering of water, mud, etc. into the sole may be completely prevented, such that the lateral passages 50 and the inner ventilating sole element 63 may not be clogged up or made impermeable to air flow in any other way for later use. Also, these solid inserts may be used in low temperature conditions, such that no flow of cold air through the lateral passages 50 and the inner ventilating sole element 63 causes discomfort to the wearer. In order to save material and weight, it is also possible to only make the heads of the pins solid, with the portions of the pins received by the lateral passages being hollow. Another measure against the discomfort of cold air flow is to provide an insulating comfort layer 40 or an insulating bottom functional layer laminate 24.

The inserts 51 may be made of metal or plastic or any other suitable material.

It is pointed out that the provision of the inserts 51 and the provision of the hollow supporting members 133 are independent. While they both may enhance the water vapour characteristics of the shoe 303b, one feature may also be provided without the other. Also, both features may be provided in the other embodiments discussed, separately or in combination.

FIG. 5 shows a cross-section through a shoe 304 according to another embodiment. Many elements of the shoe 304, particularly the whole upper assembly 8, are identical to the shoe 303a, as shown in FIG. 4a. Also, the inner ventilating sole element 64 of the shoe 304 is similar to the inner ventilating sole element 63 of the shoe 303a. The surrounding sole element 84 of the shoe 304 is modified as compared to the surrounding sole element 83 of the shoe 303a. The surrounding sole element 84 of the shoe 304 does not extend to the bottom of the shoe 304, i.e. to the surface area of the shoe 304 that gets into contact with the ground during normal use. The vertical extension of the surrounding sole element 84 of the shoe 304 is smaller than the vertical extension of the surrounding sole element 83 of the shoe 303a.

An outsole 94 is arranged underneath the surrounding sole element 84 of the shoe 304. The outsole extends over substantially the whole lateral extension of the surrounding sole element 84. In the cross-sectional view of FIG. 5, the outsole 94 extends over the whole width of the surrounding sole element 84. The outsole 94 is provided with a tread in order to increase traction for the wearer on a variety of surfaces. The outsole 94 does not comprise supporting members. Supporting members 134 are present in the surrounding sole element 84. Providing a separate outsole 94 for the shoe 304 has the same advantages as providing the outsole 92 for the shoe 302b, as discussed in connection with FIG. 3h.

FIG. 6a shows a cross-section through a shoe 305a according to another embodiment. The upper assembly 8 and the comfort layer 40 of the shoe 305a correspond to the upper assembly 8 and the comfort layer of the shoe 304, as described with reference to FIG. 5. The shoe 305a comprises a ventilating sole element having an inner ventilating sole element 65 and a surrounding sole element 85. The inner ventilating sole element 65 has a channel structure 160 identical to the channel structure 160 of the inner ventilating sole element 64 of the shoe 304 of FIG. 5. The surrounding sole element 85 has lateral passages 50, which are in fluid communication with the channel system 160 of the inner ventilating sole element 65.

The lateral extension of the inner ventilating sole element 65 changes somewhat below the height of the lower end of the lateral passages 50. Approximately half way from the upper surface 606 of the inner ventilating sole element 65 to its lower surface 604, the inner ventilating sole element 65 extends across almost the entire width of the transverse extension of the ventilating sole element. The surrounding sole element 85 forms a sole element surrounding the lateral surface 602 of the wider portion of the inner ventilating sole element 65. It also covers the lower surface 604 of the inner ventilating sole element 65, thereby forming the contact surface of the shoe 305a with the ground. The surrounding sole element 85 also fills the pocket between the inner ventilating sole element 65 and the upper assembly 8, thereby effecting an attachment between these two components and a waterproof seal between the upper portion 10 and the lower portion 20.

The surrounding sole element 85 comprises supporting members 135 arranged below the inner ventilating sole element 65. The design of the ventilating sole element of the shoe 305*a* ensures that the cushioning and comfort capacities of the inner ventilating sole element 65 are taken advantage of over a large volume of the ventilating sole element, while the complete surrounding of the inner ventilating sole element 65 by the surrounding sole element 85 allows for a uniform optical appearance of the shoe and for the provision of a durable outer material across all outer walls of the sole assembly 7. The surrounding sole element 85 is provided with a tread structure.

Figure 6B:
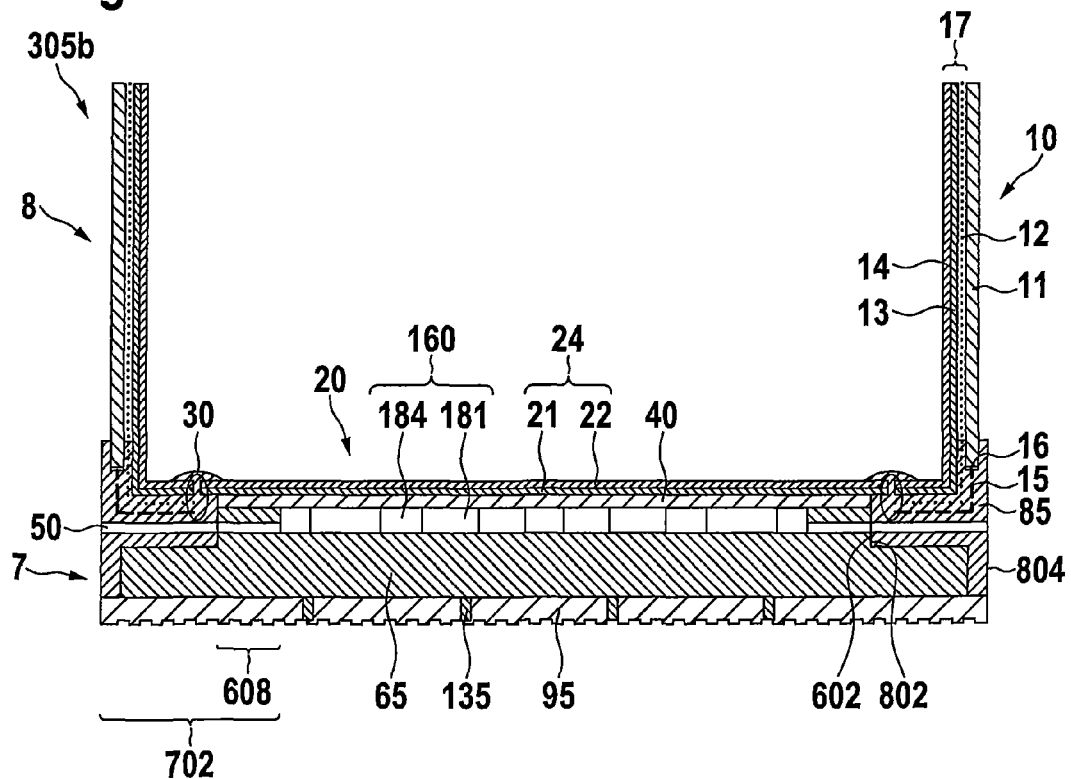
FIG. 6b is a schematic cross-sectional view of a shoe in accordance with a fifteenth embodiment of the invention.

FIG. 6*b* shows a cross-section through a shoe 305*b* according to another embodiment. As compared to FIG. 6*a*, the surrounding sole element 85 is modified in that is does not comprise a portion that gets into contact with the ground during regular use of the shoe 305*b*. In other words, the surrounding sole element 85 surrounds the inner ventilating sole element 65 only laterally, not from the bottom side. An outsole 95 is provided below the undersides of the inner ventilating sole element 65 and the surrounding sole element 85. The outsole 95 comprises supporting members 135. The supporting members 135 are comparable to the supporting members 135 shown in the lower layer of the surrounding sole element 85 of FIG. 6*a*. Moreover, the outsole 95 comprises a tread structure on its underside. The advantages of having a separate outsole 95 element are the same as described with the outsole 92 of the shoe 302*b* shown in FIG. 3*b*.

Figure 6C:
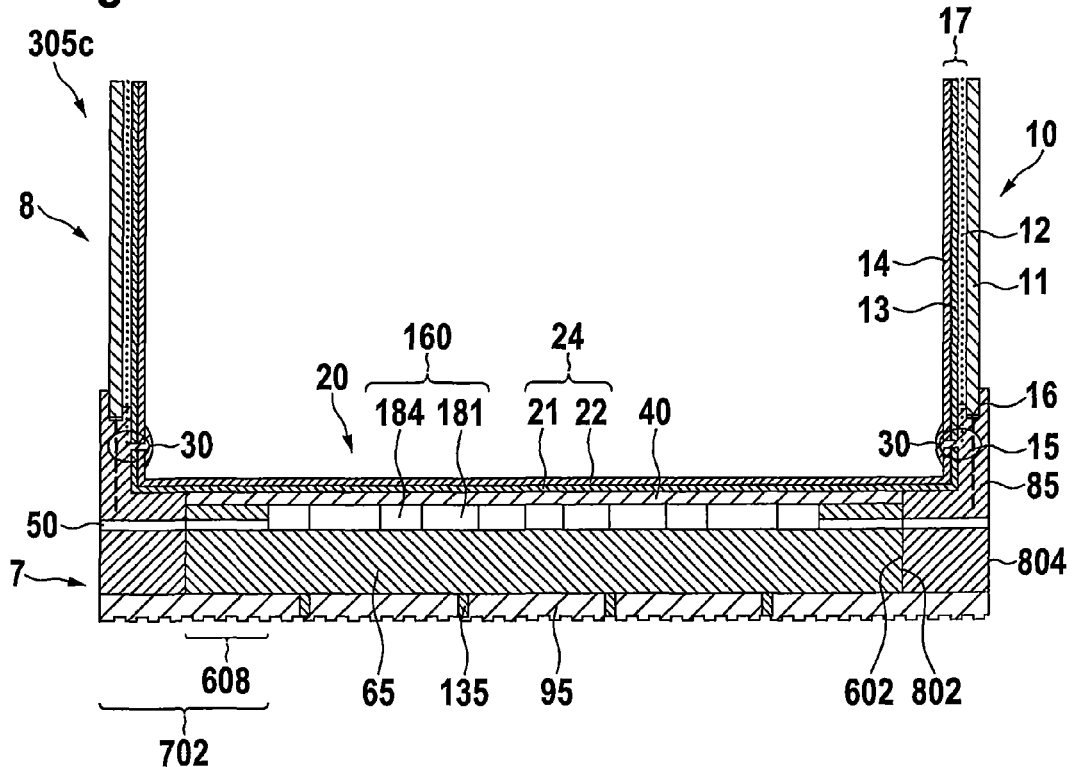
FIG. 6c is a schematic cross-sectional view of a shoe in accordance with a sixteenth embodiment of the invention.

FIG. 6*c* shows a cross-section through a shoe 305*c* according to another embodiment. The upper assembly 8 of the shoe 305*c* comprises an upper portion 10, comprising an upper material 11 and an upper functional layer laminate 17, and a bottom portion 20, comprising a bottom functional layer laminate 24. The bottom functional layer laminate 24 extends across the entire horizontal portion of the upper assembly 8. It also extends somewhat up the side portions of the upper assembly 8. The upper functional layer laminate 17 does not extend all the way down to the transition from the horizontal portion to the side portions of the upper assembly 8. The upper material 11, including the netband 15, may extend as far down as the upper functional layer laminate 17 or further down than the upper functional layer laminate 17. In the exemplary embodiment of FIG. 6*c*, the netband 15 extends down to the bottom end of the lateral sides of the upper assembly 8. The upper functional layer laminate 17 and the bottom functional layer laminate 24 are brought close together with the respective edges, with a strobel stitch 30 connecting these components in the exemplary embodiment of FIG. 6*c*. The strobel stitch 30 also attaches the netband 15 to these components.

An inner ventilating sole element 65, which is arranged below the bottom functional layer laminate 24 and a comfort layer 40, extend across most of the horizontal portion of the bottom functional layer laminate 24. In fact, the inner ventilating sole element 65 may extend over the entire horizontal portion of the bottom functional layer laminate 24. This is possible because the seam 30, joining the netband 15 of the upper material 11, the bottom functional layer laminate 24 and the upper functional layer laminate 17, is situated at a lower lateral side of the upper assembly 8 rather than at the underside of the upper assembly 8. The surrounding sole element 84 may thus only be applied outside the horizontal lateral extension of the bottom functional layer laminate 24, rather than also underneath the bottom functional layer laminate 24 (which is the case in FIG. 6*c*), whilst still being able to seal the seam 30.

The inner ventilating sole element 65 in FIG. 6*c* has a constant width along its vertical extension in the cross-sectional plane of FIG. 6*c*. It may have a constant width in all transverse cross-sections throughout the entire longitudinal direction of the shoe 305*c*. It is also possible, however, that the width of the inner ventilating sole element 65 may vary in the vertical dimension in other transverse cross-sections at different longitudinal points throughout the shoe 305*c*, as shown for example in FIG. 1. The channel structure 160 of the inner ventilating sole element 65 of the shoe 305*c* corresponds to the channel structure 160 of the inner ventilating sole element 65 of the shoe 305*b*, shown in FIG. 6*b*.

Providing the inner ventilating sole element 65 over all or almost the entire lateral dimension of the sole assembly 7 has the advantage that the high water vapour discharge capabilities of the bottom functional layer laminate 24 and the inner ventilating sole element 65 receiving the water vapour therefrom may be taken advantage of over a large area. This feature may also be applied to all of the other embodiments.

The surrounding sole element 85 surrounds the lateral surface 602 of the inner ventilating sole element 65. It has a constant width throughout the vertical extension of the inner ventilating sole element 65. Above that vertical extension, the surrounding sole element 85 laterally surrounds a lower portion of the upper assembly 8. The sole material of the surrounding sole element 85 is penetrated through the netband 15 and through the strobel stitch 30, thereby sealing the connection region between the upper portion 10 and the lower portion 20 of the upper assembly 8. Underneath the inner ventilating sole element 65 and the surrounding sole element 85, an outsole 95 is provided. Again, the outsole 95 is provided with supporting members 135 and a tread structure on its underside.

Figure 7:
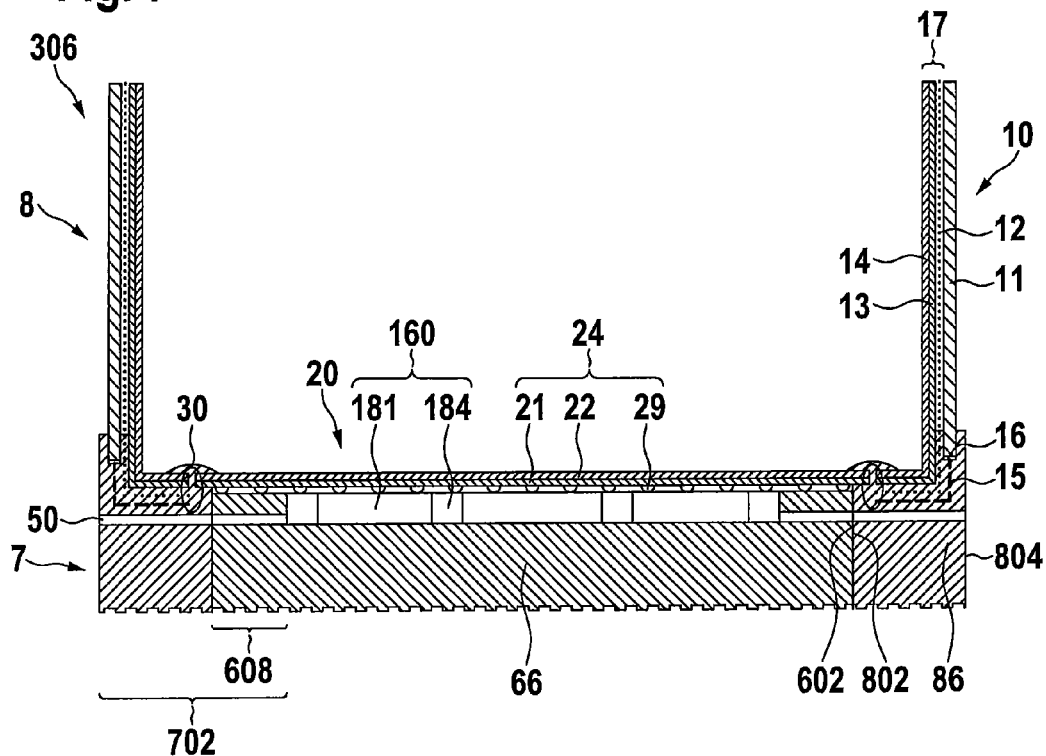
FIG. 7 is a schematic cross-sectional view of a shoe in accordance with a seventeenth embodiment of the invention.

FIG. 7 shows a cross-section through a shoe 306 according to another embodiment. The upper assembly 8 of the shoe 306 is identical to the upper assemblies of both the shoe 301*b* of FIG. 2*b* and the shoe 302*b* of FIG. 3*b*, with the exception of the bottom functional layer laminate 24 used, which will be discussed below. The shoe 306 does not comprise a comfort layer on top of the inner ventilating sole element 66. The surrounding sole element 86 of the shoe 306 is identical to the surrounding sole element 81 of the shoe 301*b*. The inner ventilating sole element 66 of the shoe 306 has a channel structure 160 similar to the channel structure 160 of the inner ventilating sole element 62 of the shoe 302*c*, but comprising only 4 longitudinal channels 184. The lateral extension of the inner ventilating sole element 66 of the shoe 306 is identical to the lateral extension of the inner ventilating sole element 62 of the shoe 302*c*. The inner ventilating sole element 66 extends between the surrounding sole element 86 with a constant width along the vertical dimension. The inner ventilating sole element 66 extends all the way down to the bottom of the sole, particularly as far down vertically as the surrounding sole element 86. The inner ventilating sole element 66 and the surrounding sole element 86 form a flush surface (with the exception of the tread structures) for getting into contact with the ground during use of the shoe 306. Therefore, the weight of the wearer may be evenly distributed between the two components of the ventilating sole element.

The bottom functional layer laminate 24 of the shoe 306 is provided with dots 29, also referred to as knobs, on its lower side. Accordingly, the dots 29 are provided on the lower surface of the bottom membrane 21. The dots 29 are polymeric dots distributed over the lower surface of the bottom functional layer or membrane in a regular pattern, particularly in parallel rows extending in the transverse direction of the shoe, with one such row being shown in the cross-sectional view of FIG. 7. The dots 29 have a cushioning effect, such that the wearer's comfort is ensured despite the non-uniform nature of the top surface of the inner ventilating sole element 66. The dots 29 have been found to be so efficient that the comfort layer may be dispensed with. A bottom functional layer laminate 24 having polymeric dots 29 may be applied to all other embodiments as well. Due to the spaces present between the discrete dots 29, the water vapour permeability of the bottom functional layer laminate 24 is not compromised. As the bottom functional layer laminate 24 may be readily manufactured including the dots 29, such a laminate may reduce the number of components needed for manufacturing the shoe, such that gains in the manufacturing efficiency may be achieved.

Figure 8A:
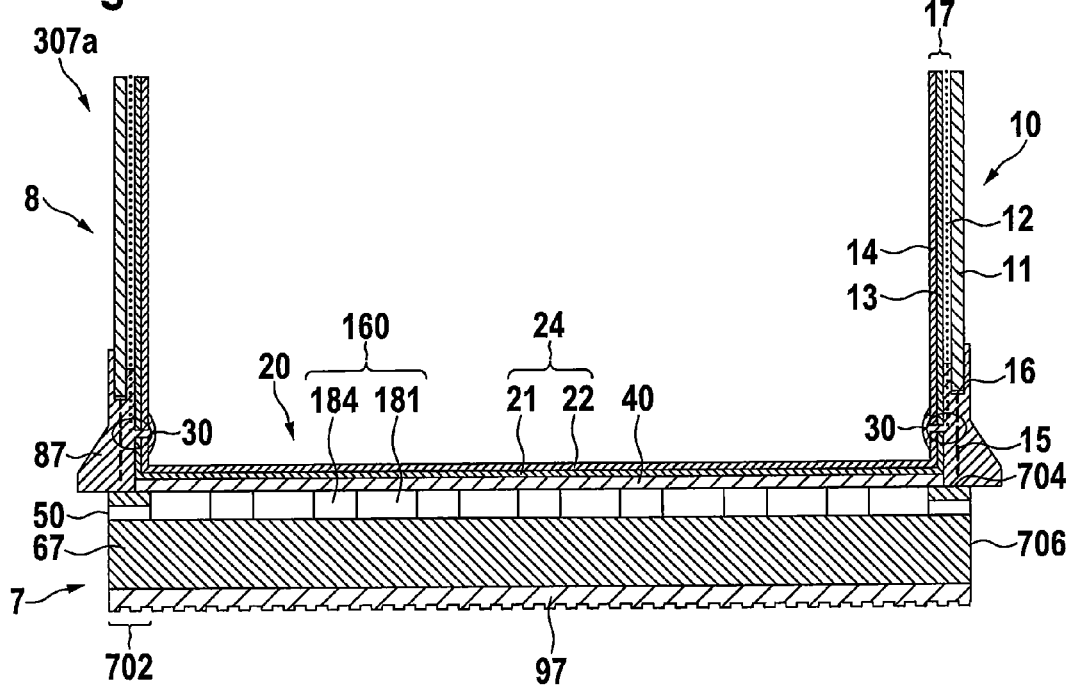
FIG. 8a is a schematic cross-sectional view of a shoe in accordance with an eighteenth embodiment of the invention.

FIG. 8a shows a cross-section through a shoe 307a according to another embodiment. The shoe 307a as well as the shoes 307b, 309a and 309b, shown in FIGS. 8b, 10a and 10b, have a sole construction that differs from the sole constructions described in connection with the Figures thus far. The ventilating sole element of these shoes is a single piece element. No combination of an inner ventilating sole element and a surrounding sole element is present in these shoes. Accordingly, the lateral passages 50, which extend through the side wall of the ventilating sole element, do extend through one element only, whereas the previously described lateral passages extend through the side wall of the inner ventilating sole element and the surrounding sole element, which jointly form the side wall of the ventilating sole element.

The upper assembly 8 of the shoe 307a is identical to the upper assembly 8 of the shoe 305c shown in FIG. 6c. The shoe 307a comprises a ventilating sole element 67 and a surrounding connection element 87. The ventilating sole element 67 extends across the entire lateral dimension of the shoe 307a. Also, the ventilating sole element 67 is comprised of one element. It is not formed by a combination of a plurality of sub-elements. The ventilating sole element 67 comprises lateral passages 50 extending from a channel structure 160 allowing for air flow through it through the side wall 702 of the ventilating sole element 67 to a lateral outside of the sole assembly 7. The channel structure 160 of the ventilating sole element 67 is similar to the channel structure 160 of the inner ventilating sole element 62 of the shoe 302a of FIG. 3a. The channel structure 160 of the ventilating sole element 67 is spread out underneath substantially the entire bottom portion of the upper assembly 8. Accordingly, a large area is provided for receiving the water vapour from the inside of the shoe through the bottom functional layer laminate 24. Also, the lateral passages 50 are comparably short, which promotes the speed of ventilation. In this way, a highly effective water vapour discharge from the inside of the shoe through the ventilating sole element 67 is achieved. Again, a comfort layer 40 is disposed between the bottom functional layer laminate 24 and the ventilating sole element 67.

An outsole 97 is arranged below the ventilating sole element 67. It extends across the whole lateral extension of the ventilating sole element 67. It also comprises a tread structure. The outsole 97 is an optional feature. The ventilating sole element 67 may also be designed to include the contact area to the ground during use of the shoe 307a.

The surrounding connection element 87 surrounds a lower portion of the upper assembly 8 of the shoe 307a. It also covers a lateral end portion of the upper surface 704 of the ventilating sole element 67. The surrounding connection element 87 is attached to both said lower portion of the upper assembly 8 and said lateral end portion of the upper surface 704 of the ventilating sole element 67. In this way, an attachment between the upper assembly 8 and the ventilating sole element 67 is effected by the surrounding connection element 87. The surrounding connection element 87 may be injected onto the ventilating sole element 67. The surrounding connection element 87 may be the only form of attachment between the upper assembly 8 and the ventilating sole element 67. Additionally, however, the ventilating sole element 67, potentially including the comfort layer 40, may be glued or attached in another way to the bottom portion 20 of the upper assembly 8. The ventilating sole element 67 may also have a lip extending upwards from the upper side of the ventilating sole element 67, with the lip being stitched to other components through the stitch 30.

The material of the surrounding connection element 87 is penetrated through the netband 15 and onto the connection region 30 between the upper portion 10 and the lower portion 20 of the upper assembly 8 of the shoe 307a. In this way, the surrounding connection element 87 forms a waterproof seal at the connection region 30, in particular at the strobel stitch 30, and adds to the shoe the appearance of a shoe frame.

The surrounding connection element 87 has a slight lateral protrusion extending beyond the lateral extension of the ventilating sole element 67. This additional sole material helps in taking on the stresses induced into the surrounding connection element 87 during use, such that a more durable construction is achieved.

It is also possible that the connection 30 between the bottom functional layer laminate 24 and the upper functional layer laminate 17 may be sealed in another way, for example via a sealing tape. In that case, the surrounding connection element 87 may be injected for attaching the ventilating sole element 67 to the upper assembly 8. Such attachment may also be achieved via gluing the surrounding connection element 87 to the upper assembly 8 and the ventilating sole element 67.

Figure 8B:
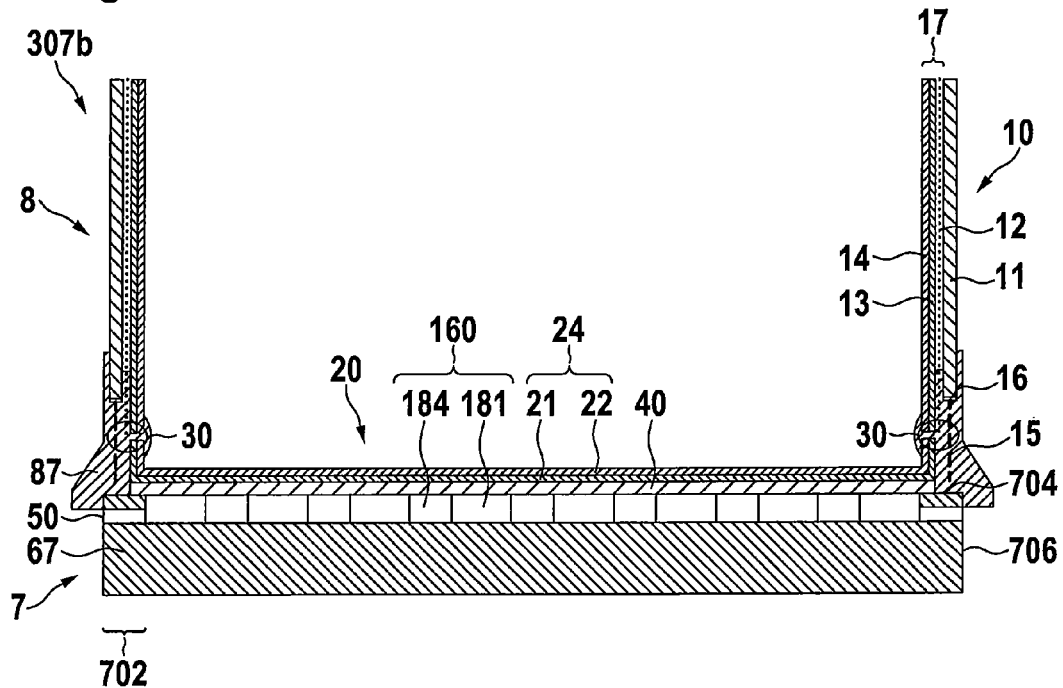
FIG. 8b is a schematic cross-sectional view of a shoe in accordance with a nineteenth embodiment of the invention.

FIG. 8b shows a cross-section through a shoe 307b according to another embodiment. Shoe 307b is identical to shoe 307a, with the exception of the surrounding connection element 87. The surrounding connection element 87 of the shoe 307b covers the upper circumferential edge of the ventilating sole element 67, covering a lateral end portion of the upper surface 704 of the ventilating sole element 67 and an upper end portion of the lateral surface 706 of the ventilating sole element 67 above the lateral passages 50. In this way, a multi-directional, strong attachment between the upper assembly 8 and the ventilating sole element 67 is achieved. The ventilating sole element 67 of the shoe 307b forms the outer sole of the shoe. A separate outsole is not provided in this exemplary embodiment. It is, however, also possible to provide a separate outsole.

Figure 9:
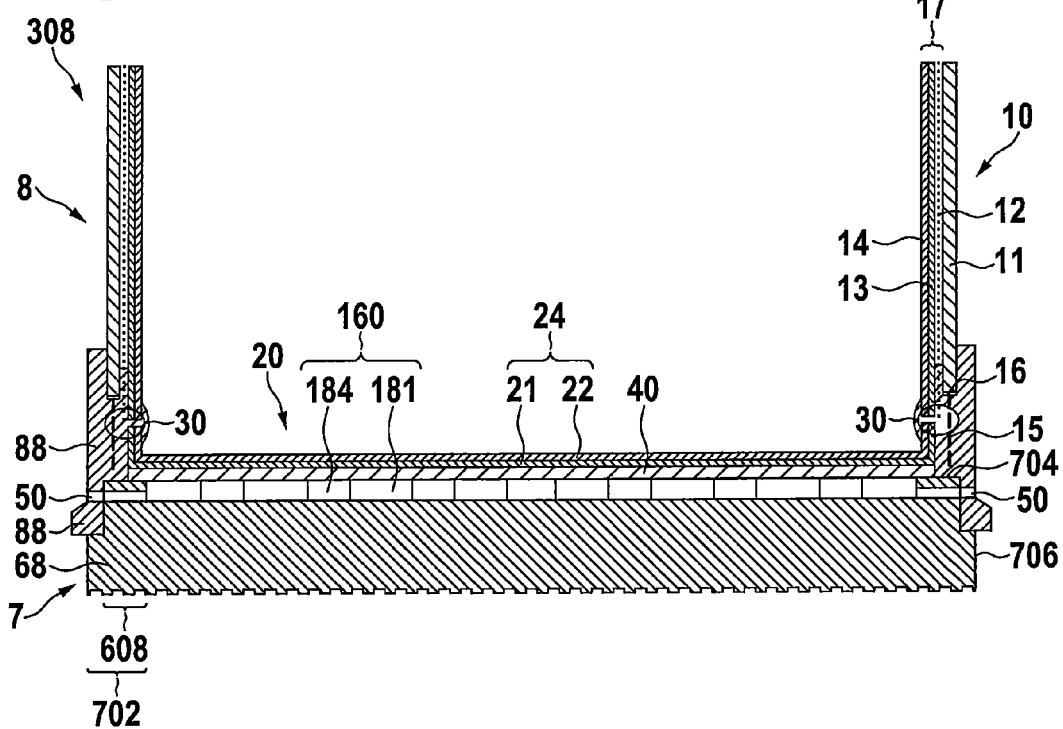
FIG. 9 is a schematic cross-sectional view of a shoe in accordance with a twentieth embodiment of the invention.

FIG. 9 shows a cross-section through a shoe 308 according to another embodiment. The upper assembly 8 and the comfort layer 40 are identical to the corresponding elements of the shoe 307a shown in FIG. 8a. The shoe 308 comprises an inner ventilating sole element 68 and a surrounding sole element 88. The inner ventilating sole element 68 extends vertically from the comfort layer 40 to the lower end of the shoe 308 forming an outer sole of the shoe 308. The inner ventilating sole element 68 is equipped with a tread structure at its underside. The inner ventilating sole element 68 extends across the entire lateral dimension of the shoe 308 in its lower portion. In its upper portion, the lateral dimension of the inner ventilating sole element 68 is reduced as compared to the lower portion. The lateral extension of the upper portion of the inner ventilating sole element 68 corresponds approximately to the lateral extension of the upper assembly 8. The surrounding sole element 88 surrounds the upper portion of the inner ventilating sole element 68 and a lower portion of the upper assembly 8, covering the connection region 30 between the upper portion 10 and the lower portion 20 of the upper assembly 8. Lateral passages 50 are provided, which extend through the side wall 608 of the inner ventilating sole element 68 and the surrounding sole element 88 and which are in air communication with the channel structure 160 of the inner ventilating sole element 68. The inner ventilating sole element 68 comprises a channel structure 160 corresponding to the channel structure 160 of the ventilating sole element 67 of the shoe 307*a*.

The surrounding sole element 88 has a small lateral extension, which allows for a very uniform design of the inner ventilating sole element 68, as the vast majority of the sole volume is provided by the inner ventilating sole element 68. Again, the small volume of the surrounding sole element 88 allows for a quick and well-controlled injection-moulding of the surrounding sole element 88, while the attachment between inner ventilating sole element 68 and upper assembly 8 as well as the sealing of the connection between the upper portion 10 and the lower portion 20 of the upper assembly 8 as well as the water vapour discharge capabilities through the lateral passages 50 can be ensured.

Figure 10A:
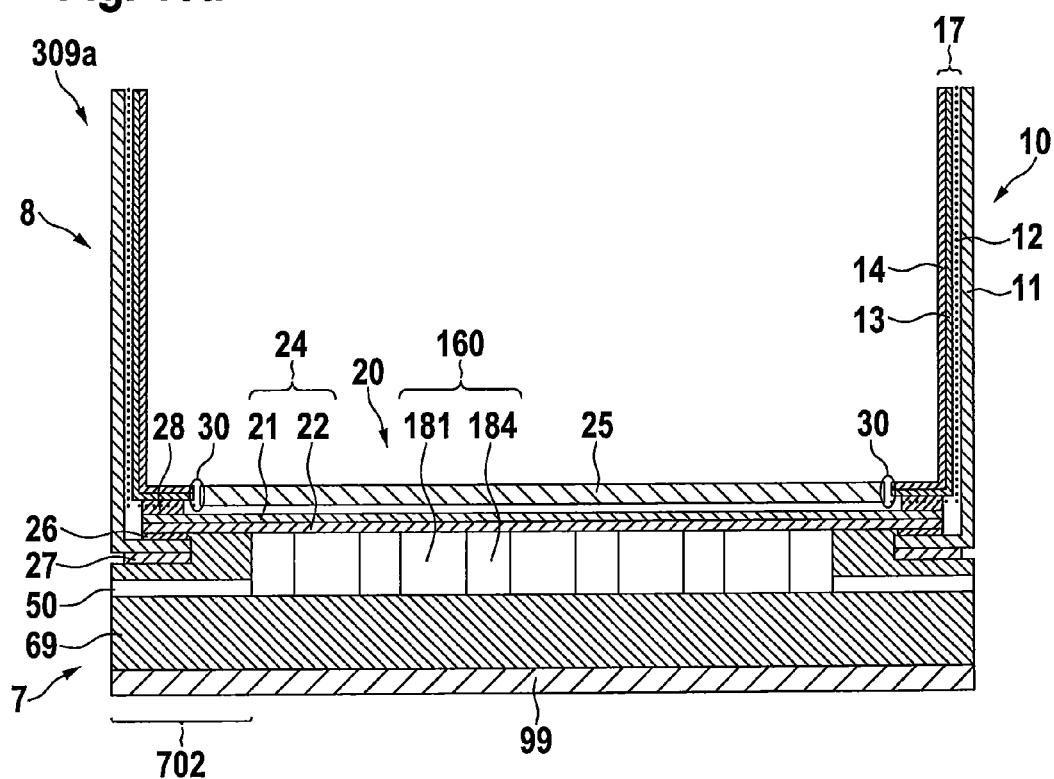
FIG. 10a is a schematic cross-sectional view of a shoe in accordance with a twenty-first embodiment of the invention.

FIG. 10*a* shows a cross-section through a shoe 309*a* according to another embodiment. The shoe 309*a* is referred to as a cemented or glued shoe, because the sole assembly 7 of the shoe 309*a* is glued to the upper assembly 8.

The upper assembly 8 comprises an upper portion having an upper material 11 and an upper functional layer laminate 17, as described above, and a bottom portion 20 having an insole 25 and a bottom functional layer laminate 24. The bottom functional layer laminate 24 comprises, from top to bottom, a waterproof and breathable membrane 21 and a supporting textile 22. In FIG. 10*a* the upper functional layer laminate 17 is connected to the insole 25 via a strobel stitch 30. The bottom functional layer laminate 24 is glued onto the upper functional layer laminate 17 from the bottom via a waterproof adhesive sealant 28. The waterproof adhesive sealant 28 penetrates the mesh 12, such that a waterproof seal between the lower membrane 21 and the upper membrane 13 is effected via the waterproof adhesive sealant 28. In this way, a waterproof, breathable upper assembly 8 is formed. The bottom functional layer laminate 24 may also be a three-layer laminate having a mesh on top of the lower membrane 21, with the waterproof adhesive sealant 28 penetrating this mesh and providing for a waterproof seal between the two membranes. The upper material 11 is glued to the lower surface of the bottom functional layer laminate 24 via lasting glue 26, with the overlapping portion of the upper material 11 being positioned below the bottom functional layer laminate 24.

The insole 25 may also be omitted and the upper functional layer laminate 17 sewn or glued to the bottom functional layer laminate 24 in such a way that the connecting region between the laminates is sealed in a waterproof manner, e.g. using a waterproof sealant or injecting a sealing material on to the connecting region such that it penetrates into and around the seam or using a waterproof seam tape. Or else the insole may be placed below the laminates connected together in a waterproof manner.

The sole assembly 7 of the shoe 309*a* comprises a ventilating sole element 69 and an outsole 99. The outsole 99 is arranged below the ventilating sole element 69 substantially across its entire lateral extension. The ventilating sole element 69 comprises a channel structure 160 within its interior portion. The channel structure 160 may be any of the channel structures described above. In the particular embodiment of FIG. 10*a*, the channel structure 160 is similar to the channel structure 160 of the shoe 305*c* shown in FIG. 6*c*, with the channels having a greater vertical extension. The ventilating sole element 69 also comprises lateral passages 50 at its lateral side portions. The lateral passages 50 are in air communication with the channel structure 160 of the ventilating sole element 69.

The ventilating sole element 69 is glued to the upper assembly 8 via sole adhesive 27. The sole adhesive 27 is arranged between upper circumferential portions of the ventilating sole element 69, i.e. portions of the upper surface of the ventilating sole element 69 close to the lateral sides, and a lasted portion of the upper material 11. In this way, the shoe 309 is manufactured ensuring water vapour discharge from the inside of the shoe through the channel structure 160 of the ventilating sole element 69 and the lateral passages 50 to the lateral outside of the sole assembly 7.

Figure 10B:
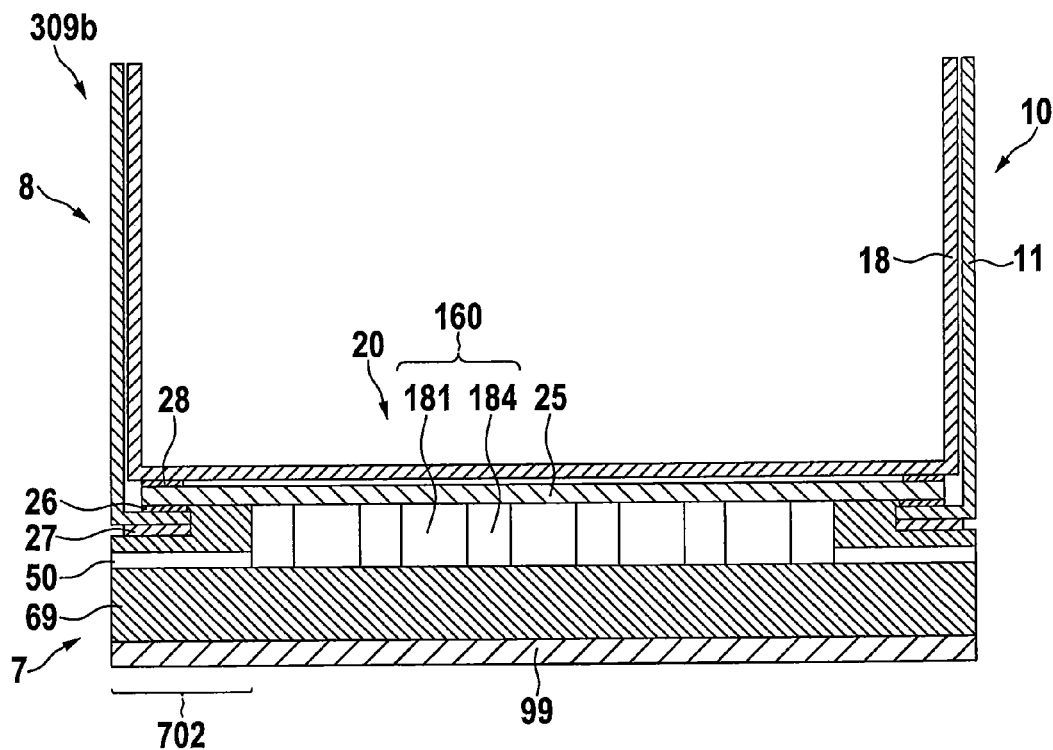
FIG. 10b is a schematic cross-sectional view of a shoe in accordance with a twenty-second embodiment of the invention.

FIG. 10*b* shows a cross-section through a shoe 309*b* according to another embodiment. The shoe 309*b* is also a cemented shoe, with the sole assembly 7 being glued to the upper assembly 8. The sole assembly 7 of the shoe 309*b* is identical to the sole assembly of the shoe 309*a*.

However, the upper assembly 8 of the shoe 309*b* is different from the upper assembly 8 of the shoe 309*a*. The upper assembly 8 of the shoe 309*b* comprises a waterproof and breathable membrane 18, which is arranged over the entire inner surface of the upper assembly 8. The membrane 18 is a three-dimensional membrane/functional layer that forms a waterproof, breathable bag around the wearer's foot. The membrane 18 extends over the upper portion 10 as well as the bottom portion 20 of the upper assembly 8, In particular, it extends over the side portions of the upper assembly 8 as well as over the substantially horizontal portion of the upper assembly 8 associated with the underside of the wearer's foot. The membrane 18 is glued to an insole 25, which is arranged below the membrane 18 in the substantially horizontal portion of the upper assembly 8, via adhesive 28. Adhesive 28 may be used perimetrically, as shown in FIG. 10*b*, or spot-wise or across the entire extension of the insole 25, provided a breathable adhesive is used. The upper assembly 8 also comprises outer material 11, which is lasted over the lateral ends of the insole 25 and glued thereto via lasting glue 26. Again, the sole assembly 7 is glued to the upper assembly 8 via sole adhesive 27.

It is pointed out that instead of membrane 18, a functional layer laminate may be used, with the functional layer laminate comprising a waterproof, breathable membrane and a supporting textile and/or a mesh.

In the embodiment of FIG. 10*b*, the functional layer arrangement, which extends over the upper portion 10 and the bottom portion 20 of the upper assembly 8, is comprised of one functional layer (or one functional layer laminate) only. In the embodiments described before, the functional layer arrangement is formed by the upper membrane 13 and the bottom membrane 21, in particular by the upper functional layer laminate 17 and the bottom functional layer laminate 24.

In the embodiments described, a number of modifications may be made, as is apparent to a person skilled in that art. Further, the embodiments can be combined in different ways.

For example, instead of injection-moulding, other techniques can be used for manufacturing the sole elements of the embodiments described above. For example, the (inner) ventilating sole element may also be poured into a mould in a casting process. Vulcanizing is another well-known sole production process.

Another exemplary modification relates to the two-layer bottom functional layer laminate described. It is also possible to provide a three-layer bottom functional layer laminate, having a third layer below the lower membrane. The third layer may be a mesh or another suitable material that allows penetration of sole material therethrough during injection-moulding, such that a sealing of the lower membrane to the upper membrane may be effected.

Another exemplary modification is that the at least one lateral passage 50 can be provided with inserts that can be removed before the first use. In particular, the inserts may be connected to the material around the lateral passages, i.e. to the ventilating sole element, in particular to the surrounding sole element. However, such attachment may be weak, for example only comprising local attachment points, such that a user may remove the inserts by hand. In this way, it is ensured that the lateral passages remain free of dirt during the shipping and selling process, but that the lateral passages can be easily completed by the wearer of the shoe. These attached inserts may, for example, be achieved by providing the mould for moulding the surrounding sole element with hollow pins that do not extend the whole length of the later to be formed lateral passage of the shoe. In such a way, an insert is formed that is connected to the surrounding sole element at its inner end. The attachment region, i.e. the delta between the length of the pin and the extension of the lateral passage, can be chosen in such a way that the wearer can break this attachment by pulling the insert. Another way of manufacturing such attached pins is to form a solid surrounding sole element, i.e. without lateral passages, and to cut along the outer perimeter of the lateral passages into the surrounding sole element, while not taking away the material in the inner region of the later to be formed lateral passage. The cutting along the perimeter is done is such a way that the wearer can remove the remaining material in the lateral passage with little effort.

FIG. 11 shows an exploded view of a shoe 170 according to an embodiment of the invention.

The shoe 170 substantially corresponds to the shoe 300 depicted in FIG. 1, wherein its elements are designated with different reference numerals. The shoe 170 comprises—seen from bottom to top—an outer sole element 171, a shank 172, an inner ventilating sole element 173, a comfort layer 174, a surrounding sole element 175 and an upper assembly 176.

The outer sole element 171, the shank 172 and the inner ventilating sole element 173 can be prefabricated. The shank 172 can be integrated into the inner ventilating sole element 173 to provide sufficient stability in a mid and heel portion of the shoe 170, and the outer sole element 171 and the inner ventilating sole element 173 can be moulded or glued together.

A channel structure that will be described with reference to the forthcoming FIGS. 12 to 19 is formed in the upper side of the inner ventilating sole element 173, and lateral openings 610 are provided extending through the side wall of the inner ventilating sole element 173 to the channel structure. The lateral passages 50 have been described with respect to FIGS. 1 to 10b to extend both through the side wall of the inner ventilating sole element and through the surrounding sole element. The parts of the lateral passages that extend through the side wall 608 of the inner ventilating sole element 173 are also referred to as lateral openings and are denominated with reference numeral 610 in FIG. 11. The parts of the lateral passages that extend through the surrounding sole element 175 are also referred to as lateral passage portions and are denominated with reference numeral 611 in FIG. 11.

In the embodiments of FIGS. 11 to 19 the lateral openings 610 and the lateral passage portions 611 can be formed in different manufacturing steps.

The side wall 608 of the inner ventilating sole element 173 is formed by its circumferential portion that extends between the outer surface of the side wall and an imaginary line drawn between the channel ends of the transverse channels and the ends of the air and moisture discharging ports.

The lateral openings 610 may be provided at a point in time in which the inner ventilating sole element is manufactured, when all the separate parts of the shoe have been joined together or at any other stage in between.

The comfort layer 174 can be fixed to the inner ventilating sole element 173. The surrounding sole element 175 comprises twelve lateral passage portions in alignment with, that is geometrically matching, the lateral openings 610 of the inner ventilating sole element 173 so as to allow for discharge of air and moisture to the outside of the shoe 170. The surrounding sole element can be moulded to the upper assembly 176 and to the prefabricated entity comprising the outer sole element 171, the shank 172 and the inner ventilating sole element 173 in a subsequent manufacturing step.

FIG. 11 also shows a transverse cutting plane D-D extending through a front portion of the shoe 170. The drawings of FIGS. 2a to 10b show sectional views of a number of embodiments, taken along the plane D-D.

For further details of the shoe 170 reference is taken to the embodiments as described with respect to FIGS. 2a to 10b.

FIG. 12 shows a sectional view of the shoe 170, taken along a cutting plane extending through the shoe 170 in a longitudinal direction.

According to FIG. 12 the inner ventilating sole element 173 having the channel structure formed in its upper part and having the shank 172 integrated in an area from the mid portion to the heel portion approximately at the middle of its height and having an ergonomic form with a lower front portion and a higher heel portion is surrounded by the surrounding sole element 175. An outer sole element 171 is fixed to the undersides of both of the inner ventilating sole element 173 and the surrounding sole element 175 and forms the tread on its underside. Above the inner ventilating sole element 173 and the surrounding sole element 175 there is provided the upper assembly 176, which can be joined thereto by the injected surrounding sole element 175.

FIG. 13 shows a plan view of an inner ventilating sole element 173.

In this plan view, the circumferential dimensions of the inner ventilating sole element 173 can be seen. The inner ventilating sole element 173 has its greatest width in a front portion corresponding approximately to the ball portion 179 of the forefoot and its smallest portion in a rear portion corresponding approximately to the heel 180 of the foot. The upper surface of the inner ventilating sole element 173 is designated by reference numeral 606.

In the upper part of a body 177 of the inner ventilating sole element 173, there is formed a channel structure 178, said channel structure 178 comprising a number of transverse channels 181. Some of the transverse channels 181 have broadened lateral ends thus forming air and moisture discharging ports 182. The depth of the transverse channels 181 in the air and moisture discharging ports 182 can also be greater as compared to the depth of the mid portion of the transverse channels 181 which will be apparent from the forthcoming FIGS. 15a and 15b. Lateral openings 610 that cannot be seen in the plan view of FIG. 13 extend from said air and moisture discharging ports 182 through the side wall 608 of the inner ventilating sole element 173. Some of the transverse channels do not end in ports. Their ends will not be connected with lateral openings 610 in the side wall 608 of the inner ventilating sole element 173.

Adjacent transverse channels are spaced apart from each other, and the transverse channels cover almost the entire upper part of the inner ventilating sole element 173 from a toe portion to a heel portion thereof. In the exemplary embodiment of FIG. 13, altogether 23 transverse channels 181 are provided.

The channel structure 178 further comprises a peripheral channel 183, said peripheral channel 183 connecting the transverse channels 181 in a substantially longitudinal direction. The peripheral channel 183 extends from a mid portion of the foremost (the toe region) transverse channel 181 in a zigzag line to a mid portion of the rearmost (heel region) transverse channel 181.

The zigzag form of the exemplary peripheral channel 183 is such that its laterally outermost intersection points with the transverse channels 181 are situated at those transverse channels 181 that are provided with broadened air and moisture discharging ports 182, and its innermost intersection points with the lateral channels 181 are positioned at transverse channels 181 lying, seen in a longitudinal direction, between two respective transverse channels 181 being provided with broadened air and moisture discharging ports 181.

In the exemplary embodiment of FIG. 13 altogether the lateral ends of six transverse channels 181 are provided with broadened air and moisture discharging ports 182. In this exemplary embodiment it is the 3rd, the 6th, the 10th, the 13th, the 16th and the 21st transverse channels 181 starting from the toe end of the inner ventilating sole element 173 that are provided with such broadened air and moisture discharging ports 182. Consequently, the zigzag peripheral channel 183 has its outermost points laterally just inside these broadened air and moisture discharging ports 182. The innermost points of the zigzag peripheral channel 183 are situated at the 1st, the 5th, the 9th, the 12th, the 15th, the 19th and the 23rd transverse channels 181. The portions of the zigzag peripheral channel 183 between two adjacent outermost and innermost points thereof are formed in a straight line.

The channel structure 178 further comprises a number of longitudinal channels 184 intersecting with some of the transverse channels 181 in the middle of the front and mid portions of the inner ventilating sole element 173. These longitudinal channels 184 do not end at the side wall 608 of the inner ventilating sole element 173 and are not equipped with ports. However, in other embodiments of the invention they may end at the side wall 608 of the inner ventilating sole element 173 and they may also end in ports 182.

In the exemplary embodiment of FIG. 13 there is a first longitudinal channel 184 arranged between mid portions of the second transverse channel 181 and the 5th transverse channel 181, a second longitudinal channel 184 is provided between mid portions of the 6th and the 9th transverse channels 181, a third longitudinal channel 184 is arranged between the mid portions of the 10th and the 12th transverse channels 181, and a 4th longitudinal channel 184 is provided between a mid portion of the 13th and the 14th transverse channels 181. Such longitudinal channels 184 are particularly provided at portions of the inner ventilating sole element 173 where the transverse channels 181 have a greater width.

The side wall 608 of the inner ventilating sole element 173 is formed by its circumferential portion that extends between the outer surface of the side wall 608 and an imaginary line drawn between the ends of the transverse channels 181 and the ends of the air and moisture discharging ports 182, which imaginary line is depicted in FIG. 13 by a broken line.

Functional pillars are formed by the various channels and possibly the side wall 608. For example there is a functional pillar 400 formed by the 3rd and the $4^{th}$ transverse channels 181, the first longitudinal channel 184 and the peripheral channel 183. This functional pillar 400 is surrounded completely by the channels 181, 184 and 183. A further functional pillar 401 is formed by an upper portion of the side wall 608 that extends in a transverse direction between the inner side of the side wall 608 and the adjacent part of the peripheral channel 183 and in longitudinal direction between the $4^{th}$ and the $5^{th}$ transverse channels 181.

A longitudinal cutting plane V-V is depicted extending through the inner ventilating sole element 173. A transverse cutting plain W-W is depicted extending through the inner ventilating sole element 173, lying in the transverse extension of the 6th transverse channel 181 that is provided with broadened air and moisture discharging ports 182. A further transverse cutting plane X-X is depicted extending through the inner ventilating sole element 173 at a position between the 13th and the 14th transverse channels 181.

Reference numeral 179 designates a ball area of the inner ventilating sole element 173. This ball area 179 corresponds to the portion of the inner ventilating sole element 173 which supports the ball area of the forefoot. Reference numeral 180 designates a heel area of the inner ventilating sole element 173. This heel area 180 corresponds to the portion of the inner ventilating sole element 173 which supports a heel portion of the foot. In the exemplary embodiment of FIG. 13 the ball area 179 extends from the 5th to the 10th transverse channels 181, and the heel area 180 extends from the 19th to the 21st transverse channels 181.

It has been discovered by the inventors, that both the ball area 179 and the heel area 180 are critical regions where the greatest stress and flexing occurs. Therefore the widths of the transverse channels 181 can be different in one or two of these regions 179 and 180 as compared to the transverse channel width in the other portions of the inner ventilating sole element 173. This is not shown in FIG. 13. In particular the transverse channel width in the ball area 179 and in the heel area 180 can be somewhat smaller than the transverse channel width in the other portions of the inner ventilating sole element 173. An exemplary transverse channel width in the ball area 179 and in the heel area 180 is 2.5 mm, whereas the transverse channel width in the other areas as well as the longitudinal and/or the peripheral channel can be 3 mm.

Further, in order to maximize the pumping effect in the stance phase of the gait cycle, the transverse channels 181 in the ball area 179 can be shifted more towards the upper end of the ball area 179. Thus the $7^{th}$, $8^{th}$ and $9^{th}$ transverse channel are moved closer to the $6^{th}$ channel whereby a maximized pumping effect is obtained from the touchdown of the ball of the human foot. In other words the distances between adjacent transverse ventilation channels 181 in the forefoot portion are then smaller than in the heel portion in order to increase the effect of pumping water vapour to the outside.

By means of the peripheral channel 183 the number of channels eventually leading to the air and moisture discharging port 182 is increased thus increasing the amount of air and moisture that can be transported to the outside of the shoe. The peripheral channel 183 cuts the transverse channels 181 at different angles. Thus, the peripheral channel 183 cuts the $2^{nd}$ transverse channel 181 at an angle of 45 degrees. Correspondingly, the $6^{th}$ transverse channel is cut at 58 degrees, the $16^{th}$ channel at 48 degrees and the $21^{st}$ at 72 degrees. Instead of connecting two discharging ports 182 with a straight peripheral channel 183 which follows the periphery of the body 177, the peripheral channel zigzags as already described. The zigzag structure has a better uptake and transport of moisture than a structure with straight connecting channels between the discharging ports.

FIG. 14 shows a sectional view of the inner ventilating sole element 173 taken along the longitudinal axis.

FIG. 14 shows an exemplary embodiment of the inner ventilating sole element 173 comprising a lower front portion 410, a raised mid portion 411 and a higher rear portion 412 of the body 177 of the inner ventilating sole element as well as straight upright side walls. For simplicity, the inner ventilating sole element 173 is depicted without a shank which, of course, can also be provided.

The shape of the transverse channels 181 formed in the upper part of the inner ventilating sole element 173 can well be seen in FIG. 14 as an example.

There is some variation in the form of the transverse channels 181. Most of the transverse channels 181 have—when seen in a sectional view—the form of a V with a somewhat wider bottom. The second transverse channel 181, when counted from front to back, i.e. from the lower portion to the higher portion, is formed with a wider channel bottom so as to have the form of a U. The 5th transverse channel 181 has a greater channel depth as compared to the other channels. As an example, the depth of the transverse channels 181 is less than 20 mm.

The side wall 608 of the inner ventilating sole element 173 extends at the very back between the outer rear face and the rearmost transverse channel 181, and it extends at the very front between the outer front face and the foremost transverse channel 181.

FIG. 15 shows the inner ventilating sole element 173 according to an alternative embodiment. FIG. 15 is a sectional view of the inner ventilating sole element 173 taken along the cutting plane V-V in FIG. 13.

The cutting plane V-V cuts all 23 transverse channels 181 and also cuts the peripheral channel 183 at a position between the first and second transverse channels 181 and at a position between the 14th and the 16th transverse channels 181.

The height of the inner ventilating sole element 173 is substantially constant wherein only a slight reduction of the height is provided in a toe part or region of the inner ventilating sole element 173.

The inner ventilating sole element 173 has a curved form following the ergonomics of the foot with a lower front portion 420 and a higher rear portion 421. Likewise the side wall 608 of the inner ventilating sole element 173 extends at the very back between the outer rear face and the rearmost transverse channel 181. The inner ventilating sole element 173 is provided with a circular lip or circular collar 185, that extends, from an upper portion 609 of the side wall 608 in an outward direction. By means of this circular lip 185, the inner ventilating sole element 173 can be glued or stitched or moulded to an upper assembly (not shown), and/or a comfort layer (not shown) can be glued or stitched to the inner ventilating sole element 173.

As can be seen from the sectional view of FIG. 15 the transverse channels 181 have a somewhat greater channel depth as compared to the peripheral channel 183, on the other hand the width of the peripheral channel 183 is greater than the width of the transverse channels 181.

Figure 16A:
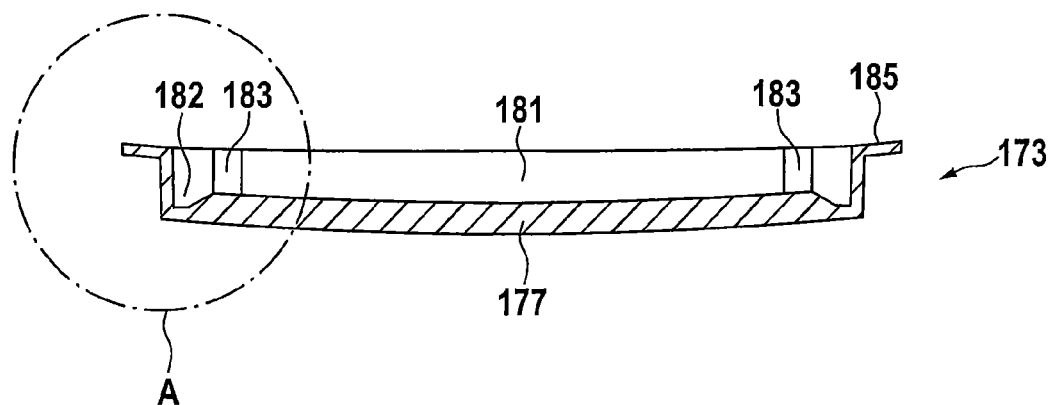
FIG. 16a is a sectional view of the ventilating sole element of the shoe of FIGS. 11 and 12, additionally provided with a lip, taken along the cutting plane W-W in FIG. 13.

FIG. 16a is a sectional view of the inner ventilating sole element 173, taken along the cutting plane W-W in FIG. 13.

It can readily be seen, that the transverse channel 181 extends the whole width of the inner ventilating sole element 173 within the side wall 608 of the inner ventilating sole element 173 and has a uniform channel depth, with the exception of the broadened air and moisture discharging ports 182, where the channel depth increases. In FIG. 16a also the peripheral lip 185 is shown.

Figure 16B:
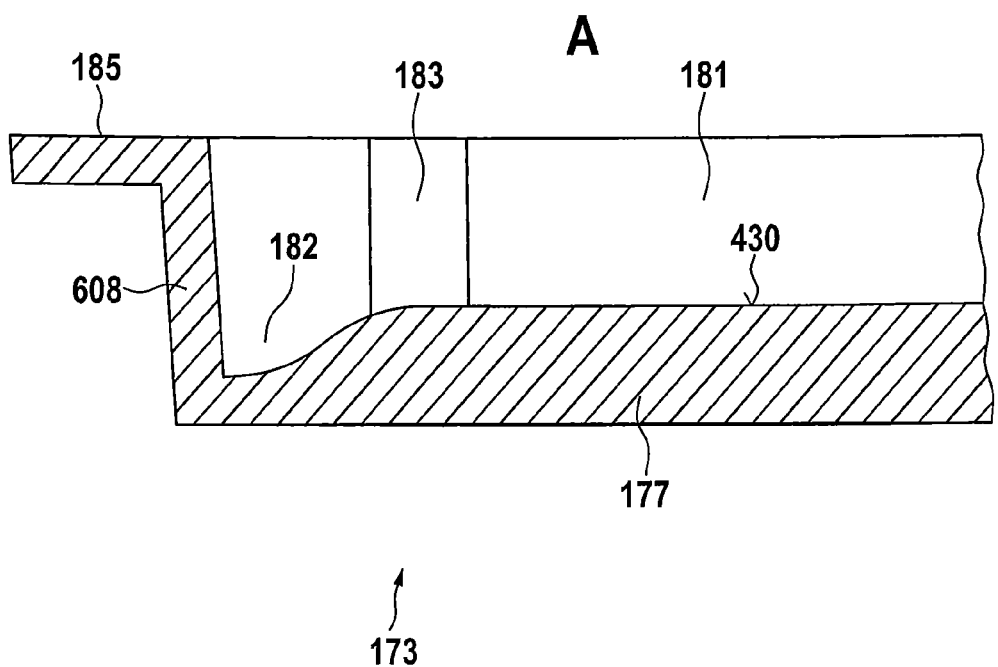
FIG. 16b shows the detail of the sectional view of FIG. 16a, namely the left portion of the ventilating sole element, in an enlarged view.

FIG. 16b shows the detail of the sectional view of the FIG. 16a, namely the left portion of the inner ventilating sole element 173, in an enlarged view.

From this figure, the course of the channel bottom 430 can be seen from the beginning of the air and moisture discharging port 182 to the side wall 608. The channel bottom 430 at the discharging port 182 slopes continuously, while avoiding the forming of any edges.

Further in FIGS. 16a and 16b the peripheral channel 183 running through the plane of projection can be seen besides the air and moisture discharging ports 182.

Figure 17:
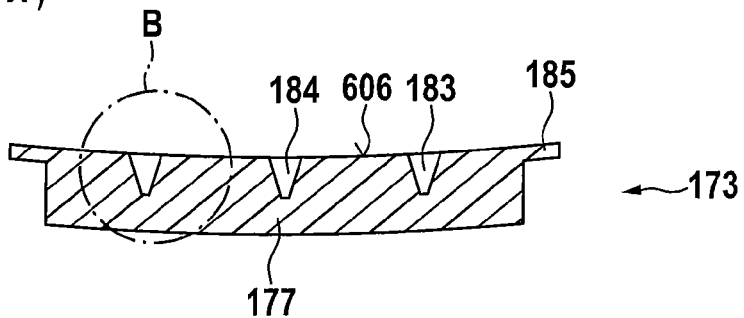
FIG. 17 shows a sectional view of the ventilating sole element of the shoe of FIGS. 11 and 12, taken along the cutting plane X-X.

FIG. 17 shows a sectional view of the inner ventilating sole element 173, taken along the cutting plane X-X.

This sectional view shows the channel form of the left and right portions of the peripheral channel 183 and the channel form of the central longitudinal channel 184. In the exemplary embodiment of FIG. 17, the peripheral channel 183 and the longitudinal channel 184 have the basic form of a V with a broader bottom extending in a horizontal direction.

FIGS. 18a to 18d show different exemplary embodiments of a channel shape, illustrated by means of an enlarged view of the detail B of FIG. 17 comprising a sectional cut through the left portion of the peripheral channel 183. However, these channel shapes are not limited to the peripheral channel 183 but may also apply to the transverse and/or longitudinal channels.

Figure 18A:
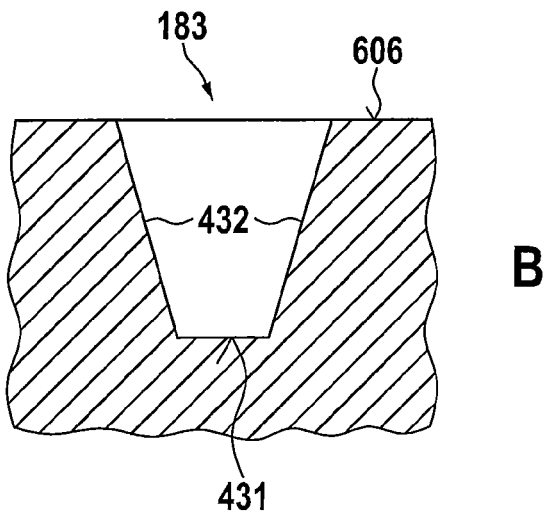
FIGS. 18a to 18d show different exemplary embodiment of a channel shape, illustrated by means of an enlarged view of the detail B in FIG. 17 comprising a sectional cut through the left portion of the peripheral channel.

In FIG. 18a, the peripheral channel 183 has a straight substantially horizontal bottom 431 and two channel walls 432 that widen upwardly. In the exemplary embodiment of FIG. 18a the channel walls 432 are straight and form an angle of 10 to 20 degrees with respect to a vertical plane.

Figure 18B:
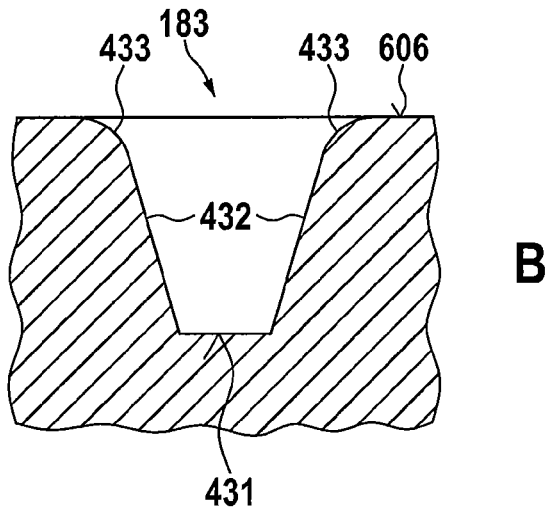

The channel 183 as depicted in FIG. 18b have a straight, substantially horizontal bottom 431 and two channel walls 432 that are widening in an upwards direction, that are straight and form an angle of 10 to 20 degrees with respect to a vertical plane. The transition 433 of the upper parts of the channel walls 432 to the upper surface 606 of the inner ventilating sole element 173 is rounded avoiding an edge therebetween.

Figure 18C:
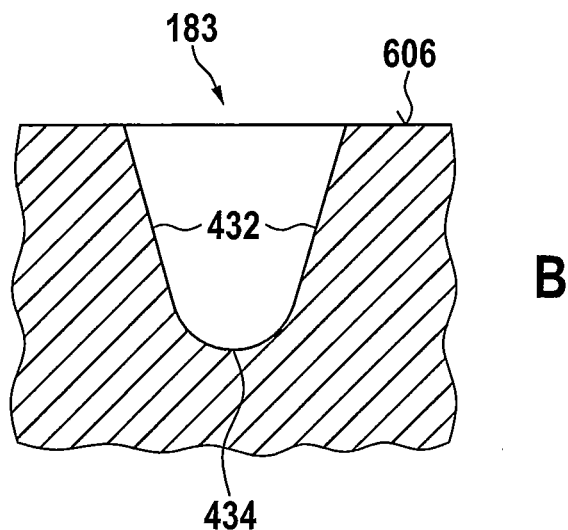

In FIG. 18c, the bottom portion 434 of the channel 183 is curved and has a concave form. The straight channel walls 432 widen in an upwards direction such that the channel 183 widens from bottom to top. The angle of the channel walls 432 with respect to a vertical plane is between 10 and 20 degrees.

Figure 18D:
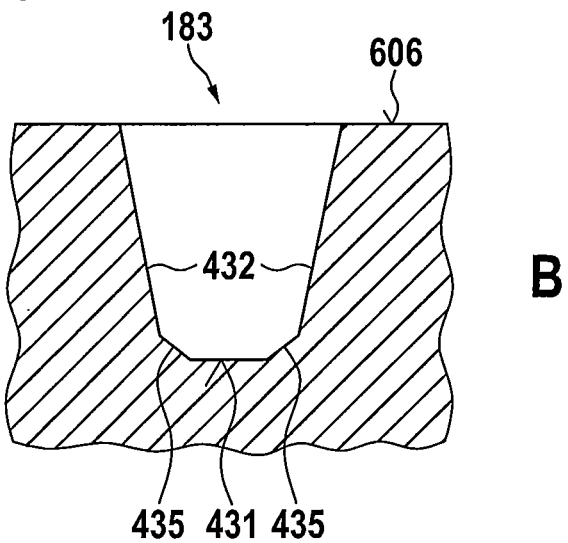

FIG. 18d illustrates an exemplary channel shape having a straight, substantially horizontal bottom 431 and two straight channel walls 432 widening in upwards direction.

The channel walls 432 form a straight line which includes an angle of 10 to 20 degrees with respect to a vertical plane. The transition of the bottom 431 to the channel walls 432 is formed by oblique straight transition portions 435 arranged at an angle of forty to sixty degrees with respect to a vertical plane.

The channels 183 as depicted in FIGS. 18a, 18b and 18d all have an essentially trapezoid shape, and more particularly the form of an isosceles trapezoid. By the provision of a bottom portion having a basically horizontal extension the risk of breakage of such channels or functional pillars can be reduced.

By providing transitions between the bottom and the channel walls according to FIGS. 18(c) and 18(d) a particularly advantageous flexure can be attained and no corner spaces are created trapping air and moisture.

By providing a rounded transition 433 between the channel walls 432 and the upper surface 606 of the inner ventilating sole element 173 as in FIG. 18b, an edge at this position can be avoided which reduces the wear and possible damages to the comfort layer, laminate or upper assembly being positioned above.

FIG. 19 shows a plan view of another inner ventilating sole element 187 according to a further embodiment of the invention.

The inner ventilating sole element 187 corresponds to the inner ventilating sole element 173 of FIG. 13, and same elements are designated with same reference numerals. The description of the like elements, in particular the body 177, the transverse channels 181, the air and moisture discharging ports 182 and the longitudinal channels 184 is omitted for brevity. The inner ventilating sole element 187 comprises altogether twenty-three transverse channels 181.

Instead of one peripheral channel, the second inner ventilating sole element 187 comprises two peripheral channels 189, 190.

A first peripheral channel 189 runs from a toe portion to a portion of the inner ventilating sole element 187 before the heel portion. In particular, the first peripheral channel 189 runs from a middle portion of the first transverse channel 181 to a mid-portion of the 19th transverse channel 181 in a zigzag line, having its outer most points directly besides the air and moisture discharging ports 182 of the transverse channels 181 that are formed in the third, the 6th, the 10th, the 13th and the 16th transverse channels 181. The innermost points of the first peripheral channel 189 are situated at the first, the 5th, the 9th, the 12th, the 15th and the 19th transverse channels 181.

A second peripheral channel 190 runs from a middle portion of the 20th transverse channel 181 to a middle portion of the 24th transverse channel 181, with its outer most points being located besides the air and moisture discharging ports 182 of the 22nd transverse channel 181.

It has been found by the inventors, that more than one peripheral channel can be provided and that in case more than one peripheral channel is provided, the peripheral channels do not necessarily have to connect to each other, as it is the case with the second inner ventilating sole element 187.

FIG. 19 also shows in broken lines the lateral openings 610 through the side wall 608 of the inner ventilating sole element 187. These lateral openings 610 connect the air and moisture discharging ports 182 to the outside of the inner ventilating sole element 187. In the embodiment of FIG. 19, the lateral openings 610 have a width/diameter which substantially corresponds to the width of the transverse channels 181. However, their width can also be smaller than the width of the transverse channels 181.

It is pointed out that the features of the channel structure of the inner ventilating sole element, described with respect to FIGS. 12 to 19, are equally applicable to a ventilating sole element that is not surrounded by a surrounding sole element.

Definition of Functional Layer/Membrane

A functional layer is a water vapour-permeable and waterproof layer, for example, in the form of a membrane or a correspondingly treated or finished material, for example, a textile with plasma treatment. Both the lower functional layer, also referred to as lower membrane, and the upper functional layer, also referred to as upper membrane, can be parts of a multilayer, generally a two-, three- or four-layer laminate; the lower functional layer and the upper functional layer are sealed so as to be waterproof in the lower area of the shaft arrangement on the sole side; the lower functional layer and the upper functional layer can also be formed from one material.

Appropriate materials for the waterproof, water-vapour-permeable functional layer are especially polyurethane, polyolefins, and polyesters, including polyether esters and laminates thereof, as described in documents U.S. Pat. No. 4,725,418 and U.S. Pat. No. 4,493,870. In one variant, the functional layer is constructed with microporous, expanded polytetrafluoroethylene (ePTFB), as described, for example, in documents U.S. Pat. No. 3,953,566 and U.S. Pat. No. 4,187,390, and expanded polytetrafluoroethylene provided with hydrophilic impregnation agents and/or hydrophilic layers; see, for example, document U.S. Pat. No. 4,194,041. Microporous functional layers are understood to mean functional layers whose average effective pore size is between 0.1 and 2 µm, preferably between 0.2 µm and 0.3 µm.

Definition of Laminate

A laminate is a composite consisting of several layers permanently joined together, generally by mutual gluing or sealing. In a functional-layer laminate, a waterproof and/or water vapour-permeable functional layer is provided with at least one textile layer. Here, we speak of a two-layer laminate. A three-layer laminate consists of a waterproof, water-vapour-permeable functional layer embedded in two textile layers. The connection between the functional layer and the at least one textile layer occurs by means of a discontinuous glue layer or a continuous water-vapour-permeable glue layer. In one variant, a glue can be applied spot-wise between the functional layer and the one or two textile layers. Spot-wise or discontinuous application of glue occurs because a full-surface layer of a glue that is not water vapour-permeable itself would block the water-vapour permeability of the functional layer.

Definition of Waterproof

A functional layer/functional-layer laminate is considered "waterproof," optionally including the seams provided on the functional layer/functional-layer laminate, if it guarantees a water-entry pressure of at least $1\times10^4$ Pa. The functional-layer material preferably withstands a water-entry pressure of more than $1\times10^5$ Pa. The water-entry pressure is then measured according to a test method in which distilled water at 20±2° C. is applied to a sample of 100 cm² of the functional layer with increasing pressure. The pressure increase of the water is 60±3 cm $H_2O$ per minute. The water-entry pressure then corresponds to the pressure at which water first appears on the other side of the sample. Details concerning the procedure are stipulated in ISO standard 0811 from the year 1981.

Whether a shoe is watertight can be tested, for example, with a centrifuge arrangement of the type described in U.S. Pat. No. 5,329,807.

Definition of Water Vapour Permeable/Breathable

A functional layer/functional-layer laminate is considered "water-vapour permeable" if it has a water-vapour-permeability number Ret of less than 150 $m^2 \times Pa \times W^{-1}$. Water-vapour permeability is tested according to Hohenstein skin model. This test method is described in DIN EN 31092 (02/94) and ISO 11092 (1993).

Definition of Allowing for Air Flow/Communication of Air

Air flow is dependent on the pressure gradient, the temperature gradient and the gradient of water vapour concentration. The terms "allowing for air flow through it" and "communication of air" mean that a bulk air transfer already takes place at a minimal pressure difference (<1000 Pa, particularly <100 Pa, more particularly <10 Pa, but greater than or equal to 1 Pa), for example due to minimal wind, due to a motion of the foot or due to a walking motion. A channel structure, a spacer material or the voids between discrete filler elements are structures/materials allowing for air flow through it. In contrast thereto, almost every material allows for an airflow therethrough at high pressures, which is not meant by the terminology used. Water vapour may diffuse through certain materials at low pressures, such as through microporous materials or through air. However, such a diffusing is by itself not sufficient to constitute a discharge through the ventilating sole element in the sense of the invention. An air flow is needed, which takes the water vapour with it out of the shoe. Also, "unloaded" air flows into the shoe, which can in turn absorb water vapour within the ventilating sole element and transport it to the outside of the shoe. A diffusion of water vapour through the materials of the ventilating sole element may be advantageous, but is not sufficient for establishing an air flow in the sense of the invention.

What is claimed is:

1. Waterproof, breathable shoe, comprising:
a waterproof upper assembly with an upper portion including a breathable outer material and with a bottom portion, said upper assembly comprising a waterproof, breathable functional layer arrangement extending over said upper portion and said bottom portion,
a ventilating sole element having a structure or material allowing for air flow through it, said ventilating sole element being attached to said upper assembly,
wherein a plurality of lateral passages extends from said structure or material through a side wall of said ventilating sole element, said plurality of lateral passages allowing for communication of air between said structure or material of said ventilating sole element and an outside of said ventilating sole element, wherein said plurality of lateral passages are arranged below the bottom portion of the upper assembly, with a water vapour transfer out of the shoe being effected via the bottom portion of the upper assembly through the waterproof, breathable functional layer arrangement, via the structure or material allowing for air flow through it and via said plurality of lateral passages, with water vapour discharged from an underside of the upper assembly being received at an upper side of the ventilating sole element, and with air flow within the ventilating sole element facilitating transport of the water vapour to the outside of the waterproof, breathable shoe via said plurality of lateral passages.

2. Shoe according to claim 1, wherein said upper portion comprises a waterproof, breathable upper functional layer laminate having a lower end area, and said bottom portion comprises a waterproof, breathable bottom functional layer laminate having a side end area; the side end area of said bottom functional layer laminate and the lower end area of said upper functional layer laminate being bonded together with a waterproof seal being provided at the bond.

3. Shoe according to claim 2,
wherein said ventilating sole element comprises an inner ventilating sole element having a structure or material allowing for air flow through it and a surrounding sole element, said surrounding sole element surrounding said inner ventilating sole element at least laterally and being attached to said upper assembly and to a lateral surface of said inner ventilating sole element, and
wherein said side end area of said bottom functional layer laminate is attached by a sewn seam to said lower end area of said upper functional layer laminate, with said waterproof seal being formed by surrounding sole material having penetrated into and around said sewn seam.

4. Shoe according to claim 3, wherein said inner ventilating sole element is positioned below said bottom portion of said upper assembly, such that an upper perimeter of said inner ventilating sole element is located within said sewn seam, said upper perimeter having a minimum distance to said sewn seam of between 1 mm and 4 mm.

5. Shoe according to claim 3, wherein a lower portion of said breathable outer material allows for penetration of surrounding sole material therethrough,
said waterproof seal being formed at least partially by surrounding sole material having penetrated through said lower portion of said breathable outer material to said upper functional layer laminate, said bottom functional layer laminate and said sewn seam.

6. Shoe according to claim 5, wherein said lower portion of said breathable outer material comprises a netband, with the side end area of said bottom functional layer laminate being attached by said sewn seam to said netband and to said lower end area of said upper functional layer laminate, with said surrounding sole material having penetrated through said seam.

7. Shoe according to claim 2, wherein said bottom functional layer laminate is a two layer laminate comprising an upper supporting textile layer and a lower breathable and waterproof functional layer.

8. Shoe according to claim 2, wherein said bottom functional layer laminate is a two layer laminate comprising an upper breathable and waterproof functional layer and a lower supporting textile layer.

9. Shoe according to claim 1, wherein said ventilating sole element comprises an inner ventilating sole element having a structure or material allowing for air flow through it and a surrounding sole element;
said surrounding sole element surrounding said inner ventilating sole element at least laterally and being attached to said upper assembly and to a lateral surface of said inner ventilating sole element.

10. Shoe according to claim 9, wherein said plurality of lateral passages extends from said structure or material of said inner ventilating sole element through a side wall of the inner ventilating sole element and through said surrounding sole element, said plurality of lateral passages allowing for communication of air between said structure or material of said inner ventilating sole element and an outside of said surrounding sole element.

11. Shoe according to claim 9, wherein said surrounding sole element is formed by a material moulded or injected on at least parts of a lower portion of said upper assembly and onto said lateral surface of said inner ventilating sole element.

12. Shoe according to claim 9, wherein said inner ventilating sole element comprises a circular lip arranged in the vicinity of an upper circumferential edge of said inner ventilating sole element, said circular lip protruding in a direction between and including upwards and laterally outwards from said inner ventilating sole element.

13. Shoe according to claim 9, wherein said inner ventilating sole element comprises a first lip section in the vicinity of an upper circumferential edge of said inner ventilating sole element in a heel area and a second lip section in the vicinity of an upper circumferential edge of said inner ventilating sole element in a forefoot area, with said first and second lip sections extending vertically upwards from an upper surface of said inner ventilating sole element.

14. Shoe according to claim 9, wherein the undersides of said surrounding sole element and said inner ventilating sole element form at least a part of an outer sole.

15. Shoe according to claim 14, wherein the underside of said inner ventilating sole element is arranged at a higher position as compared to the underside of said surrounding sole element.

16. Shoe according to claim 9, wherein said surrounding sole element extends below said inner ventilating sole element.

17. Shoe according to claim 16, wherein supporting members are formed in portions of said surrounding sole element, said supporting members extending substantially vertically through said surrounding sole element.

18. Shoe according to claim 16, wherein said surrounding sole element forms at least a part of an outer sole.

19. Shoe according to claim 1, wherein said ventilating sole element has a channel structure.

20. Shoe according to claim 1, wherein said ventilating sole element comprises a side wall, wherein a channel structure is formed in the ventilating sole element, said channel structure comprising:
    a plurality of channels, at least some of said channels comprising air and moisture discharging ports;
    at least one of the channels being a peripheral channel that intersects with a plurality of channels;
    the channels and the side wall forming functional pillars; and
    wherein said ventilating sole element has a ratio of top surface area (Ap) of the functional pillars to top surface area (Ac) of the channels between 0.5 and 5.

21. Shoe according to claim 1, wherein said ventilating sole element comprises a container element having a bottom part and a side wall so as to form an inner space of said container element, wherein said inner space is filled with a filler structure or material allowing for air flow through it.

22. Shoe according to claim 1, further comprising a surrounding connection element, the surrounding connection element surrounding a lower lateral portion of said upper assembly and being attached to said upper assembly and to an upper lateral portion of the ventilating sole element.

23. Shoe according to claim 22, wherein said side end area of said bottom functional layer laminate is attached by a sewn seam to said lower end area of said upper functional layer laminate, with said waterproof seal being formed by material of said surrounding connection element having penetrated into and around said sewn seam.

24. Shoe according to claim 1, wherein said ventilating sole element is glued to said upper assembly.

25. Shoe according to claim 1, wherein said ventilating sole element comprises a circular lip protruding from said ventilating sole element.

26. Shoe according to claim 25, wherein said circular lip is stitched to a lower portion of said upper assembly.

27. Shoe according to claim 1, wherein said bottom functional layer laminate is provided with supporting members being knobs, at its lower surface.

28. Shoe according to claim 27, wherein the comfort layer consists of two discrete layers.

29. Shoe according to claim 1, wherein a water vapour permeable comfort layer is provided on top of at least parts of said ventilating sole element.

30. Shoe according to claim 29, wherein the water vapour permeable comfort layer is attached to the top of said ventilating sole element.

31. Shoe according to claim 29, wherein said comfort layer has an upper side and a lower side, where the upper side is facing the bottom portion of the upper assembly, and the lower side is facing the ventilating sole element, the lower side being stiff and the upper side being soft.

32. Shoe according to claim 1, wherein the underside of said ventilating sole element forms at least a part of an outer sole.

33. Shoe according to claim 1, wherein an additional sole element is provided forming at least a part of an outer sole, said additional sole element being arranged below said ventilating sole element.

34. Shoe according to claim 33, wherein supporting members are formed in portions of said additional sole element, said supporting members extending substantially vertically through said additional sole element.

35. Shoe according to claim 33, further comprising a sole comfort layer being arranged between said ventilating sole element and said additional sole element forming at least a part of an outer sole.

36. Shoe according to claim 1, comprising at least one hollow insert provided in the at least one lateral passage.

* * * * *